(12) United States Patent
Nakayama

(10) Patent No.: US 7,987,224 B2
(45) Date of Patent: Jul. 26, 2011

(54) AUDIO SIGNAL PROCESSOR AND NETWORK SYSTEM

(75) Inventor: Kei Nakayama, Hamamatsu (JP)

(73) Assignee: Yamaha Corporation (JP)

( * ) Notice: Subject to any disclaimer, the term of this patent is extended or adjusted under 35 U.S.C. 154(b) by 192 days.

(21) Appl. No.: 12/244,765

(22) Filed: Oct. 2, 2008

(65) Prior Publication Data

US 2009/0100143 A1    Apr. 16, 2009

(30) Foreign Application Priority Data

Oct. 3, 2007  (JP) ................................ 2007-260429
Oct. 3, 2007  (JP) ................................ 2007-260430
Oct. 3, 2007  (JP) ................................ 2007-260431

(51) Int. Cl.
    *G06F 15/16*    (2006.01)
(52) U.S. Cl. ....................................................... 709/200
(58) Field of Classification Search .................... 709/200
    See application file for complete search history.

(56) References Cited

U.S. PATENT DOCUMENTS 7,606,144 B2 * 10/2009 Chen et al. .................... 370/222

FOREIGN PATENT DOCUMENTS

| EP | 1 901 483 A2 | 3/2008 |
| JP | 7-177166 A | 7/1995 |
| JP | 2007-259347 A | 10/2007 |

OTHER PUBLICATIONS

Extended European Search Report dated Feb. 6, 2009, issued in corresponding European Application No. 08165731.4-2416.
Berwanger, Josef, et al., "A New High-Performance Data Bus System for Safety-Related Applications", Automotive Elctronics Handbook, XP002230813, Jan. 1, 2000, pp. 60-67.
"CobraNet (TM)"; Balcom Co.; Retrieved on Mar. 21, 2006; May be accessed via the internet: http://www.balcom.co.jp/cobranet.htm.
Conrad; "EtherSound (TM) in a studio environment"; Retrieved Mar. 21, 2006; May be accessed via the internet: http://www.ethersound.com/news/getnews.php?enews_key=101.

* cited by examiner

*Primary Examiner* — Kenny S Lin
*Assistant Examiner* — Farhad Ali
(74) *Attorney, Agent, or Firm* — Rossi, Kimms & McDowell LLP

(57) ABSTRACT

In the case where an audio network system that performs transport of audio signals between a plurality of processors is constructed such that the plurality of processors each including two sets of transmission I/Fs and reception I/Fs are connected in series, and a TL frame generated by a master node is circulated along a ring transmission route formed among the processors in each fixed period, the TL frame including a plurality of storage regions for audio signals, when one of the processors is required to be the master node, the one processor resets in sequence processors which are connected on both sides thereof and processors behind the processors connected on both sides to once remove each of those processors from a ring transmission route if it belong to any ring transmission route, then incorporates the processors into a ring transmission route in which the one processor belongs to.

8 Claims, 27 Drawing Sheets

LOOP CONNECTION

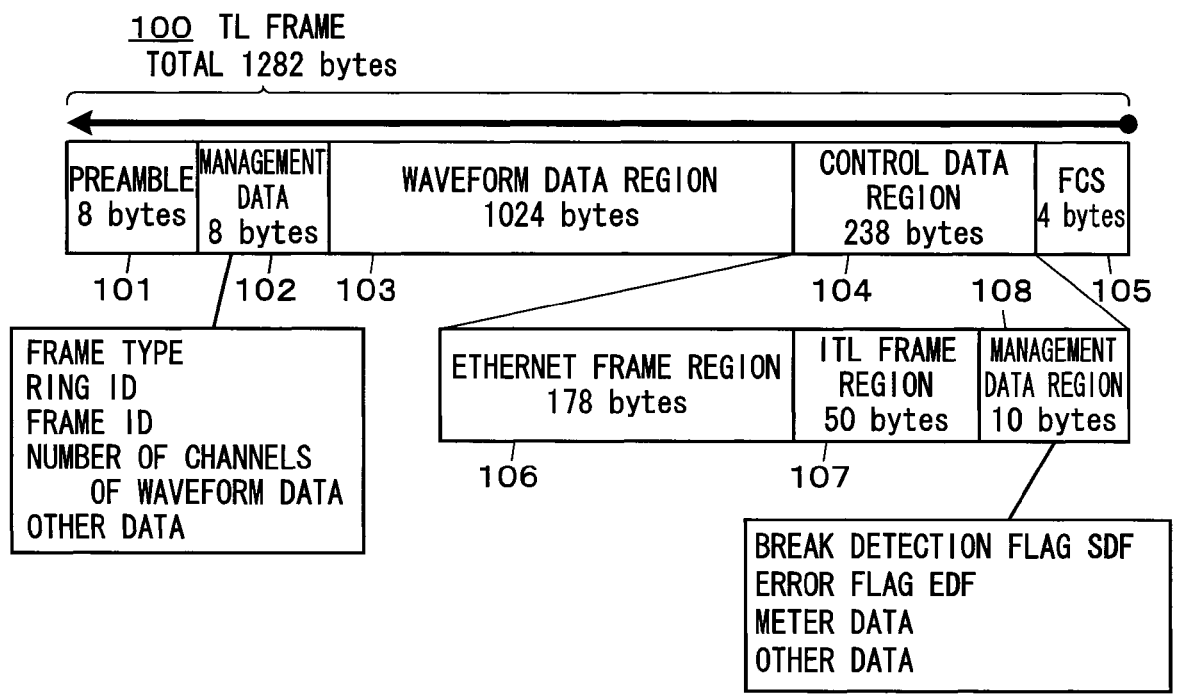

FIG. 4A

ITL FRAME 110

| HEAD 111 | 112 | 113 | 114 | 115 | 116 | 117 | 118 | 118a | 119 TAIL |
|---|---|---|---|---|---|---|---|---|---|
| PREAMBLE | FRAME TYPE | DATA SIZE | ORIGIN ID | DESTINATION ID | TRANSMISSION SOURCE PORT | COMMAND TYPE | PARAMETER | DUMMY DATA | FCS |

FIG. 4B

ITL FRAME 120

| HEAD 111 | 112 | 119 TAIL |
|---|---|---|
| PREAMBLE | FRAME TYPE | FCS |

F I G. 5
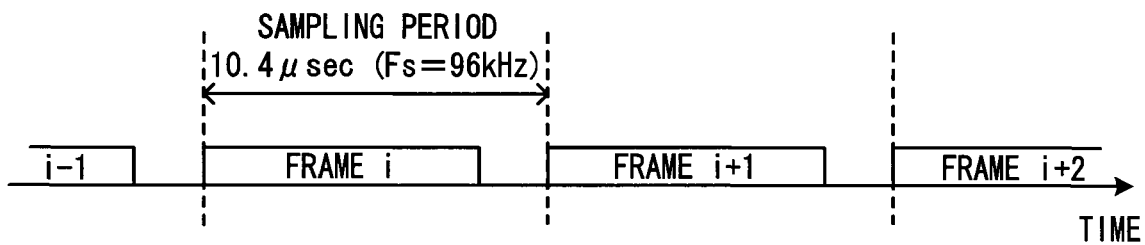
F I G. 6
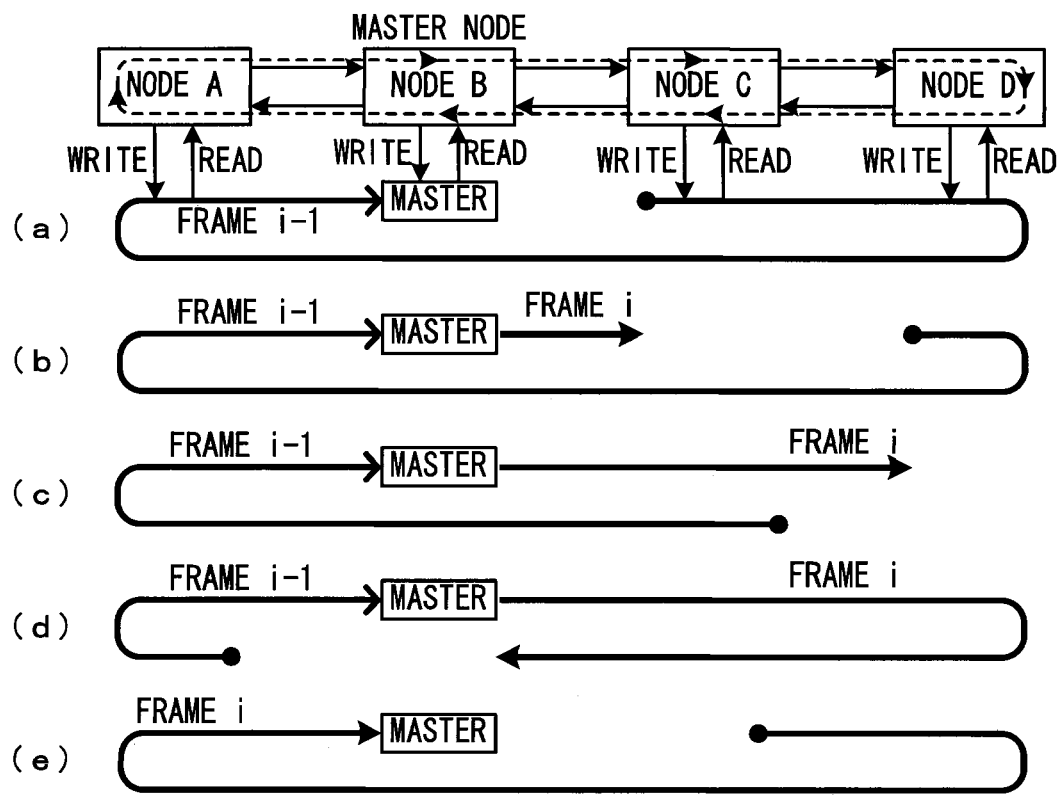

F I G. 1 1

| BACKWARD SIDE | | | FORWARD SIDE | | |
|---|---|---|---|---|---|
| NETWORK ID | NODE ID | MAC ADDRESS | NETWORK ID | NODE ID | MAC ADDRESS |
| — | — | 00-00-00-00-00-07 | — | — | 00-00-00-00-00-09 |
| — | — | 00-00-00-00-00-06 | — | — | 00-00-00-00-00-0A |
| — | — | 00-00-00-00-00-05 | — | — | 00-00-00-00-00-0B |
| — | — | 00-00-00-00-00-04 | — | — | — |
| ⋮ | ⋮ | ⋮ | ⋮ | ⋮ | ⋮ |

FIG. 16
(a) PROCESSORS A AND B ARE TURNED ON
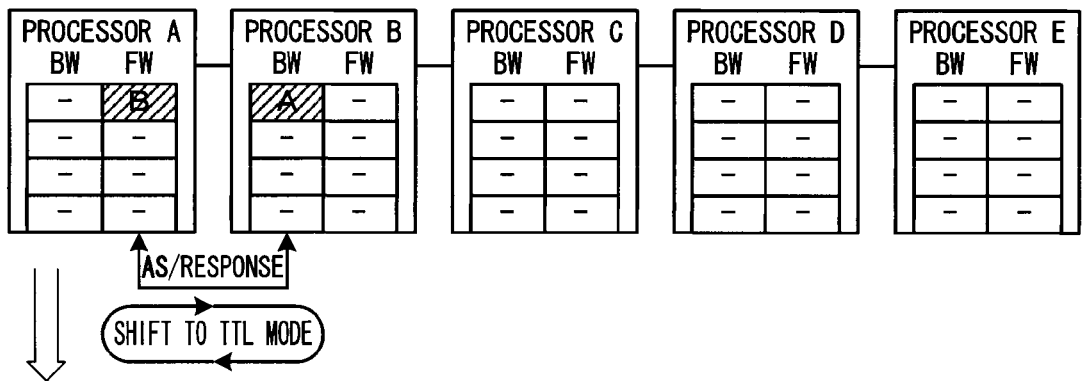
(b) PROCESSOR C IS TURNED ON
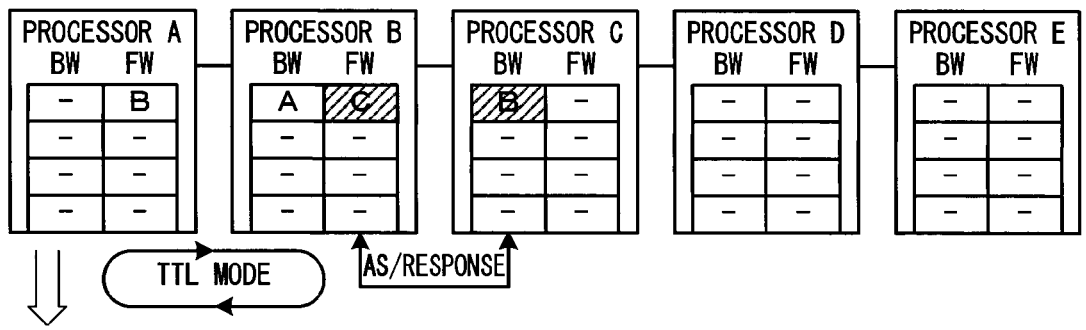
(c)
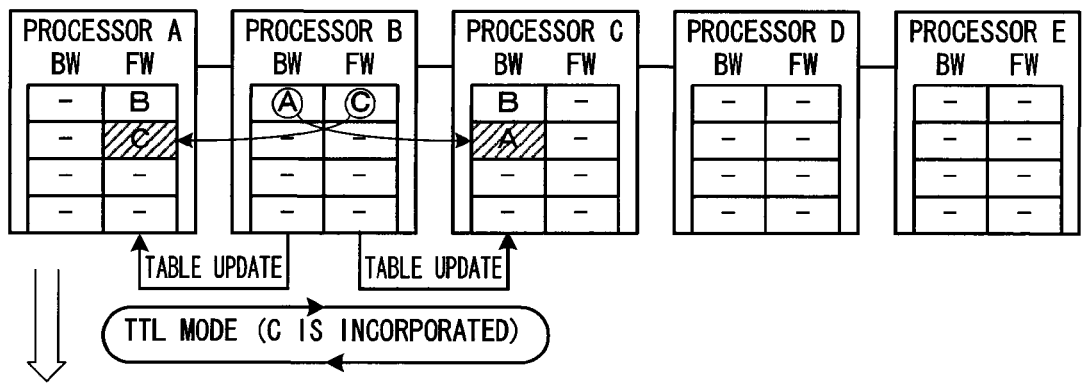
(d) PROCESSOR D IS TURNED ON
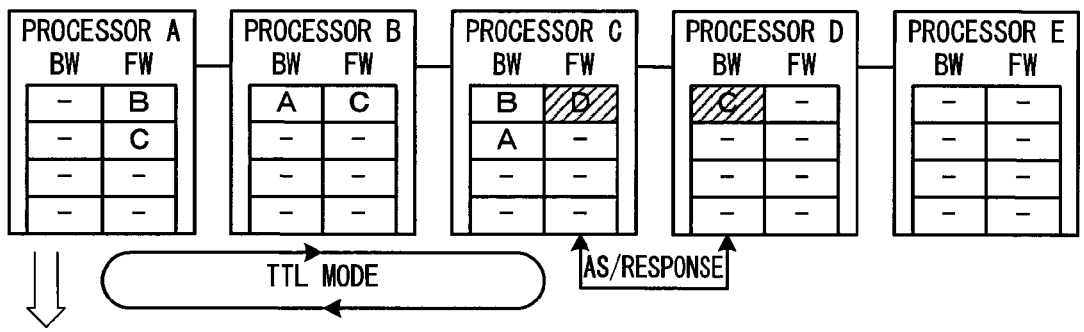

FIG. 17
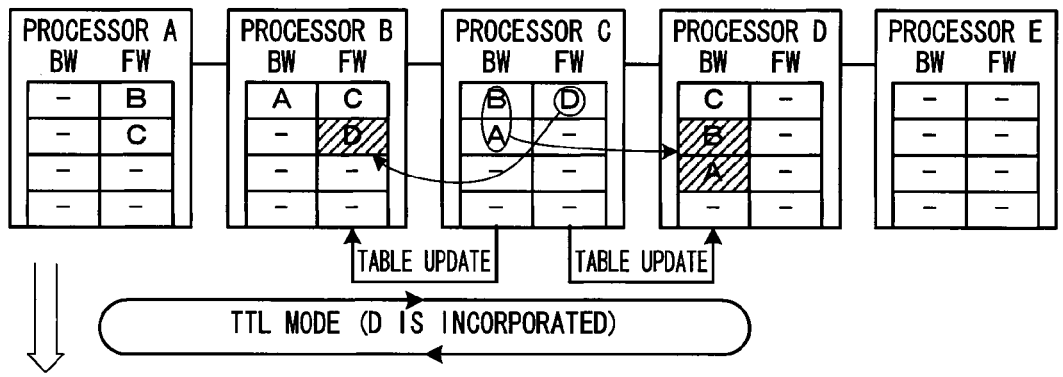
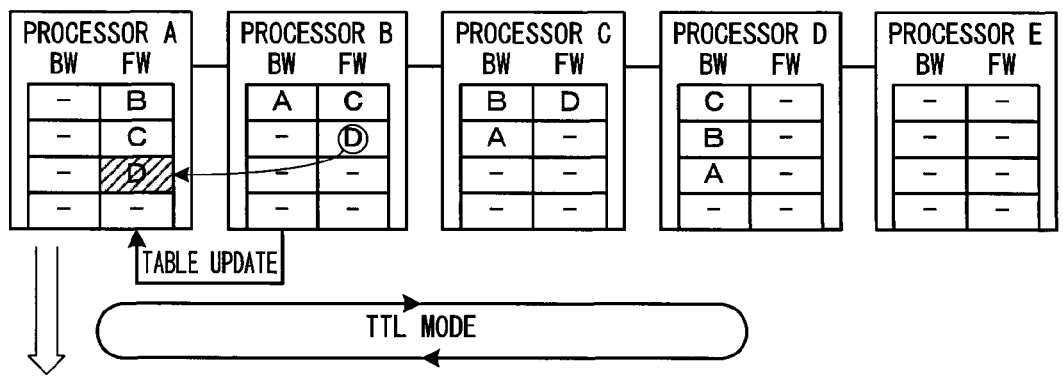
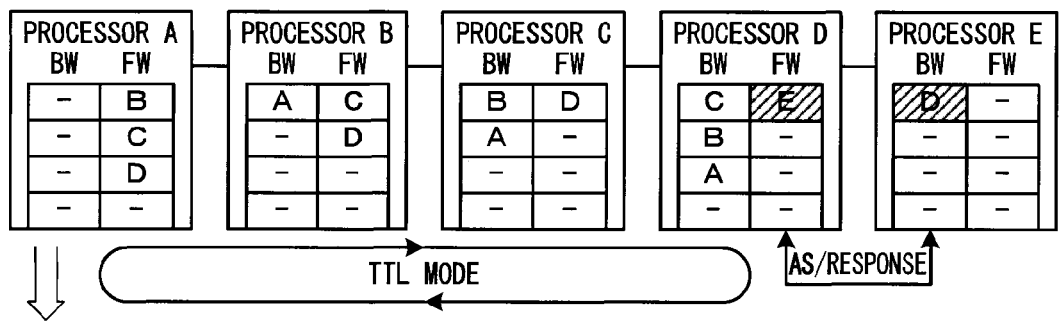
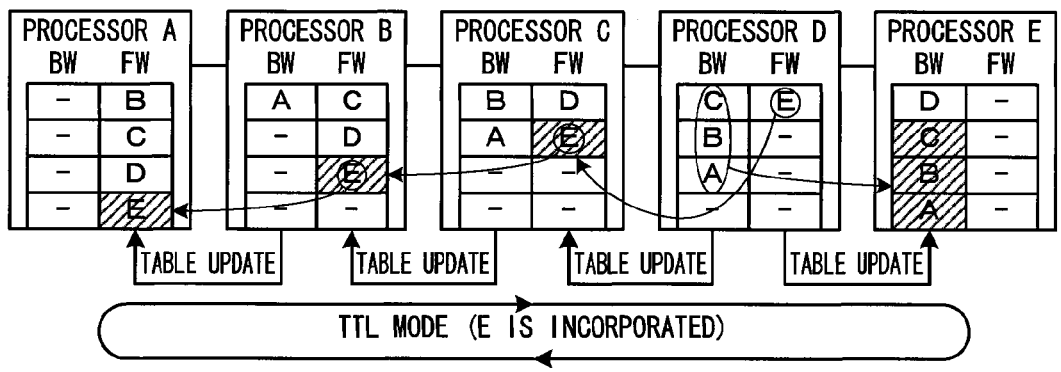

FIG. 20
(a)
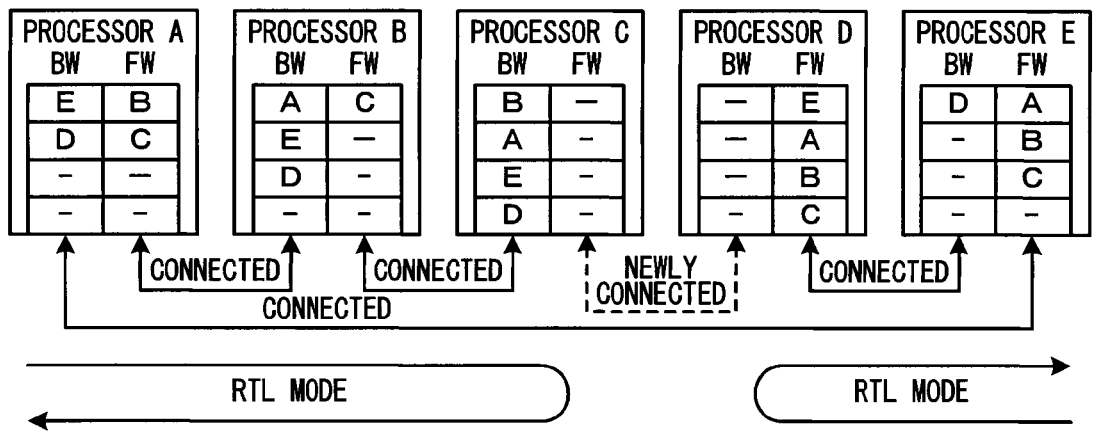
(b)
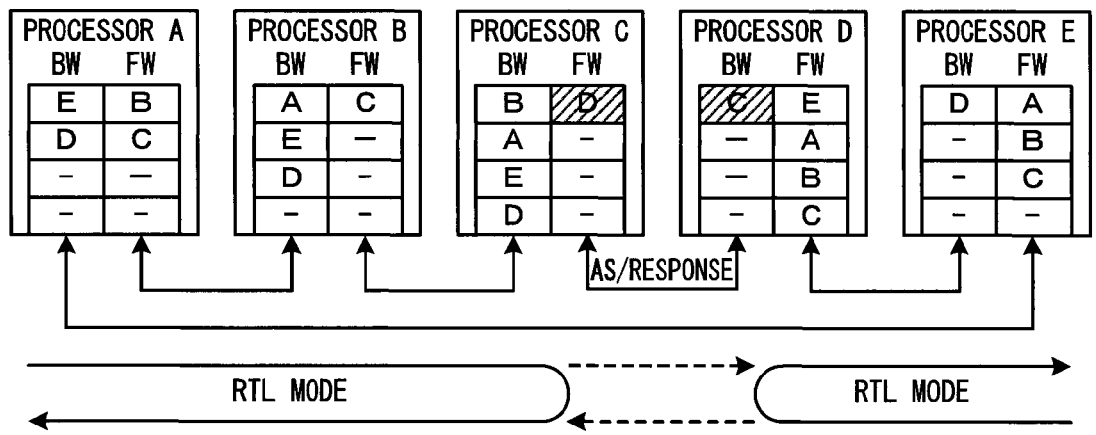
(c)
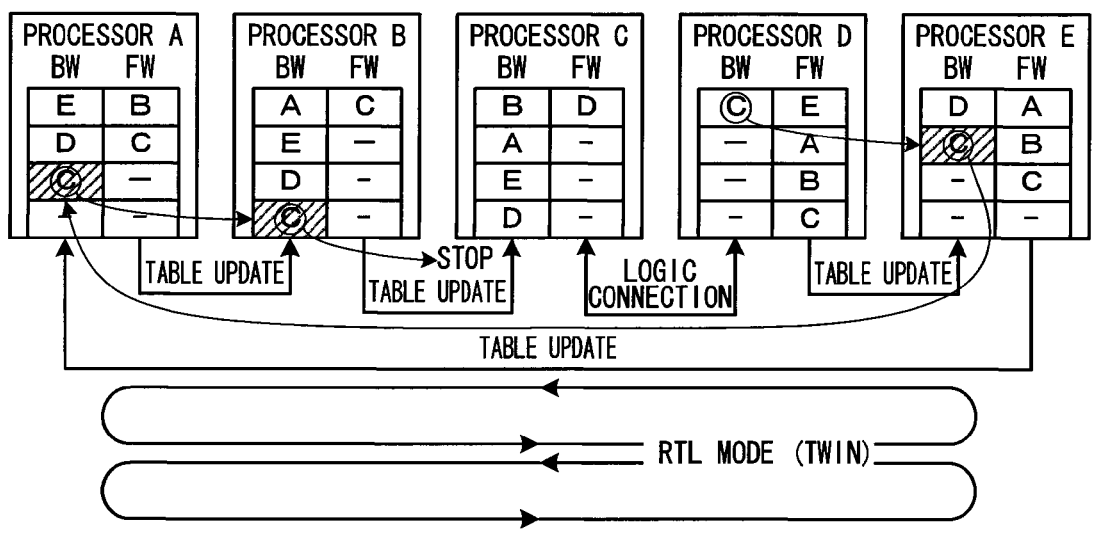

FIG. 23

TL FRAME TRANSMISSION MODULE 18

FIRST BUFFER

SECOND BUFFER

⋮

(K + 1)-TH BUFFER

AUDIO SIGNAL PROCESSOR AND NETWORK SYSTEM

BACKGROUND OF THE INVENTION

1. Field of the Invention

The present invention relates to an audio signal processor constituting a network system for transporting audio signals between a plurality of nodes, and such a network system.

2. Description of the Related Art

Conventionally, an audio network system has been known for transporting audio signals between a plurality of nodes, and is used in concerts, dramas, music production, private broadcasting, and so on. Known examples of such an audio network system include CobraNet (trademark), and EtherSound (trademark) as described in the following references 1 and 2.

Reference 1: "CobraNet™", [online], Balcom Co. [Retrieved on Mar. 21, 2006] Internet <URL: http://www.balcom.cojp/cobranet.htm>

Reference 2: Carl Conrad, "EtherSound™ in a studio environment", [online], Digigram S. A., [Retrieved on Mar. 21, 2006] Internet <URL: http://www.ethersound.com/news/getnews.php?enews_key=101>

In addition, it is generally desired to be able to connect audio equipment having various functions such as analog input, analog output, digital input, digital output, mixing, effect addition, recording/reproducing, remote control, or combination thereof to the audio network system.

Further, token passing scheme is conventionally known as a scheme for arbitrating asynchronous data transmission requests arisen from a plurality of nodes forming a system to thereby realizing asynchronous data transmission among the nodes. Data transmission utilizing the token passing scheme is described in the following reference 3.

Reference 3: Japanese Patent Laid-open Publication No. H07-177166

SUMMARY OF THE INVENTION

However, such a conventional audio network system has the following problems.

Specifically, for example, in CobraNet (trademark), since a plurality of nodes transmit respectively generated frames (a plurality of frames) to a bus-type network, gaps between the frames occur, thus causing a problem of low transport efficiency.

Further, it is needed to configure the system in such a manner that data of a required number of channels can be transported in consideration of the transmission route of the frames because the physical transportation limit of number of channels varies due to change of wires between nodes (the configuration of the network), thus causing a problem of difficulties in designing the system.

This is because the time required to transmit data from a transmission source node to a node at the end varies depends on the number of nodes, and also because it takes long time to transfer data when a larger number of nodes constitute the network because the subsequent communication starts after the data is transmitted to all of the nodes, resulting in a loss of band, and so on.

Besides, in EtherSound (trademark), any measure to prevent sound interruption upon occurrence of a fault is not taken, causing a problem of stop of sound when disconnection of the wire between the nodes occurs. Another problem is that since a plurality of packets are included in a frame, the transport control becomes complicated and the data transmission rate (amount/time) is not enough.

It is needed to configure the system in such a manner that data of a required number of channels can be transported in consideration of the transmission route of the frames, as in the case of CobraNet (trademark), thus causing still another problem of difficulties in designing it.

Hence, the assignee of the application has proposed, as a technique to solve the above-described problems, an audio network system having a ring transmission route in which an audio transport frame circulates in a constant period (Japanese patent application No. 2006-84253).

In this audio network system, waveform data is written solidly into the audio transport frame, so that the management of transportation is easy and the communication band can be efficiently utilized to perform audio transport. Since the audio transport frame circulates through all of the nodes in the system, a change of the wire between nodes can be easily performed regardless of the transmission route of the frame.

Further, this network system is configured in such a manner that a master node that generates the audio transport frame is automatically decided when nodes that can constitute the system are connected to one another to construct the system, then the system shifts to a mode to transport audio signals between the connected nodes.

However, the designation of the master node is specifically important operation because the master node is a key node in the whole system, and therefore it has been considered to be undesirable to automatically decide the master node. On the other hand, there is another demand to make it possible to perform data communication between the nodes even before the master node is decided.

The above-described and already proposed network system cannot sufficiently cope with the above-described demands.

It is an object of the invention to solve the problem, and to realize efficient automatic system construction in accordance with user's arbitrary designation of master node among the processors included in the system, when constructing a system in which an audio transport frame generated by the master node and including a plurality of regions for audio signals circulates in a fixed period along a loop transmission route formed among the processors. Another object is to realize data communication among the processors which have been already appropriately connected even if the maser node is not designated.

Further, in the above described network system, even if the transmission route of the audio transport frame is broken because of severance of the cable or disorder at nodes after the system once shifted to a mode in which the audio signals are transported, the system continues the audio signal transmission among the nodes in a shrunk area on a side where the master node exists, by cutting off the transmission route at the point of the breakage.

However, there has been such a problem that, among the network system divided because of the breakage, nodes divided from the master node cannot continue data transmission utilizing the ring transmission route.

On the other hand, it is conceivable that the nodes write not only the audio waveform data but also various data such as command data, Ethernet frame, and the like into the frame which circulates the ring transmission route, to thereby transport the various data between the nodes. Accordingly, there has been a demand to perform data transmission utilizing ring transmission route also among nodes divided from the master node because of the breakage of connection.

However, the above described network system does not meet the demand enough.

It is another object of the invention to solve the problem, and to realize data transmission utilizing the ring transmission route even among processors divided from the master node for any reason, when constructing a system in which an audio transport frame generated by the master node and including a plurality of regions for audio signals circulates in a fixed period along a loop transmission route formed among the processors.

Still further, there has been also a demand to perform efficient data transmission among the nodes regarding not only audio waveform data but also data, such as Ethernet frame, for which transmission requests asynchronously arise.

It is still another object of the invention to solve the problem, and to realize efficient data transmission among the processors regarding also data for which transmission requests asynchronously arise, when constructing a system in which an audio transport frame generated by the master node and including a plurality of regions for audio signals circulates in a fixed period along a loop transmission route formed among the processors.

To attain the above objects, an audio signal processor of the present invention is an audio signal processor including two sets of receivers and transmitters each performing communication in a single direction, and capable of being incorporated into a network system as one of processors constituting the network system in which the processors are connected in series by connecting one set of the receiver and transmitter in one processor to one set of the transmitter and receiver in a next processor by communication cables, respectively, one of the processors operates as a master node, an audio transport frame generated by the master node circulates along a ring transmission route formed among the processors in the network system at a constant period, the audio transport frame including a plurality of storage regions for audio signals, and each of the processors writes and/or reads audio signals to/from the audio transport frame, to thereby transport the audio signals between a series of connected processors, the audio signal processor including: an incorporating device that, when detecting a processor directly connected to the audio signal processor via the communication cable and not incorporated into the ring transmission route to which the audio signal processor belongs, communicates with the detected processor to incorporate the detected processor into the ring transmission route; a mode switch device that, when receiving a master change command designating the audio signal processor as the master node, switches the audio signal processor into a master mode in which the audio signal processor operates as the master node, while other processors not designated as the master node operate in a slave mode; a reset instructing device that, when detecting the master change command, resets the audio signal processor to separate the audio signal processor from the ring transmission route, and sends a reset command for instructing reset to all adjacent processors with which the audio signal processor is directly connected via the communication cables; and a reset conveying device that, when receiving a reset command from an adjacent processor on a side, resets the audio signal processor to separate the audio signal processor from the ring transmission route, and sends a reset command to another adjacent processor on another side.

In such an audio signal processor, it is preferable that the audio signal processor further includes an initial communication device that, when the audio signal processor is not incorporated in the ring transmission route or the audio signal processor is located at an end of the connected processors which form the ring transmission route, transmits a communication frame from the transmitter to an adjacent processor directly connected to the transmitter via the communication cable and not incorporated into the ring transmission route to which the audio signal processor belongs, and receives a communication frame from the adjacent device via the communication cable, wherein the incorporating device detects a processor not incorporated into the ring transmission route through transmitting and receiving of a certain kind of the communication frame to/from the adjacent processor by the initial communication device.

Further, it is preferable that the audio signal processor further includes: an adjacent communication device that writes the communication frame into a certain region reserved in the audio transport frame to transmit the communication frame to an adjacent processor incorporated into the ring transmission route to which the audio signal processor belongs, and reads out the communication frame from the certain region in the audio transport frame received from the adjacent processor; and a command transporting device that sends and receives commands to/from the other processors incorporated into the ring transmission route to which the audio signal processor belongs, through transmitting and receiving of the communication frame by the adjacent communication device of the audio signal processor and the other processors.

Furthermore, it is preferable that the audio signal processor further includes a device that, when receiving a master change command designating a processor other than the audio signal processor as the master node, writes the received master change command into the communication frame and sends the communication frame to the adjacent processor incorporated into the ring transmission route to which the audio signal processor belongs.

Alternatively, it is also preferable that the audio signal processor further includes: a topology table memory that stores a topology table indicating connection order of processors which are connected with the audio signal processor directly or indirectly through intermediate one or more processors; and a destination setting device that sets a destination of the communication frame from among the processors indicated in the topology table, wherein the initial communication device transmits the communication frame from the transmitter on a side where the destination processor of the communication frame is connected, and further including a device that, upon receiving the communication frame from an adjacent processor on a side, i) if a destination of the communication frame is the audio signal processor, executes a process according to the contents of the communication frame, and ii) if the destination of the communication frame is other than the audio signal processor, forwards the communication frame to another adjacent processor on another side.

A network system of the present invention is a network system composed of consecutive two or more of a plurality of nodes connected in series, wherein each of the plurality of nodes including two sets of receivers and transmitters each performing communication in a single direction, one node and a next node are connected in the series by connecting one set of the receiver and transmitter in the one node to one set of the transmitter and receiver in the next node by communication cables, respectively, one of the nodes operates as a master node, an audio transport frame generated by the master node circulates along a ring transmission route formed among the nodes in the network system at a constant period, the audio transport frame includes a plurality of storage regions for audio signals, and each of the nodes along the ring transmission route writes and/or reads audio signals to/from the audio transport frame, to thereby transport the audio signals between the nodes composing the network system, each of the nodes composing the network system including: an incorporating device that, when detecting a node directly connected to the own node via the communication cable and not incorporated into the ring transmission route to which the own node belongs, communicates with the detected node to incorporate the detected node into the ring transmission route; and a reset conveying device that, when receiving a reset command from an adjacent node on a side, resets the own node to separate the own node from the ring transmission route, and sends a reset command to another adjacent node on another side, and at least one of nodes composing the network system further including: a mode switch device that, when receiving a master change command designating the node as the master node, switches the node into a master mode in which the node operates as the master node, while other nodes not designated as the master node operate in a slave mode; and a reset instructing device that, when detecting the master change command, resets the node to separate the node from the ring transmission route, and sends a reset command for instructing reset to all adjacent nodes with which the node is directly connected via the communication cable.

Another network system of the present invention is a network system composed of consecutive two or more of a plurality of nodes connected in series, wherein each of the plurality of nodes including two sets of receivers and transmitters each performing communication in a single direction, and one node and a next node are connected in the series by connecting one set of the receiver and transmitter in the one node to one set of the transmitter and receiver in the next node by communication cables, respectively, wherein consecutive two or more of the nodes can form a group operating in a temporary communication mode or in an audio transport mode, in the temporary communication mode, one of the nodes in the group is automatically determined as a temporary master node, a transport frame generated by the temporary master node circulates along a ring transmission route formed among the nodes in the group at a constant period, the audio transport frame including a region for storing a communication frame for sending a command, and each of the nodes along the ring transmission route writes and/or reads the communication frame to/from the transport frame, to thereby transport the communication frame between the nodes in the group, in the audio transport mode, one of the nodes in the group is designated as a master node, an audio transport frame generated by the master node circulates along a ring transmission route formed among the nodes in the group at a constant period, the audio transport frame including a plurality of storage regions for audio signals, and each of the nodes along the ring transmission route writes and/or reads audio signals to/from the audio transport frame, to thereby transport the audio signals between the nodes in the group, when one of the nodes connected in series is designated as the master node, all of the nodes are switched into the audio transport mode as a group, and starts communication in the audio transport mode under control by the master node, and when a connection between any two nodes in an original group operating in the audio transport mode is disconnected and the nodes in the group are divided at the disconnection point into two groups, the nodes in one group to which the ex-master node in the original group belongs continue operation in the audio transport mode, and the nodes in another group to which the ex-master node does not belong are automatically switched into the temporary communication mode.

In such a network system, it is preferable that each of the nodes operates in an initial communication mode when the node is turned on or reset, in the initial communication mode, the node transmits the communication frame from the transmitter to an adjacent node directly connected to the transmitter via the communication cable, and i) an end node of the group communicates, when detecting that a node operating in the initial communication mode is directly connected to the end node, with the detected node to incorporate the detected node into the group to which the end node belongs, and ii) the end node sends, when detecting that a node which belongs to another group operating in the temporary communication mode is directly connected to the end node, a reset command to the detected node to cause the detected node to reset itself, thereby switching the detected node to the initial communication mode, and then communicates with the detected node to incorporate the detected node into the group to which the end node belongs.

Further, it is preferable that each of the nodes further includes a reset conveying device that, when receiving the reset command from an adjacent node on a side, resets the own node regarding functions for forming the ring transmission route, to separate the own node from the ring transmission route, and sends a reset command to another adjacent node on another side.

Alternatively, it is also preferable that each of the nodes further includes a device that, when detecting a node operating in the initial communication mode is directly connected via the communication cable to the own node operating in the initial communication mode, determines one of the own node and the detected node as the temporary master node by negotiating with the detected node, and forms a group which operates in the temporary communication mode with the detected node.

Alternatively, it is also preferable that the end node does not incorporate, when detecting that a node belonging to another group operating in the audio transport mode, other than the group to which the end node belongs, is directly connected to the end node, the detected node into the group to which the end node belongs.

Another audio signal processor of the present invention is an audio signal processor including two sets of receivers and transmitters each performing communication in a single direction, and capable of being incorporated into a network system as one of processors constituting the network system in which the processors are connected in series by connecting one set of the receiver and transmitter in one processor to one set of the transmitter and receiver in a next processor by communication cables, respectively, one of the processors operates as a master node, an audio transport frame generated by the master node circulates along a ring transmission route formed among the processors in the network system at a constant period, the audio transport frame including a plurality of storage regions for audio signals, and each of the processors writes and/or reads audio signals to/from the audio transport frame, to thereby transport the audio signals between a series of connected processors, the audio transport frame further including an asynchronous data region for storing asynchronous data, the audio signal processor including: a first asynchronous data handler that, when the audio signal processor receives an audio transport frame with a free token indicating that the asynchronous data region is not occupied, and asynchronous data to be transmitted exists in the audio signal processor, transmits the audio transport frame to next processor after writing the asynchronous data into the asynchronous data region; a second asynchronous data handler that, when the audio signal processor receives an audio transport frame with asynchronous data written in the asynchronous data region by a processor other than the audio signal processor, retrieves the asynchronous data from the asynchronous data region and transmits the audio transport frame to the next processor without changing the data in the asynchronous data region; and a third asynchronous data handler that, when the audio signal processor receives an audio transport frame with asynchronous data written in the asynchronous data region by the audio signal processor, and asynchronous data to be transmitted does not remain in the audio signal processor, transmits the audio transport frame to the next processor after writing the free token into the asynchronous data region.

In such an audio signal processor, it is preferable that the audio signal processor further includes a fourth asynchronous data handler that, when the audio signal processor receives an audio transport frame with asynchronous data written in the asynchronous data region by the audio signal processor, and asynchronous data to be transmitted still remains, transmits the audio transport frame to the next processor after overwriting the asynchronous data onto the asynchronous data region.

Further, it is preferable that when a size of asynchronous data to be transmitted is larger than a size of the asynchronous data region, the first and fourth asynchronous data handlers divide the asynchronous data into a plurality of blocks of data, sizes of respective blocks being the size of the asynchronous data region, the first block being written into the asynchronous data region by the first asynchronous data handler, and one or more data blocks following the first block being written into the asynchronous data region by the fourth asynchronous data handler.

Furthermore, it is preferable that the first and fourth asynchronous data handlers add, to each of the blocks of the asynchronous data, data indicating a total number of the blocks and an ordinal number for the block, and the second asynchronous data handler accumulates the retrieved asynchronous data, and when all the blocks of the asynchronous data is accumulated within a predetermined time period, obtains the asynchronous data before division by uniting the accumulated asynchronous data and output the obtained asynchronous data to an upper layer of the audio signal processor.

Further, it is preferable that when all the blocks of the asynchronous data is not accumulated within the predetermined time period, then the second asynchronous data handler discards the accumulated blocks of the asynchronous data.

Alternatively, it is also preferable that the audio signal processor further includes: a first frame buffer that stores an audio transport frame received by one of the receivers; a judging device that judges whether the audio transport frame stored in the first frame buffer has normally circulated along the ring transmission route; a second frame buffer that stores an audio transport frame for which the judging device judged most recently that the audio transport frame had normally circulated; and a frame generator that i) when the judging device judges the audio transport frame has normally circulated, generates an audio transport frame for circulation in later period based on the audio transport frame stored in the first frame buffer, and ii) when the judging device judges the audio transport frame has not normally circulated, generates an audio transport frame for circulation in the later period based on the audio transport frame stored in the second frame buffer, and writes the free token into the asynchronous data region of the generated audio transport frame, wherein the first frame buffer, the judging device, the second frame buffer and the frame generator operate when the audio signal processor operates as the master node.

In such an audio signal processor, it is preferable that the audio signal processor further includes a topology table memory that stores a topology table indicating connection order of processors which constitute the network system to which the audio signal processor belongs.

Alternatively, it is also preferable that the audio signal processor further includes a releasing device that when the audio transport frame in the first frame buffer includes asynchronous data written in the asynchronous data region by a processor other than the processors in the network system, writes the free token into the asynchronous data region of the audio transport frame generated based on the audio transport frame by the frame generator, wherein the releasing device operates when the audio signal processor operates as the master node.

Still another network system of the present invention is a network system composed of consecutive two or more of a plurality of nodes connected in series, wherein each of the plurality of nodes including two sets of receivers and transmitters each performing communication in a single direction, one node and a next node are connected in the series by connecting one set of the receiver and transmitter in the one node to one set of the transmitter and receiver in the next node by communication cables, respectively, one of the nodes operates as a master node, and a transport frame generated by the master node circulates along a ring transmission route formed among the nodes in the network system at a constant period, the transport frame further including an asynchronous data region for storing asynchronous data, each node of the nodes constituting the network system including: a first asynchronous data handler that, when the node receives a transport frame with a free token indicating that the asynchronous data region is not occupied, and asynchronous data to be transmitted exists in the node, transmits the transport frame to next node after writing the asynchronous data into the asynchronous data region; a second asynchronous data handler that, when the node receives a transport frame with asynchronous data written in the asynchronous data region by a node other than the node, retrieves the asynchronous data from the asynchronous data region and transmits the transport frame to the next node without changing the data in the asynchronous data region; and a third asynchronous data handler that, when the node receives a transport frame with asynchronous data written in the asynchronous data region by the node, and asynchronous data to be transmitted does not remain in the node, transmits the transport frame to the next node after writing the free token into the asynchronous data region.

In such a network system, it is preferable that two or more of the transport frames exist along the ring transmission route at a time, and each of the nodes constituting the network system performs detection and writing of the free token, and writing and retrieving of the asynchronous data by the first to third asynchronous data handler independently for each of the transport frames existing along the ring transmission route.

The above and other objects, features and advantages of the invention will be apparent from the following detailed description which is to be read in conjunction with the accompanying drawings.

BRIEF DESCRIPTION OF THE DRAWINGS

FIG. 2 is an illustration showing a configuration example of the TL frame transported through transmission routes shown in FIG. 1A to FIG. 1C;

FIG. 3A to FIG. 3C are illustrations respectively showing more detailed configurations of a waveform data region, an Ethernet frame region, and an ITL frame region in the TL frame shown in FIG. 2;

FIG. 4A and FIG. 4B are illustrations showing data configurations of ITL frames;

FIG. 5 is a chart showing a transport timing of the TL frame shown in FIG. 2;

FIG. 6 is an illustration showing the transport states of the TL frame shown in FIG. 2 in a single mode audio signal transportation on the audio network system;

FIG. 11 is a table showing an example of the topology table;

FIG. 16 is an illustration showing a concrete example of a procedure of forming the audio network system;

FIG. 17 is an illustration showing continuation of the procedure in FIG. 16;

FIG. 20 is an illustration showing yet another example thereof;

FIG. 23 is a diagram showing the configuration of a buffer in which the TL frame is stored in a master node;

DETAILED DESCRIPTION OF THE PREFERRED EMBODIMENTS

Hereinafter, preferred embodiments to embody the invention will be concretely described based on the drawings.

1. Outline of Audio Network System of Embodiment of the Invention 1.1 Entire Configuration FIG. 1A to FIG. 1C show the outline of an audio network system that is an embodiment of a network system of the invention.

Figure 1A:
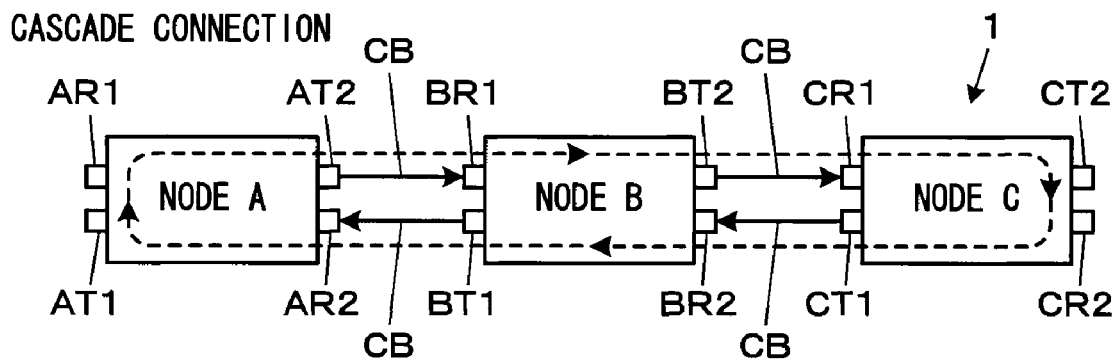
FIG. 1A to FIG. 1C are diagrams showing the outline of an audio network system that is an embodiment of a network system of the invention.
Figure 1B:
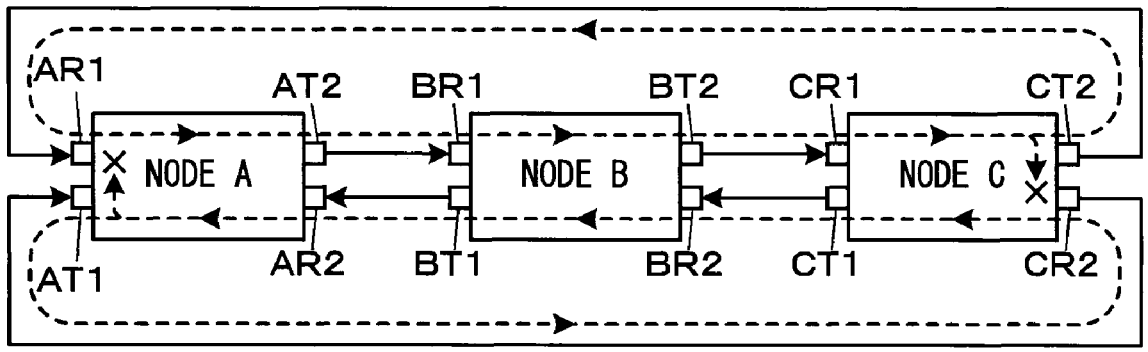
Figure 1C:
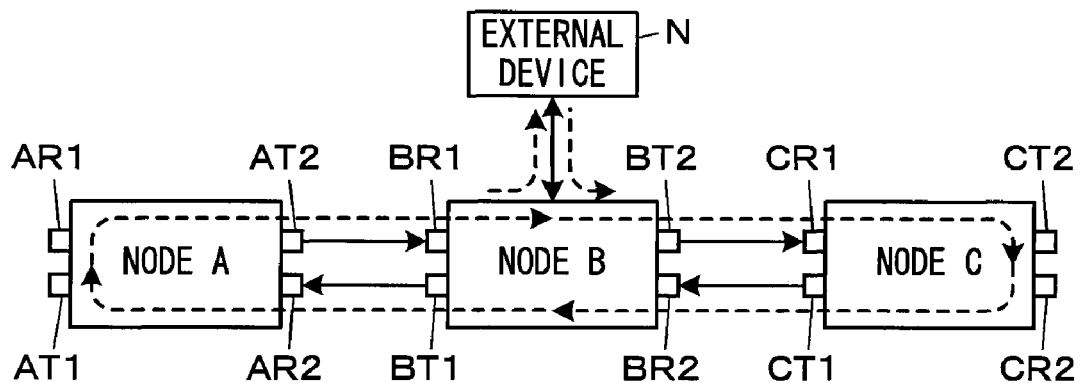

As shown in FIG. 1A and FIG. 1B, the audio network system 1 is constructed by connecting nodes A to C by communication cables CB in sequence, each of the nodes A to C including two sets of reception interfaces (I/Fs) being receivers and transmission I/Fs being transmitters each of which performs communication in a singe direction. Although an example composed of three nodes is shown, any number of nodes may be employed.

In the node A, a reception I/F AR1 and a transmission I/F AT1 are one set of I/Fs, and a reception I/F AR2 and a transmission I/F AT2 are another set of I/Fs. For the nodes B and C, the same relation also applies to I/Fs with a first character of symbol "B" or "C" in place of "A."

The connection between the nodes is established by connecting one set of reception I/F and transmission I/F to one set of transmission I/F and reception I/F of another node via the communication cables CB, respectively. For example, between the node A and the node B, the reception I/F AR2 is connected with the transmission I/F BT1, and the transmission I/F AT2 is connected with the reception I/F BR1. Further, between the node B and the node C, another set of I/Fs in the node B are connected with one set of I/Fs in the node C.

Note that the nodes shown in FIG. 1A to FIG. 1C are audio signal processors having various kinds of functions such as analog input, analog output, digital input, digital output, mixing, effect addition, recording/reproduction, remote control, or combinations thereof. It is of course adoptable that each node has a different function.

The state in which the nodes are connected as one line having ends as shown in FIG. 1A shall be called "cascade." In this case, the cables CB connecting between the nodes can be used to form one ring data transmission route as shown by a broken line, so that each node can perform transmission/reception of data to/from any node on the route by transmitting a frame over the route in a manner to circulate it in a constant period and reading/writing necessary information from/into the frame. The operation mode in which the one ring data transmission route is constructed in the system shall be called a "single mode."

In the audio network system 1, one node becomes a master node, which generates a frame for transporting audio signals, periodically circulates the frame over the transmission route, and manages the network. The frame generated by the master node shall be called a "TL (Transporting Lorry) frame" distinguished from other frames.

Connecting I/Fs which are not used in the nodes at both ends by using communication cables CB in addition to the cascade shown at FIG. 1A, two ring data transmission routes can be formed as shown in FIG. 1B. Each of the nodes can perform transmission/reception of data to/from any node on the routes by transporting a frame over the routes and reading/writing necessary information from/into the frame. The connection status among the nodes shall be called a "loop connection." The operation mode in which the two ring data transmission routes are constructed in the system shall be called a "twin mode."

In the audio network system 1, however, the single mode is the basic operation mode, and whether the operation in the twin mode is permitted or not is set in the master node in advance. If the setting that the operation in the twin mode is not permitted has been made in the master node, the operation in the single mode is continued even if the loop connection is made as described later. Accordingly, the connection status and the operation mode do not always correspond to each other.

Further, although two cables are shown in FIG. 1A to FIG. 11C, one cable which is made by bundling the two cables together can also be used to establish connection between one set of I/Fs, as long as the reception I/F and transmission I/F in one set are adjacently or integrally provided.

Further, when each node is provided with a necessary I/F, an external device N can be connected thereto as shown in FIG. 11C so that the node can write data received from the external device N into the TL frame and transmit the TL frame to another node and to transmit the data read out from the TL frame to the external device N.

As such an external device N, for example, an external console is conceivable. It is also conceivable that the console transmits a command in accordance with an operation accepted from a user, to the node B, thereby causing operations such that the node B writes the command into the TL frame and transmits it to another node, or the node B reads out a response, level data or the like which has been written into the TL frame and transmitted by the another node, and transmits it to the console, so as to use it for display of the state of a control or level display in the console.

1.2 Configuration of TL Frame

Next, a configuration example of the TL frame that is transported through the above-described transmission routes is shown in FIG. 2. FIG. 3A to FIG. 3C respectively show more detailed configurations of a waveform data region, an Ethernet frame region, and an ITL (Initial Transporting Lorry) frame region in the TL frame. Note that the widths of the regions shown in these drawings do not necessarily correspond to data sizes.

As shown in FIG. 2, the TL frame 100 has a size of 1282 bytes, and is composed of regions such as a preamble 101, management data 102, waveform data (audio data) region 103, control data region 104, and FCS (Frame Check Sequence) 105 in sequence from the head. The size of each region is fixed irrespective of the data amount to be written in the region. Further, the sizes of the regions other than the FCS 105 shown here are just examples and may be changed as required.

The preamble 101 is data of 8 bytes in total, in which preamble defined by IEEE (Institute of Electrical and Electronic Engineers) 802.3 and SFD (Start Frame Delimiter) are written.

Note that it is not so worthwhile to write the address in the audio network system 1 because the frame transmitted from a transmission I/F arrives only at the reception I/F which is connected by one communication cable CB. Hence, it is not necessary to write a destination address in the TL frame 100, and therefore the region to write the destination address is not provided here.

Further, the management data 102 is data of 8 bytes, in which a frame type for discriminating the kind of the frame, a ring ID indicating the transmission route in the system through which the frame circulates, a frame ID that is a frame serial number, the number of channels of the waveform data in the waveform data region 103 and so on are written as the data to be used in management of data written in the TL frame by each node in the audio network system 1. As the frame type, data indicating that the frame is the TL frame is written. When the twin mode is not permitted, there is only one transmission route in the system, and the ring ID therefore has a fixed value.

As the waveform data region 103, 1024 bytes are secured, and waveform data of 32 bits for 1 sample can be written for 256 channels as data of audio signals. In other words, in this system, the audio signals corresponding to the 256 channels can be transmitted by circulating one TL frame 100. Note that it is not necessary to concern about what is written in regions of channels not in use for transmission (empty channels) in the 256 channels. In this embodiment, even when the number of bits of the waveform data to be transmitted is not 32 but, for example, 16 or 24, the 32-bit region is prepared for each channel to write the waveform data therein. However, the size of the regions for each channel may be changed depending on the number of bits of the waveform data. In this case, the 16-bit waveform data of 512 channels can be transmitted, and the 24-bit waveform data of 340 channels can be transmitted.

As shown in FIG. 3A, channels in the waveform data region 103 are allocated in advance to the nodes constituting the audio network system 1, and each of the nodes writes output waveform data at positions of the channels that have been allocated to the node. The allocation of the channels is performed by a controller (for example, a control CPU in any of the nodes, or the external device shown in FIG. 1C) which controls the whole system, and the allocation can be changed when necessary while the system is operating. It is not always necessary to allocate channels at contiguous positions to the nodes, and it is also adoptable to keep empty channels which are not allocated to any nodes.

On the other hand, as the control data region 104, 238 bytes are prepared, in which an Ethernet frame region 106, an ITL frame region 107, and a management data region 108 are provided.

In the Ethernet frame region 106 among the regions, a frame in the IEEE (Institute of Electrical and Electronic Engineers) 802.3 format (an Ethernet frame) that is obtained by framing the IP packet for inter-node communication based on the IP (Internet Protocol) is written.

If the Ethernet frame to be written exceeds the prepared size (178 bytes, here), the Ethernet frame is divided into a necessary number of blocks on the transmission side processor, and each of the blocks is written into one TL frame. Then the above described necessary number of TL frames are transported to the destination, and the destination processor reads out respective blocks from the respective TL frames 100 and combines the blocks together to restore the Ethernet frame before division, whereby the Ethernet frame can be transported between the nodes in a similar manner to the regular transport based on the Ethernet (registered trademark).

The maximum size of the IEEE 802.3 frame is 1526 bytes. On the other hand, about 170 bytes can be transmitted for each one TL frame even if division control data of several bytes is added for controlling division and restoration. Accordingly, transmission of one Ethernet frame is completed by nine TL frames at maximum.

Details of data to be written into the Ethernet frame region 106 are shown in FIG. 3B.

Among those data, number of blocks is data indicating how many blocks a frame to be transmitted has been divided.

Block ID is data indicating the position (number) of the block written in the Ethernet frame region 106 among the divided blocks.

Transmission source ID is data indicating the node which has written data into the Ethernet frame region 106. A later-described free token can be written as a specific value of the transmission source ID. The transmission source ID can be written using a MAC address of the processor. Note that each processor being each of the nodes in the audio network system 1 includes the transmission I/Fs and the reception I/Fs two each, which do not have discrete MAC addresses respectively but have one MAC address as one processor.

Data size is data indicating the size of frame data which has been written in the block.

Frame data is data of the Ethernet frame to be transmitted. Though some empty region remains at the tail of the frame data region in the final block, there is no problem because only the region in which meaningful data has been written can be read out on the reception side according to the information of the data size.

In the ITL frame region 107, data of an ITL frame to be used for transport of a command and a response to the command between adjacent nodes is written. This ITL frame is used for data transfer in an initial period of forming the system and also for data transfer after the system is formed as will be described later.

If the ITL frame to be written exceeds the prepared size (50 bytes, here), the ITL frame is divided into a necessary number of blocks on the transmission side processor, and each of the blocks is written into one TL frame, and the destination processor combines the blocks together to restore the ITL frame before division, as in the case of the Ethernet frame region 106.

Details of data to be written into the ITL frame region 107 are shown in FIG. 3C.

Number of blocks, block ID, data size, frame data, and an empty region in this drawing has the same use as those in the case of the above-described Ethernet frame region 106.

However, the ITL frame is essentially used for data transportation to an adjacent node. Even when the ITL frame is transferred some node beyond the adjacent node, transportation is performed in such a manner that a node existing between the origin node and the destination node once receives, refers to the frame and then transmits a frame having the same contents, as a conduit, to the next node as will be described later. Accordingly, the node which has written data into the ITL frame region 107 is always the node adjacent to the node which receives the TL frame (the node directly connected to the reception I/F into which the TL frame has been inputted). Therefore, it is unnecessary to write the transmission source node ID into the ITL frame region 107 (however, as data indicating the origin node and the destination node, MAC addresses of the two nodes are written into the ITL frame itself as will be described later).

The management data region 108 is a region into which data that is used for management of data contained in the TL frame by each of the nodes in the audio network system 1 is written. The data to be written into the management data region 108 include, for example, a break detection flag SDF indicating that the TL frame 100 has been broken during transport, an error flag EDF indicating that an error has occurred during transport of the TL frame 100, level data that is used for level display, and so on.

Note that the reason why the dedicated regions for writing the ITL frame and the management data are provided (10 bytes each, here) in the control data region 104 is to steadily transmit those kinds of data.

The FCS 105 is a field for detecting an error of the frame, defined by IEEE 802.3.

Next, the data configurations of the ITL frame are shown in FIG. 4A and FIG. 4B.

There are two types of formats for the ITL frame, and among them, the normal format shown in FIG. 4A is a format for the ITL frames written into the above-described ITL frame region 107 of the TL frame 100. The format shown in FIG. 4B is a format for the ITL frame for a special use.

An ITL frame 110 in the normal format shown in FIG. 4A is composed of regions such as a preamble 111, a frame type 112, a data size 113, an origin ID 114, a destination ID 115, a transmission source port 116, a command type 117, a parameter 118, dummy data 118a, and an FCS 119.

The formats for the preamble 111 and the FCS 119 among them are the same as those of the TL frame 100 shown in FIG. 2.

The frame type 112 is data having the same use as the frame type written in the TL frame 100 as the management data 102. However, data indicating that this frame is the ITL frame is written as the frame type 112.

Assuming that the frame type is written into the bytes at the head of the management data 102 in the TL frame 100, the preamble 111, the frame type 112, and the FCS 119 in the ITL frame 110 are in common formats with the corresponding regions in the TL frame 100.

The data size 113 is data indicating size of data written in the frame except the dummy data 118a.

The origin ID 114 is MAC address of a processor which originated the ITL frame 110.

The destination ID 115 is MAC addresses of a destination processor of the ITL frame 110.

The transmission source port 116 is data indicating the transmission I/F among the plurality of transmission I/Fs included in each node from which the node has transmitted the ITL frame 110.

The command type 117 is a command ID indicating which command (or response) the ITL frame 110 transports. Some examples of the command will be described later.

The parameter 118 is data of parameters for the command. The format thereof differs depending on the command type.

The dummy data 118a is data having no specific meaning, for making the frame length constant.

A special ITL frame 120 shown in FIG. 4B is composed only of a preamble 111, a frame type 112, and an FCS 119. The formats for those data are the same as those of the ITL frame 110. The frame type 112 in the ITL frame 120 is data indicating the use of the frame.

The ITL frame 120 in such a format is used in the audio network system 1, for some special uses such as measurement of a distance between nodes and notification of disconnection as will be described later. Hence, "110" will be used as the reference number of the ITL frame hereinafter. However, also the ITL frame 120 can be handled similarly to the ITL frame 110 unless otherwise stated.

1.3 Method of Transmitting TL Frame

Next, a transport timing of the TL frame 100 shown in FIG. 2 is shown in FIG. 5.

As shown in this drawing, in the audio network system 1, one TL frame 100 is circulated among the nodes every 10.4 μsec (microseconds) that is one period of a sampling period of 96 kHz, and each node writes the audio signals into a desired channel of the TL frame or reads the audio signals from a desired channel. Accordingly, one sample of the waveform data can be transported between the nodes for each of the 256 channels in each sampling period.

When data transfer in the Ethernet (registered trademark) system of 1 Gbps (gigabit per second) is employed, the time length of the TL frame 100 is 1 nanosecond×8 bits×1282 bytes=10.26 μsec, so that the transmission of the TL frame 100 from the master node is completed in one sampling period.

Note that the TL frame having 1282 bytes is adaptable for a sampling period up to 1 sec/10.26 μsec=97.47 kHz, and a frame size up to 10.4 μsec/8 bits/1 nanosecond=1300 bytes can be adaptable for sampling frequency of 96 kHz, in terms of calculation with neglecting intervals between the frames. However, since an empty interval of a predetermined time period or more is necessary between the frames and the transmission timing of the frame can advance or delay, the size (time length) of the TL frame is determined upon consideration of these situations.

Next, states of the TL frame shown in FIG. 2 during transport of the audio signals (in the audio transport mode) on the audio network system 1 are shown in FIG. 6. Examples in the single mode are shown in FIG. 6.

An audio network system in which four nodes, the node A to the node D, are cascaded is discussed here. When the TL frame 100 shown in FIG. 2 is circulated through the nodes in the system, any one of the nodes is determined as a master node, and only that master node generates the TL frame in a new sampling period (a TL frame with a different serial number) and transmits the TL frame generated in each sampling period to the next node. The nodes other than the master node are slave nodes which perform transfer process of receiving the TL frame from their respective preceding nodes and transmitting it to the respective next nodes.

When the master node B first transmits the TL frame, rightward in the drawing, toward the node C in accordance with the timing of a wordclock, the TL frame is transported to the nodes B, C, D, C, B, A, and B in order as shown by the broken line and thus returned to the node B. As seen from the master node, the side on which the master node first transmits the circulating TL frame is called a forward side, and the side on which the master node secondly transmits it is called a backward side. While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

When the TL frame returns after circulating through the transmission route, the master node overwrites the management data 102 of the TL frame to generate the TL frame in the later sampling period, and provides it to transmission in an appropriate sampling period. In this event, the master node also reads/writes data from/to the TL frame as with the other nodes. The generation of the TL frame will be described later in detail.

By repeating the above, one TL frame can be circulated for one sampling period, among the nodes as shown in (a) to (e) in time sequence. In these drawings, a black arrow shows the head of the TL frame, a black circle shows the end of the TL frame, and a bold line connected to the black arrow and/or the black circle shows the TL frame itself. The arrow of a line connected to the bold line is indicating the return of the TL frame to the master node after circulating through the transmission route.

Note that each slave node receiving the TL frame, before the node completes receiving all the TL frame (from the head to the tail), starts to read/write data from/to the TL frame from the head and transmit the TL frame from the head to the next node at a timing when the node has received necessary bytes of the TL frame from the head. Thereafter, the slave node reads/writes and transmits the TL frame to the end at substantially the same speed as the node receives the TL frame. On the other hand, the master node receives all the TL frame and then generates a new TL frame based on the contents of the received frame as will be described later.

In the single mode, the TL frame flashes through each of the nodes other than nodes at both ends in the network system twice in one circulation, but the node reads/writes data other than the data of the ITL frame region 107 from/to the TL frame on only one occasion of them. On which occasion the node reads/writes audio data is selectable. In one case, the node reads/writes audio data at the first time when the frame flashes through the node. In another case, the node reads/writes audio data at the time when the frame flashes through the node rightward in the drawing. When the node does not read/write audio data from/to the TL frame, the node overwrites only the transmission source address and later-described presence confirmation information in the TL frame and transmits the frame to the next node.

Regarding ITL frame, it is preferable that the ITL frame can be transmitted to adjacent nodes in both directions. Hence here, each node transmits the TL frame after writing data of the ITL frame to be transmitted to the right side adjacent node (or a node beyond the adjacent node) into the ITL frame region 107 when the TL frame flashes through rightward in the drawing, whereas the node transmits the TL frame after writing data of the ITL frame to be transmitted to the left side adjacent node (or a node beyond the adjacent node) is written into the ITL frame region 107 when the TL frame flashes through leftward in the drawing.

Since each node needs to perform buffering at the time of receiving the TL frame, in order to overwrite the data of the TL frame or to absorb the difference in frequency and timing between the network clock on the receiving side (corresponding to the operation clock of the transmission source node) and the network clock on the transmitting side (corresponding to the operation clock of that node), there is a time lag between the timing when the node starts to receive a TL frame and the timing when the node starts to transmit the received frame.

The transport delay of the audio signals transported over the network is in the unit of sampling period and is minimal in a condition that the TL frame transmitted by the master node at a timing of a wordclock in S-th period returns to the master node, after circulating the transmission route, at a timing earlier than a wordclock in (S+2)-th period by a predetermined time a (corresponding to a time necessary to generate a new TL frame in (S+2)-th period based on the received frame in S-th period).

As will be described later, in this case, for example, the (S+2)-th TL frame which will be transmitted 2 sampling periods later is generated based on the S-th TL frame.

However, it is not essential to generate the TL frame which will be transmitted 2 sampling periods later, but it is also possible to generate the (S+k)-th TL frame which will be transmitted k sampling periods later based on the S-th TL frame, wherein the k is positive integer being not less than 2. In this case, the k shall be called a "periodic update value k."

Generally, by configuring such that the master node can complete reception of the TL frame whose transmission has been started by the master node at a certain timing of a wordclock, at a timing before the k sampling periods later wordclock by a predetermined time a according to the value of k, the transmission of the audio signals is possible. Accordingly, even when the number of nodes in the network system is increased and the circulation time from the timing when the master node transmits a TL frame to the transmission route to the timing when the same frame returns to the master node after passing through the transmission route is thus increased, the network system can operate by increasing the value of k. Thus, the value of k defines a time limit of the circulation time of the TL frame in the network system.

The periodic update value k can be arbitrarily set by the master node and the value is transferred to all of the nodes in the system by broadcasting a parameter setting frame indicating the setting of the periodic update value k or the like.

However, since the timings of using (outputting to some blocks) the audio signals received by the nodes are synchronized each other in this system, when the k is increased to extend the time limit of the circulation time (the time limit is variable in the unit of the wordclock), the transport delay of the audio signals is also extended correspondingly on the wordclock basis.

In this system, by performing data transport in the above-described method, a fixed transport bandwidth according to the size of the TL frame in the network can be secured at all times, independent of the number of nodes in the network system as long as the circulation time is in the limit. The bandwidth is not affected by the magnitude of the data transport amount between specific nodes.

In the twin mode, as is clear from FIG. 1A to FIG. 1C, two transmission routes will be formed. In one transmission route, a TL frame generated and transmitted rightward by the master node B is transported from the node B to the nodes C, D, A, and B in order, and in the other transmission route, a TL frame generated and transmitted leftward by the master node B is transported from the node B to the nodes A, D, C, and B in order. While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

In the twin mode, since the TL frame flashes through each of the nodes in the network system once in one circulation through the transmission route, the node reads/writes data from/to the TL frame during the one flash.

The audio network system 1 can selectively perform, as a whole, duplex communication in which the same data is written into the TL frames circulating through the two transmission routes, and double communication in which different data are written into the TL frames circulating through the two transmission routes.

In the case of the duplex communication of them, because the same data is written into the TL frames on the two transmission routes, the data amount transportable per sampling period, that is, the bandwidth of communication is the same as the bandwidth in the case of the cascade connection. However, even if a break of wire occurs at one location, the system immediately can shift to the transport by cascade connection to keep the data transport in the same bandwidth. It is also possible to compare the substance in the TL frames on the two transmission routes to thereby confirm whether or not the data is correctly transported.

On the other hand, in the case of the double communication, because the two pieces of data per sampling period can be transported, the bandwidth of communication can be made twice the bandwidth of the cascade connection.

Which one of the duplex communication and double communication is performed may be set in the master node in advance.

1.4 Hardware Configuration and Basic Operation of Processors Constituting System Next, the hardware for transporting the TL frame as has been described above and its operation will be described.

Figure 7:
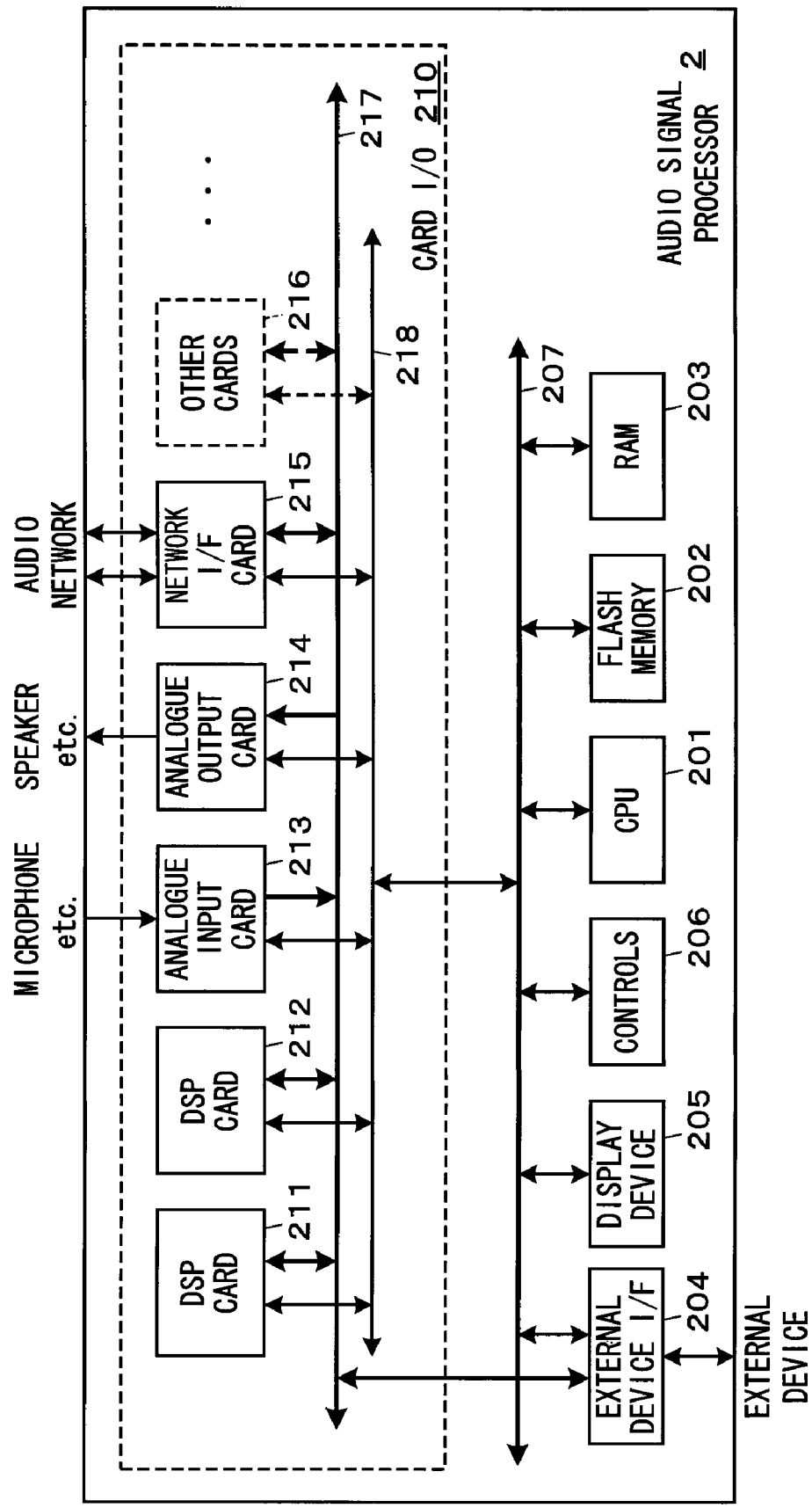
FIG. 7 is a diagram showing the hardware configuration of an audio signal processor which is to be each of the nodes constituting the audio network system shown in FIG. 1A to FIG. 1C.

The hardware configuration of an audio signal processor that is each of the nodes constituting the above-described audio network system 1 is shown in FIG. 7.

As shown in FIG. 7, the audio signal processor 2 includes a CPU 201, a flash memory 202, a RAM 203, an external device I/F (interface) 204, a display device 205, and controls 206, which are connected via a system bus 207. The audio signal processor 2 further includes a card I/O (input/output section) 210 connecting the external device I/F 204 and the system bus 207.

The CPU 201, which is a controller that comprehensively controls the audio signal processor 2, can execute a required control program stored in the flash memory 202, thereby controlling display on the display device 205, setting the value of the parameter according to the manipulation of the control 206, controlling the operation of each module, transmitting a command to another audio signal processor via the card I/O 210, and performing process according to the command received from the other audio signal processor via the card I/O 210.

The flash memory 202 is a overwritable non-volatile memory that stores data which should be left even after the power is turned off, such as the control program executed by the CPU 201.

The RAM 203 is a memory that is used to store data which should be temporarily stored and used as a work memory of the CPU 201.

The external device I/F 204 is an interface for connecting various kinds of external devices to perform inputting/outputting, for example, an external display, a mouse, a keyboard for inputting characters, a control panel, a PC (personal computer), and the like.

The external device I/F 204 is also connected to an audio bus 217 of the card I/O 210 and can transmit the waveform data flowing through the audio bus 217 to the external device and input the waveform data received from the external device into the audio bus 217.

The display device 205 is a display device for displaying various kinds of information according to control by the CPU 201, and can be composed, for example, of a liquid crystal display (LCD), a light emitting diode (LED), or the like.

The controls 206 are used for accepting the manipulation to the audio signal processor 2 and can be composed of various keys, buttons, dials, sliders, and the like.

The card I/O 210 is an interface including the audio bus 217 and a control bus 218, and making it possible to input/output the audio signals and the control signal to/from the audio signal processor 2 and perform process on them by attaching various kinds of card modules to these buses. The card modules attached thereto transmit/receive the waveform data to/from each other via the audio bus 217 and transmit/receive the control signal to/from the CPU 201 via the control bus 218 to be controlled by the CPU 201.

The audio bus 217 is an audio signal transporting local bus which transports the waveform data of a plurality of channels from an arbitrary card to an arbitrary card sample by sample in a time division manner at a sampling period based on the wordclock. Any one of the plurality of connected cards becomes a master, and the reference timing for the time division transport of the audio bus 217 is controlled based on the wordclock generated and supplied by that card. The other cards become slaves and generate wordclocks of the cards based on the reference timing.

More specifically, the wordclock generated in each card is a common clock in synchronization with the wordclock of the card which has become the master, and a plurality of cards in a node process the waveform data at a common sampling frequency. Each card further transmits and receives the waveform data processed based on its own wordclock and the waveform data which should be processed, to/from the other card via the audio bus 217 at a time division timing based on the above-described reference timing.

FIG. 7 shows an example in which DSP (digital signal processor) cards 211 and 212, an analog input card 213, an analog output card 214, and a network I/F card 215 are attached to the card I/O 210.

Each of the various cards attached to the card I/O 210 executes process on the waveform data according to the function of that card at a timing based on the wordclock (sampling period of the waveform data).

The DSP cards 211 and 212 of them are signal processors which perform various kinds of process including mixing, equalizing, and effect addition on the waveform data acquired from the audio bus 217 at a timing based on the wordclock. They output the processed data to the audio bus 217. They can further accept inputs of the waveform data of a plurality of channels and process the waveform data and then output the waveform data of a plurality of channels.

The analog input card 213 includes an A/D (analog/digital) conversion circuit and has a function of converting the analog audio signals inputted from the audio input device such as a microphone to digital waveform data and supplying it to the audio bus 217. The analog input card 213 can process the signals of a plurality of channels in parallel.

The analog output card 214 includes a D/A (digital/analog) conversion circuit and has a function of converting the digital waveform data acquired from the audio bus 217 to analog audio signals and outputting them to the audio output device such as a speaker or the like.

The network card I/F 215 includes two sets of transmission I/Fs and reception I/Fs and has a function of performing transport of the TL frame 100 and the ITL frame 110 which have been described using FIG. 1A to FIG. 6 and a function of reading/writing the waveform data, the control data, and the like from/to the TL frame 100. Details thereof will be described later. It is also possible to attach a plurality of network I/F cards to the card I/O 210, and each network I/F card can be connected to a different audio network. In this case, the audio signal processor 2 performs the operation as a bridge to connect the plurality of audio networks.

In addition to the aforementioned, it is conceivable that various kinds of card modules such as a digital input/output, a sound source, a recorder, an effector, and so on can be attached as other cards 216.

Note that the cards attached to the card I/O 210 as described above perform process on the audio signals according to the common wordclock, and when the audio signal processor 2 is the master node, any one of the attached cards supplies the wordclock to the other cards including the network I/F card 215, and the network I/F card 215 transmits, as the master node, a TL frame in each sampling period. When the audio signal processor 2 is a slave node, the network I/F card 215 generates (reproduces) the wordclock based on the reception timing of the TL frame and supplies the wordclock to the other cards attached to the card I/O 210.

Figure 8:
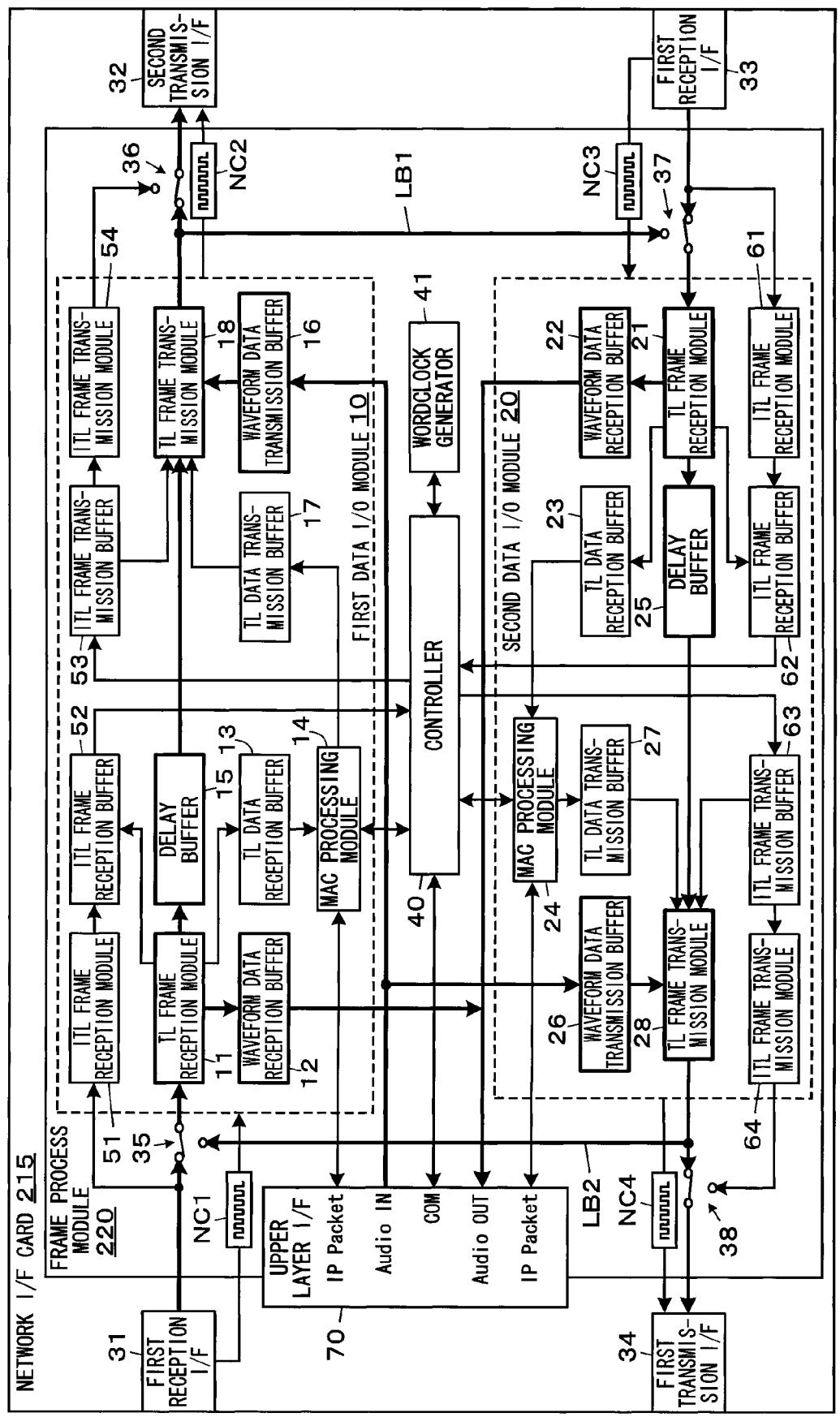
FIG. 8 is a diagram showing the configuration of the network I/F card shown in FIG. 7 in more detail.

Next, the configuration of the network I/F card 215 is shown in more detail in FIG. 8.

As shown in FIG. 8, the network I/F card 215 includes first and second reception I/Fs 31 and 33 and first and second transmission I/Fs 34 and 32 for transmitting or receiving the frames, and also includes a frame process module 220 which performs process relating to data transmission/reception using frames, and an upper layer I/F 70 that is an interface to/from portions of the audio signal processor 2 other than the I/F card 215.

Among them, the first and second reception I/Fs 31 and 33, and the first and second transmission I/Fs 34 and 32 are communication devices corresponding to the two sets of reception I/Fs and transmission I/Fs shown in FIG. 1A to FIG. 1C, each including a predetermined connector (a female side) for connecting a communication cable thereto. For connection of the communication cable, the first reception I/F 31 and the first transmission I/F 34 shall be one set, and the second transmission I/F 32 and the second reception I/F 33 shall be one set. These I/Fs can be I/Fs which perform data communication by any communication system as long as they have enough ability for transport of the TL frame in the above-described one sampling period, and an I/F performing data transfer by the Ethernet system of 1 Gbps is employed here.

Currently, the 1G Ethernets include two kinds, such as 1000BASE-T using a CAT5e cable with an RJ45 connector (an unshielded twisted pair cable) as the communication cable CB, and 1000 BASE-X using an optical fiber or an STP cable (a shielded twisted pair cable), any of which can be used in this embodiment. Further, broadband network technologies other than the 1G Ethernet may be used. For example, they are FiberChannel, SDH (Synchronous Digital Hierarchy)/SONET (Synchronous Optical NETwork) and so on.

The reception I/F extracts the network clock being a carrier from an electric signal or an optical signal propagating through the communication cable CB, and demodulates and outputs a data stream of the digital data in a byte unit (or word unit) from the electric signal or the optical signal based on the extracted clock. The transmission I/F receives the network clock and the digital data stream in a byte unit (or word unit) which should be transmitted, and modulates it to an electric signal or an optical signal for transport using the network clock as a carrier and outputs it to the communication cable CB.

The upper layer I/F 70 is an interface for inputting/outputting data from/to the audio bus 217 and the control bus 218 shown in FIG. 7.

The upper layer I/F 70 includes five data input/output ports. Two IP_Packet ports of them are used for inputting/outputting, via the control bus 218, an IP packet included in the Ethernet frame read out from the Ethernet frame region 106 of the TL frame 100, and an IP packet which is packed into an Ethernet frame, written into the Ethernet frame region 106 of a generated Ethernet frame and transmitted to another node.

A COM port is a port for transmitting/receiving, via the control bus 218, a command and data between a controller 40 on the side of the network I/F card 215 and the CPU 201 on the side of the audio signal processor 2 being the main body.

An Audio_In port and an Audio_Out port are ports for inputting/outputting waveform data via the audio bus 217.

On the other hand, the frame processing module 220 roughly has first and second data input/output modules 10 and 20, selectors 35 to 38, the controller 40, and a wordclock generating module 41.

The controller 40 has a CPU, a ROM, a RAM and the like and performs general control relating to the operation of the network I/F card 215 and control relating to a command and a response transmitted using the ITL frames as will be described later. The controller 40 further has a function of acquiring, from the CPU 201 on the main body side that is communicable via the control bus 218, setting information necessary for the operation of the network I/F card 215 such as the MAC address of the audio signal processor 2, the operation mode (master/slave, only single mode/twin mode available, and the like) and so on.

The controller 40 also manages a later-described topology table that shows the connection order of nodes.

The wordclock generator 41 is a wordclock generating device that generates the wordclock being the reference of timings for the transfer of the waveform data in the audio bus 217 and the signal data processing in the various kinds of card modules connected to the audio bus 217.

The wordclock generator 41 in the master node generates the wordclock at its own timing of the network I/F card 215 or a timing in synchronization with the wordclock supplied via the audio bus 217 from the other card, and uses the clock as the reference of the transmission timing of the TL frame 100, whereas a wordclock generating module 41 in the slave node generates the wordclock using the reception timing of the TL frame as a reference.

Each of the first and second data input/output modules 10 and 20 operates based on the operation clock generated by a not-shown operation clock generating module, and functions as a reader that reads desired data from the TL frame 100 received by a corresponding reception I/F, and a writer that writes desired data into the received TL frame 100. Each of the first and second data input/output modules 10 and 20 further has a function of directly transmitting/receiving the ITL frame 110 (without writing into the TL frame 100) to/from a node for which a transmission route through which the TL frame 100 circulates has not been established yet. The functions of these first and second data input/output modules 10 and 20 are identical, and therefore the first data input/output module 10 will be described as representative.

The first input/output module 10 includes a TL frame reception module 11, a waveform data reception buffer 12, a TL data reception buffer 13, a MAC processing module 14, a delay buffer 15, a waveform data transmission buffer 16, a TL data transmission buffer 17, a TL frame transmission module 18, an ITL frame reception module 51, an ITL data reception buffer 52, an ITL data transmission buffer 53, and an ITL frame transmission module 54. The transmission and reception modules and buffers among them are operated on a FIFO (first-in and first-out) basis in which firstly written data is firstly read out.

Among the above described modules, the TL frame reception module 11 has a function of reading data from a received TL frame 100 and storing the received TL frame 100 into the delay buffer 15, and the ITL frame reception module 51 has a function of reading data from a received ITL frame 110.

The TL frame reception module 11 and the ITL frame reception module 51 receive a network clock NC1 extracted as a carrier by the first reception I/F 31 and accept the data from the first reception I/F 31 in synchronization with the network clock NC1. However, the TL frame reception module 11 accepts the data from the first reception I/F only when the selector 35 selects the first reception I/F side.

It is clear which frame the data received from the first reception I/F 31 relates to, by referring to the frame type in each frame which has been described using FIG. 2 and FIG. 4A and FIG. 4B. Therefore, each of the TL frame reception module 11 and the ITL frame reception module 51 only needs to read frames which the TL frame reception module 11 or the ITL frame reception module 51 should process, and discard other frames. The ITL frame reception module 51 will receive data of all frames, but discard unnecessary frames other than the ITL frames 110 and 120 without processing the frames.

The function of the first data input/output module 10 relating to the transmission/reception of the ITL frame 110 will be described first.

When receiving the ITL frame 110, the ITL frame reception module 51 writes the data of the ITL frame 110 into the ITL data reception buffer 52, and then it is confirmed that there is no error in the frame, and the frame is outputted to the controller 40. The controller 40 performs process (including process of transferring commands which are not addressed to the processor itself) according to the command written in the frame.

The ITL data transmission buffer 53 is a buffer for storing data of the ITL frame 110 which should be transmitted to a node connected to the second transmission I/F 32, and writing of the data into the ITL data transmission buffer 53 is performed by the controller 40.

When the selector 36 selects the ITL frame transmission module 54 side, the ITL frame transmission module 54 reads the ITL frame 110 stored in the ITL data transmission buffer 53 at an appropriate timing, and supplies the read ITL frame 110 to the second transmission I/F 32 and causes the second transmission I/F 32 to transmit the ITL frame 110 to a node connected thereto. When the selector 36 selects the TL frame transmission module 18 side, the ITL frame transmission module 54 performs no specific operation because the transmission of the ITL frame 110 stored in the ITL data transmission buffer 53 is performed by the TL frame transmission module 18.

The transmission/reception of the ITL frame 110 by the ITL frame reception module 51 and the ITL frame transmission module 54 is performed on the frame basis without dividing the frame into blocks.

By using the functions of the above-described modules, the network I/F card 215 can perform communication to adjacent nodes using the ITL frame 110 through the transmission route rightward in FIG. 8. For the communication through the transmission route leftward in FIG. 8, the second data input/output module 20 is used.

The functions of the first data input/output module 10 relating to the transmission/reception of the TL frame 100 will be described next.

The TL frame reception module 11 has functions of, when receiving the data of the TL frame 100, writing waveform data of transport channels which should be read among the received data, into the waveform data reception buffer 12, writing the data in the ITL frame region 107 into the ITL data reception buffer 52, and writing the data in the Ethernet frame region 106 and the management data which should be read, into the TL data reception buffer 13.

If a data error or the like is detected, writing of the data into the buffers is not performed or the data which has been once written is altered sometimes, and such a case will be described later.

The TL frame reception module 11 further has a function of writing all the data of the received TL frame 100 also into the delay buffer 15.

The waveform data of each transport channel which has been written into the waveform reception buffer 12 is outputted to the AUDIO_Out port of the upper layer I/F 70 sample by sample in synchronization with the wordclock, and transported to the other cards via the audio bus 217.

The data which has been written into the ITL data reception buffer 52 is outputted to the controller 40 when data corresponding to one ITL frame is prepared, and the controller 40 performs process (including process of transferring commands which are not addressed to the processor itself) according to the command written in the frame.

The data of the Ethernet frame among the data which has been written into the TL data reception buffer 13 is outputted to the MAC processing module 14 when data corresponding to one Ethernet frame is prepared. When the MAC processing module 14 confirms that the Ethernet frame is addressed to the processor itself, the MAC processing module 14 takes out the IP packet from the Ethernet frame and outputs the IP packet to the IP_Packet port of the upper layer I/F 70, and the IP packet is passed to the CPU 201 on the main body side. The data other than the Ethernet frame, for example, metadata and the like are passed to the controller 40 via the MAC processing module 14 and then passed from the controller 40 to the CPU 201 on the main body side via the COM port of the upper layer I/F 70 when necessary.

For the waveform data, the controller 40 grasps at least the transport channel numbers of the waveform data which should be read out, therefore the controller 40 can calculate the byte positions of the waveform data in the TL frame 100 based on the channel number. Accordingly, the controller 40 indicates the positions to the TL frame reception module 11 and instructs the TL frame reception module 11 to write only the data at those calculated positions into the waveform data reception buffer 12.

Because the ITL frame region 107, the Ethernet frame region 106, and the management data are written in fixed positions in the TL frame, the TL frame reception module 11 only needs to read data from those fixed positions once, appropriately select data to be outputted to the controller 40 or the MAC processing module 14, and write the selected data into the ITL data reception buffer 52 or the TL data reception buffer 13. Alternatively, the TL frame reception module 11 may simply write all the data in the aforementioned fixed regions into the reception buffers so that the controller 40 classifies the data.

The method of classifying the data will be described later.

On the other hand, the waveform data transmission buffer 16 is a buffer which stores waveform data to be written into the TL frame 100 and outputted, and the upper layer I/F 70 outputs waveform data supplied from the audio bus 217 to be outputted, from the Audio-In port in each sampling period, and writes the waveform data into the waveform data transmission buffer 16. It is of course possible to write the waveform data corresponding to a plurality of transport channels, and it is only necessary to firstly write, into the waveform data transmission buffer 16, the data to be written into a byte close to the head of the TL frame. When the second data input/output module 20 is also used to read/write waveform data, the upper layer I/F 70 writes the waveform data which should be outputted, also to the waveform data transmission buffer 26, and the upper layer I/F 70 can naturally write different waveform data into the waveform data transmission buffer 16 and the waveform data transmission buffer 26.

The TL data transmission buffer 17 is a buffer which stores the data of the Ethernet frame and the management data which should be written in the TL frame and outputted, and the MAC processing module 14 writes, into the TL data transmission buffer 17, an Ethernet frame generated based on the IP packet outputted from the IP_Packet port of the upper layer I/F 70 to be transmitted and the control data supplied from the controller 40 to be outputted.

As has been described in the description on the transmission/reception of the ITL frame 110, the controller 40 writes, into the ITL data transmission buffer 53, the data of the ITL frame 110 which should be outputted to the node which is connected to the second transmission I/F 32.

In the case where the processor itself is a slave node, when a predetermined amount (a first predetermined amount) of data of the TL frame 100 is accumulated (stored) in the delay buffer 15 by the TL frame reception module 11, the TL frame transmission module 18 reads the accumulated data of the TL frame 100 from the head of the frame in accordance with progression of the accumulation, and accumulates the data into the buffer of the TL frame transmission module 18. In accordance with progression of the accumulation, the TL frame transmission module 18 writes the data from the waveform data transmission buffer 16, the TL data transmission buffer 17 and the ITL data transmission buffer 53 into appropriate addresses to thereby overwrite the contents of the TL frame 100. It is preferable that the overwrite is sequentially performed from the head of the frame so that the overwritten data is prepared before later-described transmission timings.

For the waveform data to be transported to other nodes, the controller 40 calculates the byte positions of the waveform data in the TL frame 100, based on the transport channel into which the waveform data should be written, and indicates it to the TL frame transmission module 18, and the TL frame transmission module 18 writes the waveform data supplied from the waveform data transmission buffer 16 into the indicated byte positions in the TL frame 100. Also for the Ethernet frame, the ITL frame and so on, the byte positions in the TL frame 100 which the data should be written into is automatically determined for each kind of data according to the frame construction shown in FIG. 2.

Alternatively, detecting a lapse of a predetermined time from start of retrieving the TL frame 100 may be utilized as a trigger to start reading and overwriting by the TL frame transmission module 18 in place of detecting the accumulation of the predetermined amount into the delay buffer 15.

In the case where the own processor (the audio signal processor 2 to which the network I/F card 215 executing processes under description is attached) is a slave node, when a second predetermined amount of data of the TL frame 100 is accumulated in the TL frame transmission module 18, the TL frame transmission module 18 starts outputting the overwritten TL frame so that if the selector 36 selects the output line from the TL frame transmission module 18, the TL frame 100 which has been overwritten by the TL frame transmission module 18 is outputted via the second transmission I/F 32 to the adjacent node. In this event, the operation clock of the first data input/output module 10 is supplied as it is as the network clock NC2 to the second transmission I/F 32, and the second transmission I/F modulates in sequence the data of the TL frame using the network clock NC2 as a carrier and outputs it to the communication cable CB.

Note that detecting a lapse of a predetermined time from start of retrieving the TL frame 100 may be utilized as a trigger to start transmission of the TL frame 100 in place of detecting the accumulation of the second predetermined amount.

As has been described using FIG. 2 and FIG. 3A to FIG. 3C, when the Ethernet frame or the ITL frame 110 are written into the TL frame 100 and transmitted, the data in each of the frames is divided into a plurality of blocks (including one block). The TL frame transmission module 18 performs the division and the generation of the block ID for every block and so on, and prepares data relating to blocks to be used for overwriting before the timing of overwriting the data into the TL frame 100.

Although the process for overwriting the contents of the TL frame 100 stored in the delay buffer 15 by the TL frame transmission module 18, and the process for outputting the overwritten TL frame 100 from the TL frame transmission module 18 are performed at the same time in this embodiment, the overwriting process may be first performed and then overwritten portions of the TL frame 100 may be outputted in sequence.

Although the process for overwriting the contents of the TL frame 100 stored in the buffer of the TL frame transmission module 18 and the process for outputting the TL frame 100 from the TL frame transmission module 18 are individually performed in this embodiment, the overwriting process and the outputting process may be performed at a time. In the variation, a reading out process of the TL frame 100 by the TL frame transmission module 18 is started using the accumulation of the predetermined amount of the received TL frame 100 in the delay buffer 15 as a trigger, and the TL frame 100 read out is supplied to the second transmission I/F 32 while some portions of the TL frame 100 are being replaced with the data from the waveform data transmission buffer 16, the TL data transmission buffer 17 and the ITL data transmission buffer 53.

The replacing process of data can be performed such that the TL frame transmission module 18 selects an appropriate one of the data read out from the delay buffer 15, the data stored in the waveform data transmission buffer 16, the data stored in the TL data transmission buffer 17, and the data stored in the ITL data transmission buffer 53 and outputs the selected data at the time outputting the data of each byte (or word) in the TL frame 100. In this case, the data which has not been selected among the data in the TL frame read out from the delay buffer 15 is discarded. Also by this process, the TL frame transmission module 18 can actually output the TL frame in which an appropriate region of the TL frame 100 received by the TL frame reception module 11 has been overwritten with data to be outputted.

In the case of the single mode as described above, each node reads/writes data other than the data in the ITL frame region 107 only once while the TL frame circulates once through the transmission route. Accordingly reading/writing of the data other than the data in the ITL frame region 107 is performed in only one of the first and second data input/output modules 10 and 20. When the data input/output module performs neither the reading process nor writing process on the data other than the data in the ITL frame region 107, the data other than the data in the ITL frame region 107 just flashes therethrough.

The master node updates the TL frame 100 after completion of the reception of the whole TL frame 100 as will be described later, so the timing of writing data into the TL frame 100 and the timing of starting transmission of the TL frame 100 are different from those of the slave node. However, the position for writing data in the TL frame 100 can be determined as in the case of the slave node. The master node also overwrites the management data 102 in the TL frame 100, and the overwrite can also be performed such that data to be written into a new TL frame is written into the TL data transmission buffer 17 and the data is written over that in the TL frame accumulated in the frame buffer.

The foregoing is the functions of the data input/output module 10 relating to transmission/reception of the TL frame 100.

Besides, as can be seen from FIG. 1A and the like, the transmission destination of the TL frame 100 from a processor that has received the frame may be a processor other than the transmission source of the TL frame 100 (the case of the node B in FIG. 1A) or may be the same processor as the transmission source (the case of the nodes A and C in the same figure). In the former case, the TL frame 100 is transmitted from a transmission I/F in the other pair than the pair the reception I/F which has received the TL frame 100 belongs to, whereas in the latter case, it is transmitted from a transmission I/F paired with the reception I/F which has received the TL frame 100.

The selectors 35 to 38 are provided to switch the transmission destination as described above.

The selectors 35 and 37 are selectors which select, as the data to be inputted into the TL frame reception modules 11 and 12, from among the data received by the reception I/Fs 31 and 33, and the data outputted from the TL frame transmission modules 28 and 18, respectively.

On the other hand, the selectors 36 and 38 are selectors which select, as the data to be transmitted from the transmission I/Fs 32 and 34, from among the TL frames outputted from the TL frame transmission modules 18 and 28, and the ITL frames outputted from the ITL frame transmission modules 54 and 64, respectively.

The selector 36 and the selector 37 operate in cooperation such that when the selector 36 passes the output of the TL frame transmission module 18 to the second transmission I/F 32, the selector 37 passes the data received at the second reception I/F 33 to the TL frame reception module 21 to make it possible to receive the TL frame from the processor connected to the second I/F side.

When the selector 37 is switched to a loopback line LB1 side to pass the output from the TL frame transmission module 18 to the TL frame reception module 21, the TL frame 100 received by the first reception I/F 31 is passed from the first data input/output module 10, then through the loopback line LB1 and the second data input/output module 20, and outputted from the first transmission I/F 34 (when the selector 38 selects the TL frame transmission module 28 side). Accordingly, the received TL frame 100 will be transmitted back to its transmission source.

The selector 36 switches to the ITL frame transmission module 54 side in cooperation with the switching of the selector 37 to the loopback line LB1 side, so as to transmit the ITL frame 110 instead the TL frame 100 to the processor on the second I/F side. On the other hand, when the second reception I/F 33 receives the ITL frame 110, the ITL frame 110 can be processed in the ITL frame reception module 61.

Therefore, even when the TL frame 100 is looped back, the route through which communication using the ITL frame is performed is secured to/from the processor which is connected to the side where the transmission of the TL frame 100 is not performed.

The communication through the route is used for transmission/reception of notification and command when the process relating to construction of the audio network system in the initial process and the process relating to change of the system configuration are performed, for example, transmission/reception of later-described active sensing signal, connection query command, and responses to the commands.

Although the selectors 36 and 37 have been described here, the selectors 38 and 35 operate in cooperation and thereby have a similar function. They can switch whether or not to perform loopback for the TL frame 100 received from the second reception I/F 33.

In summary, in the audio signal processor 2, the hardware of the network I/F card 215 shown in FIG. 8 performs the above-described process, depending on the connection status of each node in the audio network system in which the own processor is included, and on whether the own processor is the master node or the slave node, whereby the function relating to transport of the TL frame and data as described using FIG. 1A to FIG. 6 can be realized.

2. Formation and Change of Configuration of Audio Network System 2.1 Communication Mode of Each Processor Next, process relating to construction and change of configuration of the audio network system, executed by the CPU of the controller 40 in the audio signal processor 2 shown in FIG. 7 will be described.

In the audio signal processor 2 shown in FIG. 7 at the time of startup, both the selectors 35 and 37 select the loopback line sides in the network I/F card 215. In this state, the network I/F card 215 does not form the audio network system in which the TL frame circulates among a plurality of nodes, but communicates with an external processors using the ITL frame (this state is referred to as an "initial communication (ITL) mode").

When the CPU detects that the transmission/reception I/Fs are connected to another processor which has a similar network I/F card 215 and can constitute the audio network system 1, the CPU switches the selector on the side where the another processor is connected, to the reception I/F side to form a ring transmission route through which the TL frame 100 circulates, between the own processor and the connected processor. At this point in time, processors constituting the ring transmission route will start serving as a series of system.

In this state, however, reading/writing of waveform data from/to the TL frame 100 is not performed, but data other than the waveform data, such as the Ethernet frame, the ITL frame, the management data and the like can be written into the TL frame 100 and transmitted/received among the processors (this state is referred to as a "temporary communication (TTL)" mode). In the TTL mode, when a newly found processor is connected to the processors located at ends of the transmission route at the sides where the processors have free transmission/reception I/Fs, the newly connected processor can be incorporated into the transmission route.

Thereafter, when one of the processors is designated as the master node, the ring transmission route is formed again among the processors connected at the point in time, whereby the audio network system 1 is formed through which all the data including the waveform data is written into the TL frame and is circulated among the processors (nodes) (this state is referred to as an "audio transport (RTL) mode"). Also in the RTL mode, when a newly found processor is connected to the processors located at ends of the transmission route at the sides where the processors have free transmission/reception I/Fs, the newly connected processor can be incorporated into the transmission route.

The processor including the network I/F card 215 can construct the audio network system 1 and change the configuration thereof according to the connection status of the processors, by appropriately shifting the operation mode among the ITL mode, the TTL mode, and the RTL mode. Hereinafter, process for constructing the system and changing the configuration of the system will be described.

2.2 Operation at Forming System

Next, process relating to construction and change of configuration of the audio network system, executed by the CPU of the controller 40 in the audio signal processor 2 shown in FIG. 7 will be described.

Figure 9:
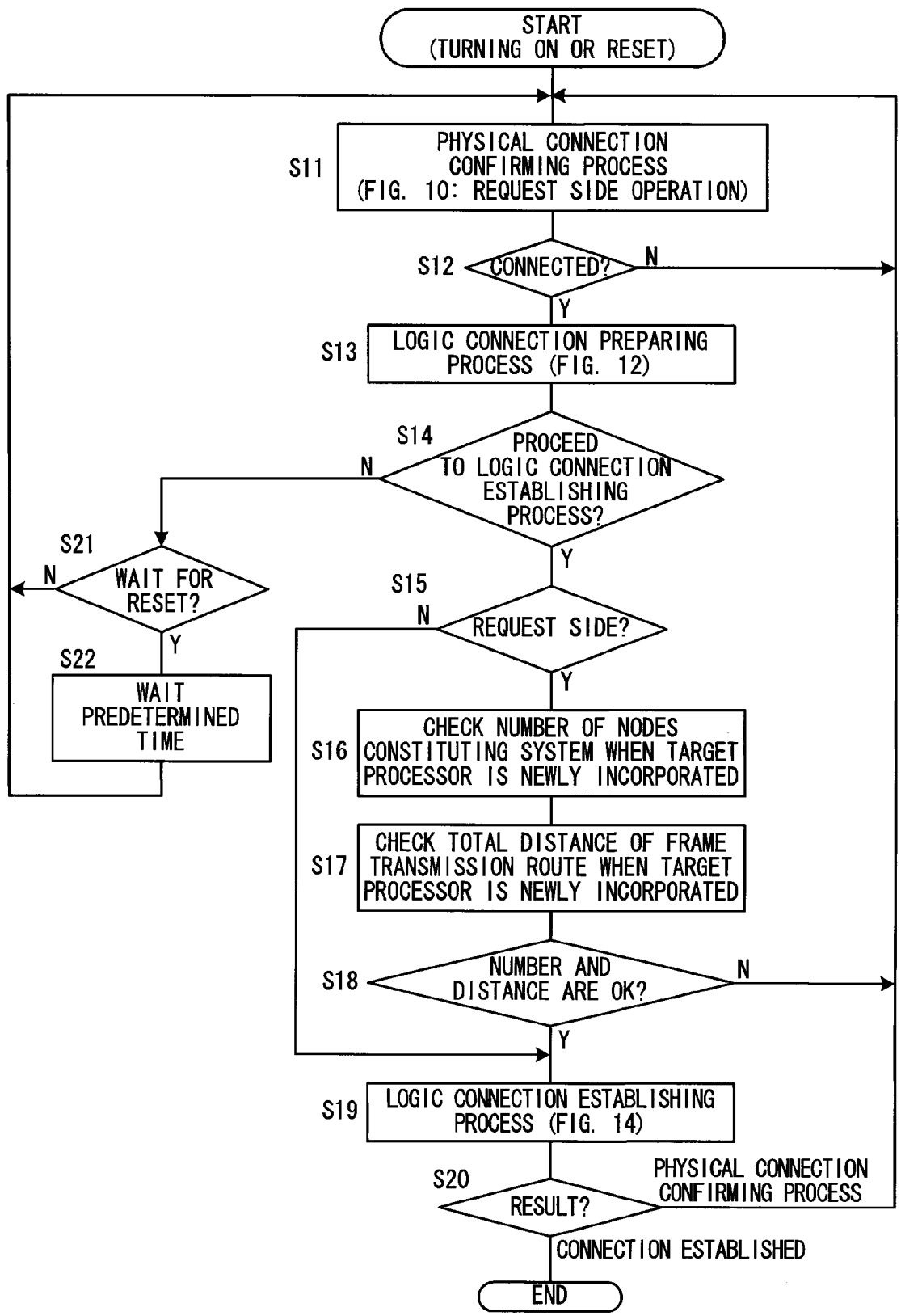
FIG. 9 is a flowchart of process relating to construction of the system, executed by the CPU of the controller of the network I/F card at the time of turning on of the audio signal processor or reset of the network I/F card.

FIG. 9 is a flowchart of process relating to construction of the system, executed by the CPU of the controller 40 at the time of turning on of the audio signal processor 2 or reset of the network I/F card 215. This process is independently performed for each set of transmission/reception I/Fs. For example, in the case of the network I/F card 215 shown in FIG. 8, the CPU of the controller 40 performs process corresponding to the first transmission/reception I/Fs 31 and 34 and the process corresponding to the second transmission/ reception I/Fs 32 and 33. In the following description, the transmission I/F and the reception I/F shall be simply used to indicate I/Fs corresponding to those in the process in execution, unless otherwise stated.

In addition to the process corresponding to the I/Fs, the CPU of the controller 40 performs process of acquiring information relating to setting of the MAC address and the operation mode of the own processor from the CPU 201 on the main body side at the time of turning on the power of the audio signal processor 2.

When the CPU of the controller 40 acquires at least the MAC address of the own processor at the time of turning on the power or at the time of the reset, the CPU starts the process shown in the flowchart of FIG. 9. In this process, the CPU firstly executes a request side operation of physical connection confirming process shown in FIG. 10 to confirm whether or not a processor having an ability of forming the audio network system 1 is physically connected to the transmission/ reception I/Fs (S11).

Figure 10:
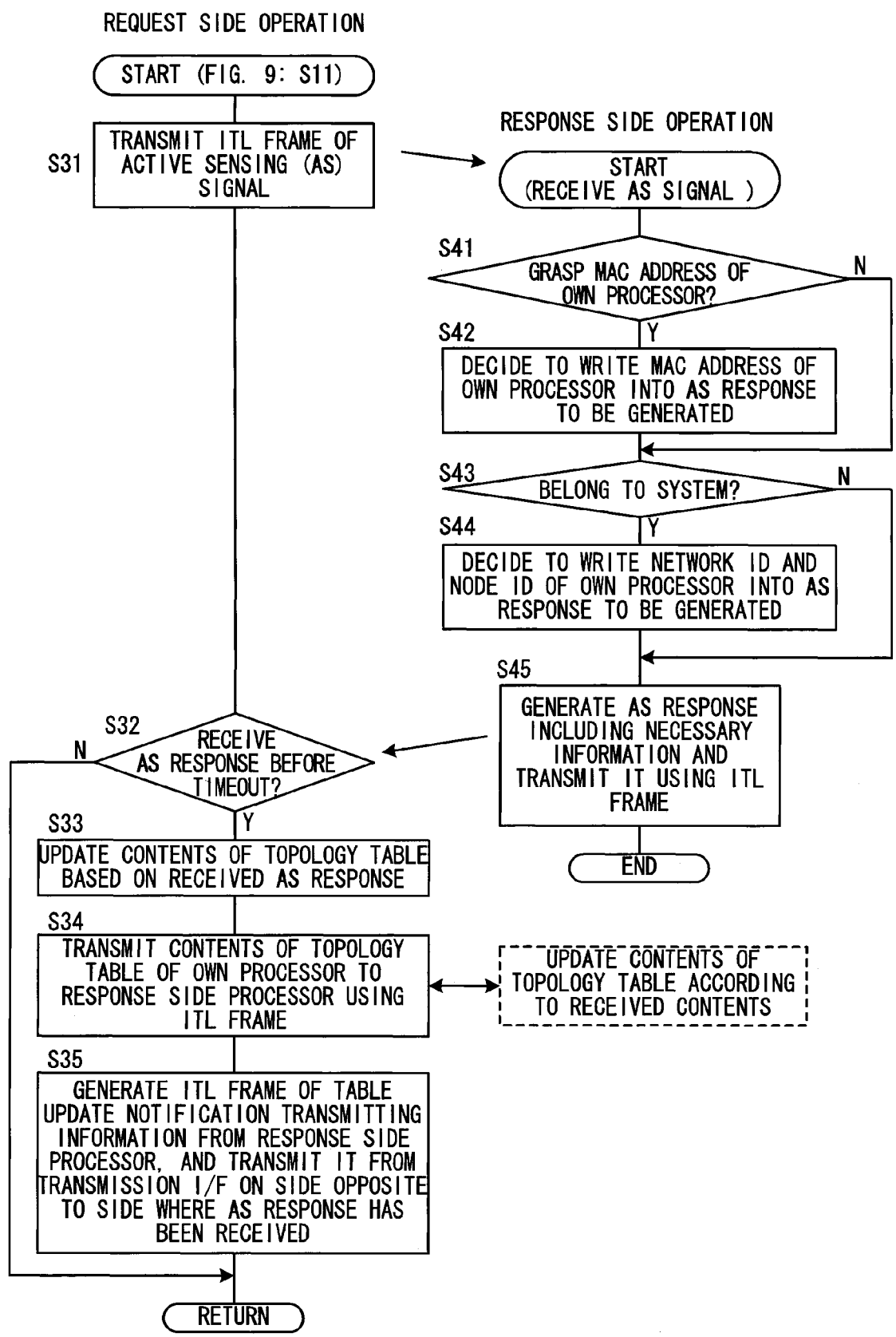
FIG. 10 is a flowchart of physical connection confirming process shown in FIG. 9.

A flowchart of the physical connection confirming process is shown in FIG. 10.

As shown in this drawing, in the request side operation of the physical connection confirming process executed at Step S11 in FIG. 9, the CPU of the controller 40 firstly outputs the ITL frame of an active sensing (AS) signal from the transmission I/F (S31). If any processor is connected to the transmission I/F, this AS signal is received by the connected processor.

If the processor which has received the AS signal also equipped with the network I/F card 215, the CPU of the controller 40 starts the process shown in the flowchart of a response side operation in FIG. 10.

In this process, the CPU of the controller 40 in the processor on the response side generates an AS response that is a response to the received AS signal, and returns the AS response, as an ITL frame of response, to the transmission source processor of the AS signal (S45). The information to be written in the response is determined at Steps S41 to S44. If the CPU of the controller 40 has grasped the MAC address of the own processor, the CPU writes the MAC address into the response (S41 and S42), and when the own processor has already entered the system in the TTL mode or the RTL mode, the CPU writes also the network ID of the system and the node ID of the own processor into the response (S43 and S44).

The network ID is "0" in the case of the TTL mode, and is a value specific to the system in the case of the RTL mode. If the processor has not entered any system yet, the CPU preferably writes a code indicating an "indefinite value" into the AS response as the network ID. The node ID is an ID for discriminating a specific node in the system, and the value of the node ID is a value specific to each node in the system.

On the other hand, the processor which has transmitted the AS signal waits while monitoring reception of the AS response. When the CPU of the controller 40 receives the AS response before timeout after a lapse of a predetermined time (S32), the CPU finds that a processor having an ability of forming the audio network system 1 is connected to the transmission/reception I/Fs. Hence, the CPU updates the contents of the topology table based on the contents of the received AS response (S33). The topology table is a table which records the order of the connection of processors which are connected to the own processor directly or indirectly via other processors.

FIG. 11 shows an example of the topology table.

As shown in this drawing, in what orders what kinds of processors are connected to the backward side and the forward side of the own processor are registered in the topology table using their network IDs, node IDs, and MAC addresses. The MAC address of them is specific to a processor, whereas the network ID and the node ID are variable according to the state of entry to the system. A model ID of the processor and a later-described frame transport delay time between processors (or a distance between processors) may also be registered in the topology table.

This topology table is written such that information of a processor which is directly connected to the own processor is indicated in boxes at the uppermost row in the table, and information of a processor which is connected behind the processor written at the uppermost row is indicated in the table in boxes at a row next to the uppermost row and so on, for both the backward side and the forward side.

Which of two sets of transmission/reception I/Fs the forward side processor is connected to may be arbitrarily determined by the ID of the transmission/reception I/Fs or the like at the time of startup. Even if individual processors recognize different sides as the forward side, there is no problem because relative positional relations between the processors can be grasped by each of the processors. However, once the processor shifts to the TTL mode or the RTL mode, the side to which the master node firstly transmits the TL frame circulating through the route shall be regarded as the forward side as has been described in FIG. 4A and FIG. 4B.

Alternatively, it is also adoptable to fix the directions such that the first transmission/reception I/Fs side is the backward side and the second transmission/reception I/Fs side is the forward side, and to define the case in which the forward sides or the backward sides of processors are connected to each other as an error. Such definition decreases the degree of freedom of connection by the user, but makes it easy to control the system.

Returning to explanation of FIG. 10, after Step S33, the CPU of the controller 40 appropriately transmits/receives the ITL frame to/from the response side processor to transmit the contents of the topology table to the response side processor (S34). More specifically, the CPU transmits data of a processor connected to the side opposite to the response side processor, including the information of the connection order, and causes the response side processor to register the information in its topology table.

The CPU then generates an ITL frame of table update notification for notifying information from the response side processor, and transmits the ITL frame from the transmission I/F on a side opposite to the side where the AS response has been received (S35), then ends the process in FIG. 10 and proceeds to the process at Step S12 in FIG. 9.

Though illustration is omitted, the processor which receives the table update notification registers the notified data of the response side processor, into a node table of the own processor. If a processor is connected to the processor which has received the table update notification on the side opposite to the side where the table update notification has been received, the processor which has received the table update notification transmits, also to the processor on the opposite side, the ITL frame of the table update notification for notifying the information of the response side processor. In this manner, the data of the response side processor is registered in node tables in all of the processors positioned on the side of the request side processor which has performed the process in FIG. 10, opposite to the response side processor.

However, the request side operation itself may be ended when the transmission at Step S35 is completed.

In the case of timeout at Step S32, the processor finds that no processor is connected to the transmission I/F or that even if a processor is connected to the transmission I/F, the processor has no ability of forming the audio network system 1. Hence, the CPU just ends the process in FIG. 10, and proceeds to the process at Step S12 in FIG. 9.

Note that if it is obvious that no processor is connected to the transmission/reception I/Fs, because the reception I/F cannot detect the network clock or the like at Step S31, the CPU may make a judgment of NO at Step S32 without transmitting the AS signal.

After completion of the process in FIG. 10, the CPU of the controller 40 judges, at Step S12 in FIG. 9, whether or not the connection of a processor having an ability of forming the audio network system 1 to the transmission/reception I/Fs has been confirmed (Y/N at Step S32) in the physical connection confirming process.

When the connection has not been confirmed yet, the CPU returns to Step S11 and performs again the physical connection confirming process (the CPU may perform the physical connection confirming process after waiting a predetermined time). On the other hand, when the connection has been already confirmed, the CPU proceeds to logic connection preparing process shown in FIG. 12, and judges what type of system in the TTL mode or the RTL mode the processor can form with respect to the target processor whose connection with the own processor has been confirmed (S13).

Roughly summarized, the logic connection preparing process is process of referring to the network IDs of the own processor and the target processor and determining incorporation of the processor in a lower priority mode into the system which the processor in a higher priority mode belongs to, where the priorities are set in the order of RTL>TTL>ITL. The logic connection means formation of a common transmission route through which the TL frame circulates among processors, or addition of a newly found processor to the existing transmission route.

Figure 12:
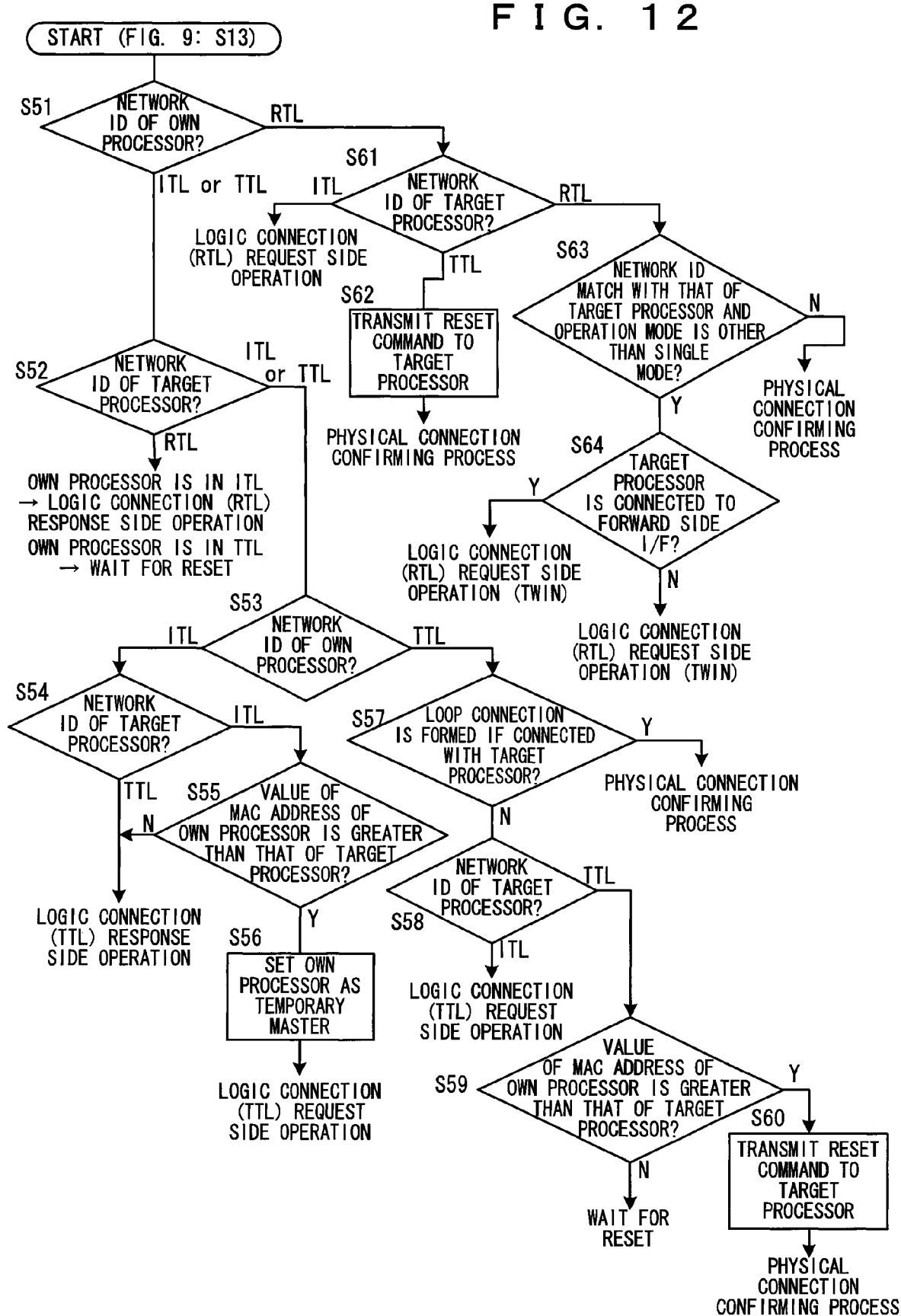
FIG. 12 is a flowchart of logic connection preparing process shown in FIG. 9.

A flowchart of the logic connection preparing process is shown in FIG. 12.

As shown in this chart, the CPU of the controller 40 firstly judges in which mode among the RTL, TTL, and ITL modes the own processor is, by referring to the network ID of the own processor in the logic connection preparing process (S51).

When the own processor is in the ITL mode or the TTL mode, the CPU then confirms the network ID of the target processor to judge in which mode among the RTL, TTL, and ITL modes the target processor is (S52). When the target processor is in the RTL mode, the CPU recognizes that the own processor is in a lower priority mode than the target processor, and thus decides to be incorporated into the system in the RTL mode which the target processor belongs to.

If the own processor is in the ITL mode, the own processor can be incorporated into the system without problem, the CPU decides to perform the response side operation so as to shift the own processor to the RTL mode in the logic connection establishing process at Step S19 in FIG. 9.

When the own processor is in the TTL mode, the CPU decides to shift to a state of waiting for a reset command from the target processor in order to accept a reset operation once to get out of the system in the TTL mode and then be incorporated into the system which the target processor belongs to. The reason why the acceptance of the reset operation once is requested is that if nodes at the ends of two systems in each of which a ring transmission route has been formed are connected to each other as they are, a new transmission route in which the two rings are merged is formed and two TL frames will exist on the newly formed transmission route, with the result that frame transport cannot be normally performed.

When the operation which should be performed by the own processor is determined as described above, the CPU ends the process in FIG. 12 and proceeds to the process at Step S14 in FIG. 9.

When the target processor is in the ITL mode or the TTL mode at Step S52, the CPU of the controller 40 proceeds to Step S53.

When the own processor is in the ITL mode (S53) and the target processor is in the TTL mode (S54), the CPU recognizes that the own processor is in a lower priority mode than the target processor, and thus decides to be incorporated into the system in the TTL mode which the target processor belongs to. Hence, the CPU decides to perform the response side operation so as to shift the own processor to the TTL mode in the logic connection establishing process at Step S19 in FIG. 9, then ends the process in FIG. 12 and proceeds to the process at Step S14 in FIG. 9.

When both the own processor and the target processor are in the ITL mode, the CPU decides to form a system in the TTL mode with the target processor, and at this time, the CPU needs to decide which of the own processor and the target processor becomes a temporary master node in the system. Any algorithm can be used for the decision of the temporary master node, and here the decision is made depending on the value of the MAC address. Hence, in this case, the CPU judges whether or not the value of the MAC address of the own processor is greater than that of the target processor (S55). When the value of the MAC address of the own processor is greater than that of the target processor, the CPU sets the own processor as the temporary master (S56). Further, to initiatively shift the own processor and the target processor to the TTL mode, the CPU decides to perform the request side operation to shift the processors to the TTL mode in the logic connection establishing process at Step S19 in FIG. 9, then ends the process in FIG. 12 and proceeds to the process at Step S14 in FIG. 9.

When the value of the MAC address of the own processor is smaller than that of the target processor, the target processor becomes the temporary master. Accordingly, for the own processor to be incorporated in the system by the target processor, the CPU decides to perform the response side operation to shift the own processor to the TTL mode, then ends the process in FIG. 12 and proceeds to the process at Step S14 in FIG. 9.

Conceivable algorithms as the algorithm for deciding the temporary master includes an algorithm in which a processor which has transmitted the AS signal in the physical connection confirming process is set as the temporary master, an algorithm in which a processor operating for a longer time from the turning on of the power or from the reset is set as the temporary master, and an algorithm using combinations of those conditions, in addition to the algorithm in which the temporary master is set depending on the magnitude of the MAC address.

When the own processor is in the TTL mode at Step S53, the CPU judges whether or not a loop connection is formed if the own processor is connected with the target processor (S57). Specifically, the CPU judges whether or not the target processor is a node located at the opposite end of the system which the own processor belongs to. This judgment may be performed by acquiring, from the topology table, the MAC address of the node at the opposite end of the system.

Taking into consideration the fact that the TTL mode is a temporary communication mode until the processor shifts to the RTL mode, only the operation in the single mode that is the basic configuration of the network is permitted in the TTL mode in this embodiment. Therefore, when YES is judged at Step S57, the CPU does not establish the logic connection with the target processor. Hence, the CPU decides to return to the physical connection confirming process, then ends the process in FIG. 12 and proceeds to the process at Step S14 in FIG. 9. In this case, even if the CPU does not establish the logic connection with the target processor, there may be no processor which cannot enter the system in the TTL mode because the target processor has already entered at least the system in the TTL mode.

In this case, if there is no change in the connection status between the processors, the process so far will be repeated at all times, because YES is judged at Step S57 even in the logic connection preparing process after the physical connection confirming process for the next time. However, the CPU preferably periodically performs the physical connection confirming process and the logic connection preparing process so that when the connection status between the processors is changed, the CPU can quickly shift each processor to an appropriate communication mode.

On the other hand, when NO is judged at Step S57 and if the target processor is in the ITL mode (S58), the CPU recognizes that the own processor is in a higher priority mode than the target processor, and thus decides to incorporate the target processor into the system in the TTL mode which the own processor belongs to. Hence, the CPU decides to perform the request side operation so as to shift the target processor to the TTL mode in the logic connection establishing process at Step S19 in FIG. 9, then ends the process in FIG. 12 and proceeds to the process at Step S14 in FIG. 9.

When the target processor is in the TTL mode (S58), the CPU recognizes that the own processor and the target processor belong to different systems in the TTL mode. In this case, the CPU performs the operation for once removing one of the processors from the system which the one processor belongs to, and incorporating the one processor into the system which the other processor belongs to (in this case, the system from which the one processor is removed will be deconstructed as will be described later).

In this case, though whichever one of the processors may be removed from the system, the CPU decides the one processor to be removed depending on the value of the MAC addresses of the processors connected to each other (S59), similarly to the case of Step S55. Hence, when the value of the MAC address of the own processor is greater than that of the target processor, the CPU transmits the ITL frame of a reset command to the target processor so as to remove the target processor from the system (S60). Since the target processor shifts back to the ITL mode by the reset as will be described later, the CPU decides to perform again the process starting from the physical connection confirming process, then ends the process in FIG. 12 and proceeds to the process at Step S14 in FIG. 9.

In this case, if there is no change in the connection status between the processors, the CPU will proceed to the lower side at Step S58 in the logic connection preparing process after the physical connection confirming process for the next time.

On the other hand, when the value of the MAC address of the own processor is smaller than that of the target processor at Step S60, the CPU decides to wait for a reset command from the target processor so as to let the target processor to deconstruct the system which the own processor belongs to, then ends the process in FIG. 12 and proceeds to the process at Step S14 in FIG. 9.

Note that at Step S60, an algorithm is also employable in which a system including a smaller number of nodes constituting the system is deconstructed, in addition to the algorithm exemplified in the description of Step S55.

When the own processor is in the RTL mode at Step S51 and if the target processor is in the ITL mode (S61), the CPU recognizes that the own processor is in a higher priority mode than the target processor, and thus decides to incorporate the target processor into the system in the RTL mode which the own processor belongs to. Hence, the CPU decides to perform the request side operation so as to shift the target processor to the RTL mode in the logic connection establishing process at Step S19 in FIG. 9, then ends the process in FIG. 12 and proceeds to the process at Step S14 in FIG. 9.

Also when the target processor is in the TTL mode at Step S61, the CPU recognizes that the own processor is in a higher priority mode than the target processor, and thus decides to incorporate the target processor into the system in the RTL mode which the own processor belongs to. In this case, however, the CPU needs to once remove the target processor from the system which the target processor belongs to before the incorporating the target processor, and thus transmits an ITL frame of the reset command to the target processor (S62). The target processor shifts back to the ITL mode by the reset as will be described later, the CPU decides to perform again the process starting from the physical connection confirming process, then ends the process in FIG. 12 and proceeds to the process at Step S14 in FIG. 9. In this case, if there is no change in the connection status between the processors, the CPU will proceed to the left side at Step S61 in the logic connection preparing process after the physical connection confirming process for the next time.

When the target processor is in the RTL mode at Step S61, basically the CPU does not establish the logic connection with the target processor. In this embodiment, the RTL mode is considered as the mode in which the audio network system 1 is actually used for the audio signal processing, and therefore it is not preferable to deconstruct the system in the RTL mode without express intension from the user. For this reason, the CPU does not unite the systems both in the RTL mode to each other (there is no problem with addition of a processor to the system).

However, when the own processor is connected to a processor at the opposite end of the system which the own processor belongs to, the connection type is changed from the cascade connection to the loop connection, and it is conceivable that the operation mode is shifted from the single mode to the twin mode. In the RTL mode, whether or not the shift is permitted is decided by the mode setting made in the master node as has been described in the description for FIG. 1A to FIG. 1C.

Hence, when the network ID of the own processor matches with the network ID of the target processor and if the twin mode permission has been set (S63), the CPU decides to shift the whole system which the own device belongs to, to the twin mode. A problem in this case is to decide which of the own processor and the target processor takes the initiative in the logic connection process, and a processor located at the backward side shall take the initiative here. Hence, according to the result of judgment at Step S64, the CPU decides to perform the request side operation or the response side operation so as to shift the system to the RTL mode in the twin mode in the logic connection establishing process at Step S19 in FIG. 9, then ends the process in FIG. 12 and proceeds to the process at Step S14 in FIG. 9.

The judgment of NO at Step S63 is made in the case (a) in which the network ID of the own processor is different from the network ID of the target processor, that is, when the different systems in the RTL mode are connected to each other, or in the case (b) in which the operation in the twin mode is not permitted. In either case, the CPU does not perform the logic connection with the target processor, and thus decides to return to the physical connection confirming process, then ends the process in FIG. 12 and proceeds to the process at Step S14 in FIG. 9.

In this case, if there is no change in the connection status between the processors, the process so far will be repeated at all times, because NO is judged at Step S63 even in the logic connection preparing process after the physical connection confirming process for the next time. However, it is preferable that the CPU periodically performs the process, as in the case of YES at Step S57.

Return again to the explanation of FIG. 9.

After completion of the logic connection preparing process shown in FIG. 12, one of the logic connection process, the reset waiting state, and the physical connection process is decided to be executed next, and the CPU will proceed to Step S14 in FIG. 9.

When the decided process is the physical connection process, NO is judged at Steps S14 and S21, and the CPU returns to Step S11 and repeats the process.

On the other hand, when the decided process is the reset waiting state, the CPU proceeds from Step S21 to Step S22 and waits a predetermined time for a reset request from the target processor. Also on the target processor side, the process shown in FIG. 9 has been started at the time of turning on the power or the time of reset. When the relation between the own processor and the target processor is such that the logic connection preparing process results in "the reset waiting state", the target processor will transmit the ITL frame of the reset command at Step S60 or S62 in the logic connection preparing process executed in the target processor.

Figure 13:
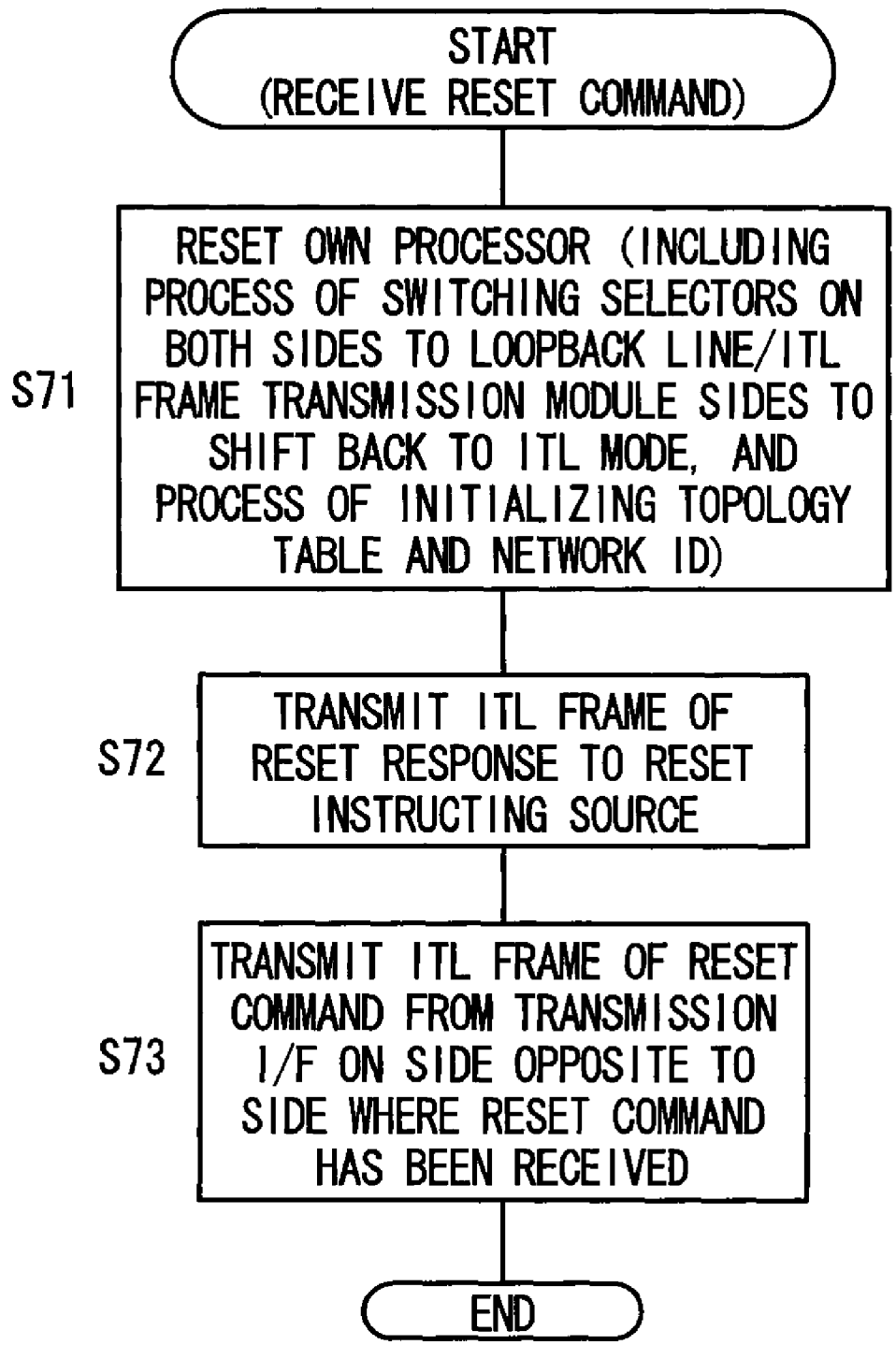
FIG. 13 is a flowchart of process executed when the reset command is received.

A flowchart of process executed by the CPU of the controller 40 when the processor receives the reset command is shown in FIG. 13. This process is executed by an interruption, independently of other process.

When the CPU of the controller 40 receives the reset command, the CPU firstly performs reset of the own processor (S71). This reset includes process of switching the selectors 35 to 38 on both I/F sides to the loopback line/ITL frame transmission module sides to shift the own processor back to the ITL mode, and process of initializing the topology table and the network ID. However, it is unnecessary to delete the setting of the MAC address, the master/slave, the twin mode permission, and the duplex communication/double communication.

Thereafter, the CPU transmits an ITL frame of a reset response indicating the completion of reset, to the reset instructing source processor (S72), and transmits the ITL frame of the reset command to an adjacent node from the transmission I/F on a side opposite to the side where the CPU has received the reset command (S73), and then ends the reset process.

At the time of the reset at Step S71, the CPU of the controller 40 stops the process in FIG. 9 which has been performed until then. Then, the CPU starts again the process shown in FIG. 9 in response to the reset. However, when the processor receives a reset command from another processor, the CPU may subsequently receive a connection query command or the like. Therefore, the CPU may wait a predetermined time until it starts the process shown in FIG. 9.

In contrast, the processor which has sent the reset command to the target processor may start next physical connection confirming process using reception of the reset response from the target processor as a trigger. This is because the target processor has shifted back to the ITL mode at this time, and it is expected that the target processor can be incorporated into the system.

As is obvious from Step S73 in FIG. 13, when the processor at an end of a certain system is reset, all of the processors configuring the system are sequentially reset and shifted back to the ITL mode, where the processors can be incorporated into another system. As described above, all of the processors which belong to a system which will be absorbed to another system by a reset will be once shifted back to the ITL mode, in the case where systems operating in the TTL mode are united with each other and the case where a system operating in the RTL mode absorbs a system operating in the TTL mode.

Though illustration is omitted, the processor which has received the reset response deletes, from the node table of the own processor, the information of the processor which performed reset and processors behind it. The processor which has received the reset response transfers the deletion also to processor connected thereto on the side opposite to the side where the reset response has been received, to cause the processor on the opposite side to delete the information of the processor which performed reset and the processors behind it, and also cause processors behind the processor on the opposite side to perform deletion in sequence.

Return to explanation of FIG. 9.

In the logic connection preparing process at Step S13, when the CPU decides to execute the logic connection establishing process, the process proceeds from Step S14 to Step S15. When the CPU executes the logic connection establishing process as the request side, the CPU judges whether or not there is a trouble in transporting the TL frame even if the target processor is incorporated into the system which the own processor belongs to (S16 to S18). This judgment is performed based on the number of nodes and on a total distance of the frame transmission route.

The number of nodes can be easily grasped by referring to the topology table, and it is assumed that there is no problem when the number of nodes including the incorporated target processor falls within a predetermined number. However, in the case of shifting to the twin mode, it should be cared that the number of nodes does not increase due to the connection, because the connection is performed among the nodes which have already belonged to the system.

To obtain the total distance of the frame transmission route, the CPU firstly measures the distance between the own processor and the target processor. The measurement can be performed by measuring a time period between the timing when an ITL frame for measurement of distance (an ITL frame in the format shown in FIG. 4B) is transmitted to the target processor and the timing when an ITL frame of response (an ITL frame also in the format shown in FIG. 4B) is received, the target processor transmitting the response immediately after receiving the ITL frame for measurement of distance. The time period required between the timing when the ITL frame for measurement of distance is received by the target processor and the timing when the ITL frame of response is transmitted from the target processor is considered to be constant for each of kinds and versions of the network I/F network card 215. Therefore, a time period obtained by subtracting the constant time period from the measured time period will be a time period proportional to the distance between the processors. It is preferable to perform the measurement several times and to employ a maximum value from among values which are recognized as stable values. In order to avoid an error, it is preferable that transmission/reception of other ITL frames such as the ITL frame of the AS signal and so one is not performed during the measurement.

The distance measurement is performed without exception when each processor is incorporated into the system, and the distance between adjacent processors is recorded in the topology table or the like, whereby the total distance of a frame transmission route when a newly added processor is incorporated can be obtained by summing up the distances between the processors in the system. In the case where the total distance falls within the predetermined value, the case is judged as no problem.

However, in the case where the system is operating in the twin mode, when break of a cascade connection or stop of a node occurs at any location in the system, loopback of the transmission route is set on both sides of the break or the stop to form one ring transmission route in which two rings are united with each other, with the result that the system shifts back to the operation in the single mode. In this case, the transmission route of the system after shifted back into the single mode is generally longer than the transmission route in the twin mode.

Hence, when the system shifts to the twin mode after incorporating the target processor, the following cases are regarded as no problem: not only regarding the case where the target processor is incorporated into the transmission route which is presently used but also regarding the case where the system shifted back to the operation in the single mode due to occurrence of the break of a cascade connection or the stop of a node at any location, the total distance of the transmission route after the change falls within the predetermined value.

When there is no problem both in the number of nodes and the total distance, the CPU proceeds from Step S18 to Step S19 and executes the logic connection establishing process. On the other hand, when there is a problem, the CPU cannot incorporate the target processor into the system, thus returns from Step S18 to Step S11 and repeats the process. In this event, the CPU may transmit a notification of incorporation impossibility to the target device.

One of reasons why the standards are prepared at Steps S16 and S17 is that if the number of nodes is larger than the predetermined number and the total distance of the transmission route is longer than the predetermined value, the time period required for the TL frame to circulate through the transmission route once increases, and therefore the TL frame transmitted from the master node cannot be returned to the master node by the timing at which the TL frame is used for generation of a TL frame in the later period.

Upon consideration of these situations, if

> (Permissible Time for Frame Transport Delay Determined According to Periodic Update Value k)−(Transport Delay Time Per Node)×(Number of Nodes)>(Transport Delay Time Depending on Total Distance of Transmission Route)

is established, it may be judged that there is no problem at Step S18.

The permissible time for frame transport delay determined according to the periodic update value k is time period that is shorter than the k sampling period by a predetermined time α that is a time period necessary for preparation of a new TL frame in the master node. Accordingly, the permissible time can be increased by increasing the periodic update value k.

Hence, when the number of nodes and the total distance of the transmission route do not meet the above conditions, the conditions can be met even by increasing the periodic update value k.

Figure 14:
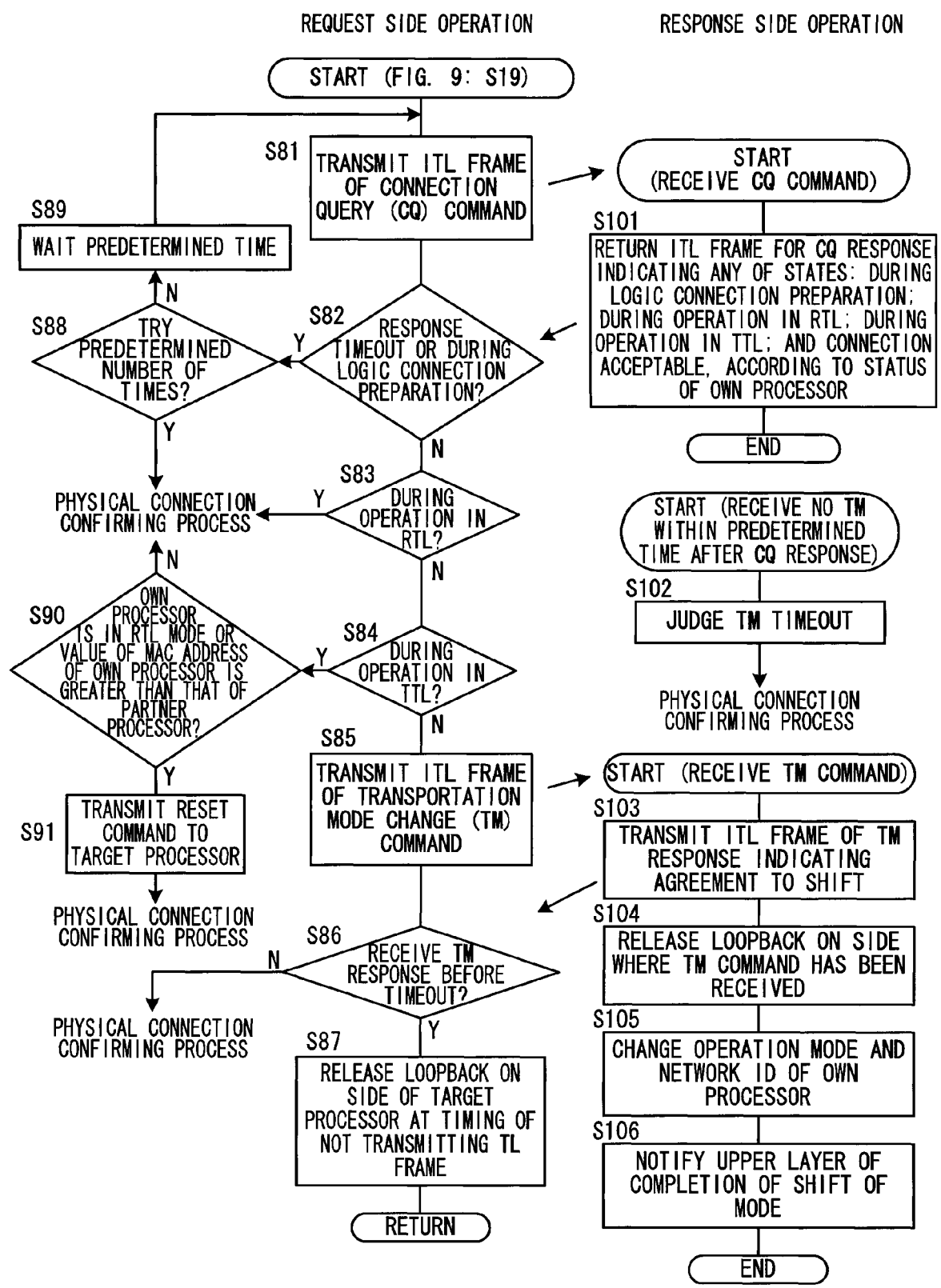
FIG. 14 is a flowchart of logic connection establishing process shown in FIG. 9.

Next, a flowchart of the logic connection establishing process executed at Step S19 in FIG. 9 is shown in FIG. 14.

This process is process executed by the processor which performs the request side operation, to finally confirm that the processor performing the response side operation can be incorporated into the system which the own processor belongs to and to execute the incorporation. The response side operation is essentially passive process that is process performed according to the command received from the processor which performs the request side operation. When the own processor performs "the response side operation" with respect to the target processor in the logic connection preparing process, the target processor will decide to perform "the request side operation" in the logic connection preparing process executed by the target processor.

In this logic connection establishing process, the processor on the request side firstly outputs an ITL frame of a connection query (CQ) command to finally confirm that the target processor (the processor on the response side) can be incorporated into the system, from the transmission I/F (S81). Note that it is preferable to write information indicating into which mode (RTL/TTL and single/twin) of system the target processor is to be incorporated, into the CQ command in advance and cause the target processor to prepare communication in the mode written in the CQ command.

When the target processor receives the CQ command, the CPU of the controller 40 returns, to the transmission source processor of the CQ command, an ITL frame of a CQ response indicating any of following status: during logic connection preparation; during operation in RTL; during operation in TTL; and connection acceptable, according to the status of the own processor (S101).

Since it has been confirmed in the logic connection preparing process that the target processor can be incorporated into the system, the response from the target processor will be essentially "the connection acceptable." However, if another processor is connected to the side of the target processor opposite to the own processor, it is conceivable that the target processor has been incorporated into a system of the processor on the opposite side by a request from the opposite side processor or preparation of incorporation has advanced during the time when the own processor is performing the process at Steps S14 to S18.

In such a case, the above-described responses other than the "connection acceptable" will be returned. The state "during logic connection preparation" indicates the state in which the target processor receives a CQ command from another processor and then waits for reception of a transportation mode change (TM) command. The state "during operation in RTL" and the state "during operation in TTL" indicate the states in which the target processor has been already incorporated into the system in the RTL mode or the TTL mode.

On the other hand, the processor which has transmitted the CQ command waits while monitoring the reception of the CQ response. Upon timeout after a lapse of a predetermined time or reception of the CQ response indicating the state during logic connection preparation (S82), the processor retries the transmission of the CQ command up to a predetermined number of times (S88 and S89). If the situation is still unchanged after the retry, the CPU gives up the incorporation of the target processor into the system this time and decides to return to the physical connection confirming process, and ends the process in FIG. 14. Note that in the case of timeout of response, the CPU does not need to wait a predetermined time at Step S89.

When receiving the CQ response indicating the status of "during operation in RTL" (S83), the CPU cannot incorporate the target processor into the system, thus decides to return also to the physical connection confirming process, and ends the process in FIG. 14.

When the processor receives the CQ response indicating the status of "during operation in TTL" (S84), and if the own processor enters the system in the RTL mode or if the value of the MAC address of the own processor is greater than that of the target processor (if the systems in the TTL mode are connected to each other and the target processor may be removed from the system which the target processor belongs to) (S90), the CPU transmits the ITL frame of the reset command to the target processor (S91). In order to perform the process from the beginning to incorporate the target processor into the system, the CPU decides to return to the physical connection confirming process, and then ends the process in FIG. 14. When NO is judged at Step S90 is, the CPU cannot incorporate the target processor into the system, thus decides to just return to the physical connection confirming process, and ends the process in FIG. 14.

On the other hand, when the processor receives the CQ response indicating "the connection acceptable", NO is judged at all of Steps S82 to S84. The CPU transmits a transportation mode change (TM) command finally requesting change of the operation mode to the target processor, from the transmission I/F (S85). Note that information of into which mode (RTL/TTL and single/twin) the target processor is to be shifted and information of the system network ID of the system into which the target processor is to be incorporated are written in the TM command.

When the target processor receives the TM command, the CPU of the controller 40 first transmits an ITL frame of a TM response indicating agreement to the shift, to the transmission source processor of the TM command (S103). Immediately thereafter, the CPU releases the loopback of the TL frame on the side where the TM command has been received (S104). This release can be performed only by switching two selectors on the side where the loopback is released to the reception I/F side and the TL frame transmission module side, respectively.

Since a processor newly incorporated into the system has not performed transmission/reception of the TL frame yet, the release of the loopback can be performed at any timing without problem. Further, the release of the loopback is performed in a similar manner in any case of shifting the processor to any mode. However, after the release of the loopback, the ITL frame cannot be directly transmitted any longer on the side where the release has been performed (however, the ITL frame can be still transmitted if it is written into a TL frame), and therefore the transmission of the TM response is performed before the release of the loopback.

After Step S104, the CPU changes the operation mode and the network ID of the own processor according to the designation by the TM command (S105) and notifies the upper layer (the CPU on the main body side) of the completion of the shift of mode (S106), and then ends the process. At the time of Step S105, the CPU makes setting, such as which one (or both) of the first and second data input/output modules 10 and 20 is(are) used to read/write the waveform data from/into the TL frame and the Ethernet frame, whether or not reading/writing of the waveform data from/into the TL frame is performed, and so on according to the operation mode and the configuration of the system.

On the other hand, after transmitting the TM command, when the request side processor receives the TM response from the target processor before timeout (S86), the CPU switches the selectors at a timing when the own processor is not transmitting/receiving any TL frame to release the loopback on the side of the target processor (S87). In a processor which belongs to the system, if the loopback is released during transmission/reception of the TL frame, the TL frame is dividedly transmitted, from its middle part, to another transmission destination, resulting in a break of the TL frame. Hence, it is important to release the loopback in the interval between frames as shown in FIG. 5. When the request side processor performs logic connection with another processor for the first time, the TL frame has not circulated yet at the stage of Step S87. Hence, after Step S87, the request side processor only needs to start generation and transmission of a TL frame as a master node (as a temporary master node in the TTL mode).

The CPU ends here the logic connection process in FIG. 14.

In the case of timeout at Step S86, the CPU gives up the incorporation of the target processor into the system this time and decides to return to the physical connection confirming process, and ends the process in FIG. 14.

When the response side processor does not receive the TM command within a predetermined time after transmission of the CQ response, the CPU also judges that it is timeout (S102), and gives up the incorporation this time and decides to return to the physical connection confirming process, and ends the logic connection establishing process. This also applies to the case where the CPU does not receive the CQ command within a predetermined time after the start of the response side operation.

Returning again to explanation of FIG. 9, after the completion of the logic connection establishing process shown in FIG. 14, the CPU proceeds to Step S20. When the connection is established in the logic connection establishing process (the process at Step S87 of the request side operation or the process at Step S104 of the response side operation is executed), the CPU just ends the process. On the other hand, when the CPU decides to try the physical connection again, the CPU returns to Step S11 and repeats the process.

The CPUs of the controllers 40 execute the process described using FIG. 9 to FIG. 14 in a plurality of audio processors 2, whereby processors can automatically constitute a network system in which the TL frame can circulate in the TTL mode, in the order of the processor which is newly turned on and a cable is connected thereto.

Though the waveform data is not transported in this state, the Ethernet frame and the ITL frame can be written into the TL frame and freely transmitted/received between processors that have become nodes constituting the system. Accordingly, such an operation can be performed without any problem that, in accordance with manipulation on a console of a certain processor, the manipulation contents is transmitted to another processor and values of parameters in the other processor is edited according to the manipulation contents. Further, by transmitting/receiving the IP packet using the Ethernet frame, negotiation according to a complex algorithm can be easily performed.

The process shown in FIG. 9 is performed independently for each set of transmission/reception I/Fs as described above. After the system is formed of a plurality of processors, processors at both ends of the system independently perform the process shown in FIG. 9 for the transmission/reception I/Fs on the side where the loopback is performed.

Accordingly, it may happen that though the conditions at Steps S16 to S118 can be met when a newly found processor is incorporated into the system only on one side, the conditions cannot be met when newly found processors are incorporated into the system at the same time on both ends of the system.

In such a case, it is preferable to forcibly remove the processor which has been incorporated into the system on whichever side determined in advance, the forward side or the backward side, from the system at the judgment of the master node, so as to keep the system in a state in which the TL frame can circulate.

The process described so far includes the process of incorporating a newly found processor into the system in the RTL mode but does not include process of firstly setting the processor in the RTL mode. The setting process will be described next.

In this embodiment, an operation mode change (OM) command is prepared as the command for designating and changing the master node, and a processor which receives the command sets itself as the master node and firstly shifts to the RTL mode.

It is not inhibited that any of processors automatically decides the master node and issues the OM command to the decided node, but the OM command is preferably issued according to the instruction by the user. In this case, a function of accepting the selection of the master node from the user is provided at least in one of processors which will constitute the audio network system 1. The function may be a function of referring to the topology table, and presenting a list of communicable processors to the user to let the user to select one from among the processors in the list as the master node. In this event, it is preferable to accept also setting of the operation mode (twin mode permission, double communication/duplex communication during the twin mode, and so on).

Note that communication among all of the processors which have been physically connected is possible using the ITL frame irrespective of the operation mode of each processor. The ITL frame may be written into the TL frame and transported among the processors which operate in the TTL mode (even in the RTL mode), and the ITL frame may be just transmitted from the ITL frame transmission module in a portion where the transmission route for the TL frame is broken.

When the user selects a processor as the master node, a processor accepting the selection sends an ITL frame of the OM command in which the setting of the operation mode is written as a parameter, with the transportation destination of the processor which has been selected as the master node. This OM command is transmitted to the side where the transportation destination processor exists with reference to the topology table.

Figure 15:
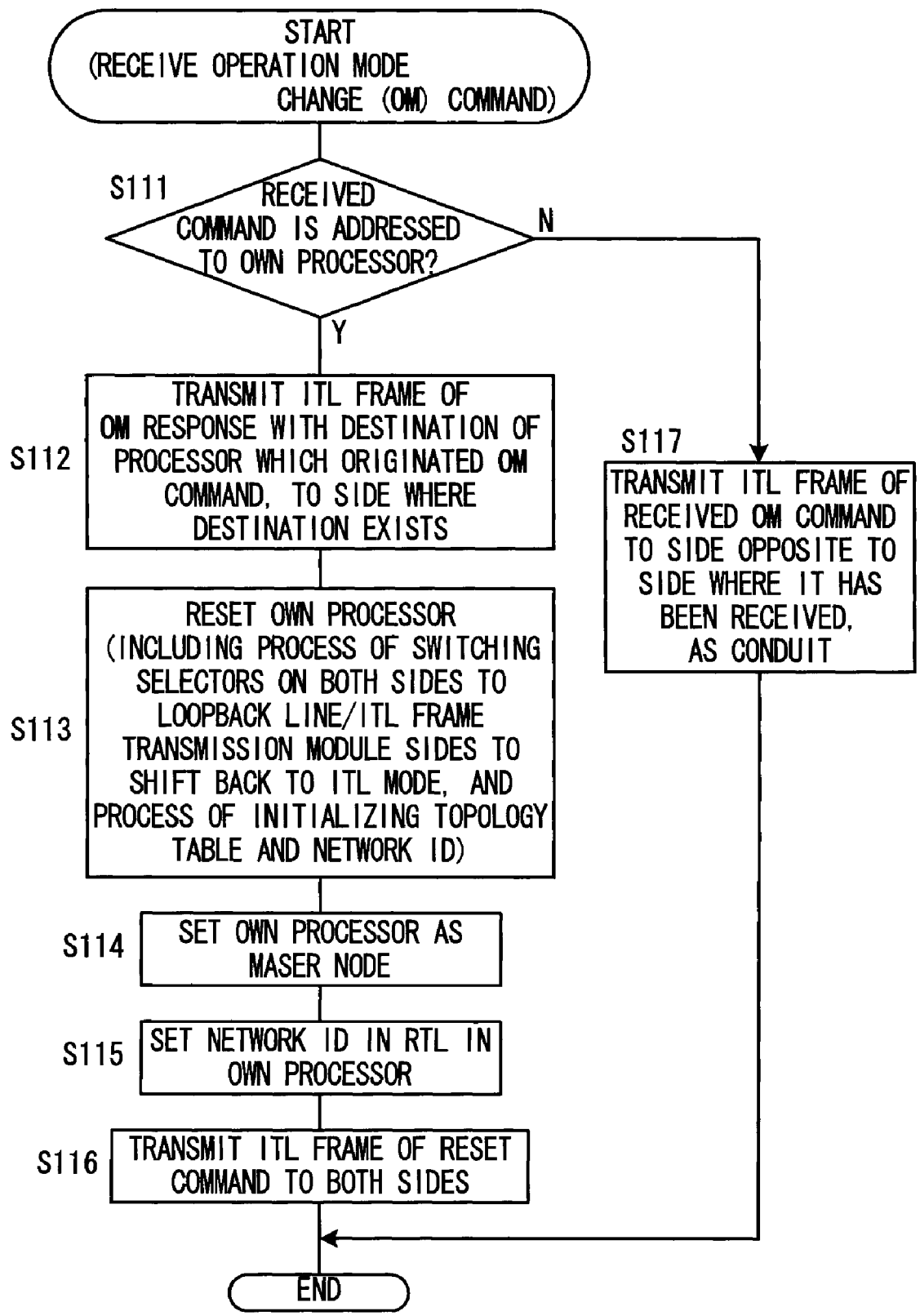
FIG. 15 is a flowchart of process executed when the operation mode change (OM) command is received.

A flowchart of process executed by the CPU of the controller 40 when the processor receives the OM command is shown in FIG. 15.

As shown in the chart, the CPU of the controller 40 of the processor which has received the OM command firstly judges whether the received command is addressed to the own processor (SI11). When the OM command is not addressed to the own processor, the CPU transmits the ITL frame of the received OM command to the side opposite to the side where the OM command has been received, as a conduit (S117), and then ends the process. Each of the processor existing between the processor which has sent the OM command and the destination processor mediates the transport of the ITL frame in sequence until the OM command reaches the destination processor. This also applies to the case of other commands.

On the other hand, when the OM command is addressed to the own processor at Step S111, the CPU sends an ITL frame of an OM response, with the destination of the processor which originated the OM command. This OM response is transmitted to the side where the destination processor exists (S112). Thereafter, as in the case of Step S71 in FIG. 13, the CPU resets the own processor and, if the own processor presently belongs to any system, once removes the own processor from the system (S113). Thereafter, the CPU sets the own processor as the maser node to start operation in a maseter mode (S114), and sets a specific network ID in the RTL mode in the own processor (S115). Thereafter, the CPU transmits an ITL frame of a reset command to both sides of the own processor (S116), and ends the process.

Thereafter, communicable processors are sequentially reset starting from the adjacent processors on both sides of the own processor, and thereby all the communicable processors other than the processor which is designated as the master node start operation as slave nodes in a slave mode, because all processors in the audio network system other than the master node are slave nodes.

The processor which has been set as the master node starts the process shown in FIG. 9 to sequentially incorporate processors connected to both sides thereof into the system as a processor which belongs to the system in the RTL mode as far as the conditions are met. The process shown in FIG. 9 is preferably started using the reception of the reset response from an adjacent node of the master node as a trigger. This is because the adjacent node has already shifted back to the ITL mode at this point in time and expected to be ready for incorporation into the system.

By the above-described process, the audio network system 1 in the RTL mode in which audio transport can be performed can be formed, with the master node being set according to the instruction of the user.

Note that even after the system has been formed once, newly found processors which are connected to the system can be incorporated into the system as needed. When the user wants to change the master node or the operation mode, the user can instruct a processor to issue an OM command at any time.

Even if the audio network system 1 is operating in the RTL mode, when any of the nodes receives the OM command addressed to the node, the node which has received the OM command becomes a new master node and resets the whole system by the process shown in FIG. 15 to form again the audio network system 1.

2.3 Concrete Examples of Forming System

Next, concrete examples of procedures of forming the audio network system by the process described so far, using FIG. 16 to FIG. 20.

FIG. 16 and FIG. 17, in which five processors, a processor A to a processor E, are connected via a communication cable in advance, shows an example of constituting the system when the power is turned on from the processor A to the processor E in this order.

As shown at (a) in FIG. 16, when the processors A and B are turned on, these processors A and B individually start the process shown in FIG. 9 to exchange an AS signal and an AS response by the physical connection confirming process shown in FIG. 10 to recognize the existence of the target processor and exchange information with each other, and register, into the respective topology tables, information of each other (changed portions are shown by hatchings, this also applies to the following stages). Because both of the processors A and B are in the ITL mode in the logic connection preparing process shown in FIG. 12, one of the processors A and B is set as the temporary master node at Steps S55 and S56, and the processors A and B can constitute a system in the TTL mode by the logic connection establishing process in FIG. 14.

Then, when the processor C is turned on as shown at (b) in FIG. 16, the processor B recognizes the existence of the processor C by the physical connection confirming process and exchanges information with the processor C, and the processors B and C register, into the respective topology tables, information of each other.

Thereafter, as shown at (c) in FIG. 16, the processor B notifies the processor C of the information about the processor A which has been already connected to the side of the processor B opposite to the processor C, and notifies the processor A of the information about the processor C which has been newly connected to the side of the processor B opposite to the processor A. As a result, in all of the processors A to C, the information of all of the processors which have been turned on is stored.

Since the processor B is in the TIL mode and the processor C is in the ITL mode, the processor B incorporates the processor C into the system which the processor B belongs to, by the logic connection establishing process in FIG. 14.

Then, also when the processor D is turned on as shown at (d) in FIG. 16, the processor C recognizes the existence of the processor D by the physical connection confirming process and exchanges information with the processor D, and the processors C and D register, into the respective topology tables, information of each other, as in the case of (b) in FIG. 16.

Thereafter, as shown at (e) in FIG. 17, the processor C notifies the processor D of the information about the processors B and A which have been already connected to the side of the processor C opposite to the processor D, and notifies the processor B of the information about the processor D which has been newly connected to the side of the processor C opposite to the processor B. Further, as shown at (f) in FIG. 17, the processor B notifies the processor A connected to the side of the processor B opposite to the processor C, of the information about the processor D which has been notified from the processor C. As a result of the above, in all of the processors A to D, the information of all of the processors which have been turned on is stored.

Since the processor C is in the TTL mode and the processor D is in the ITL mode, the processor C incorporates the processor D into the system by the logic connection establishing process in FIG. 14.

In the similar manner, also when the processor E is turned on as shown at (g) in FIG. 17, the processor D which is a node at the end of the system makes a contact with the processor E which has been newly detected, and incorporates the processor E into the system. Regarding the topology tables, information which has not been grasped by the processors in the system is sequentially transferred to the processors as shown at (h) in FIG. 17, whereby the information of all of the processors which have been turned on is stored into the topology tables in all of the processors A to E.

By the above-described procedure, the network system in which the TL frame circulates in the TTL mode can be automatically formed of the processors A to E which have been turned on in this sequence. In the above example, the same operation is performed even if the turn on is replaced with the connection of cables as a matter of course.

Figure 18:
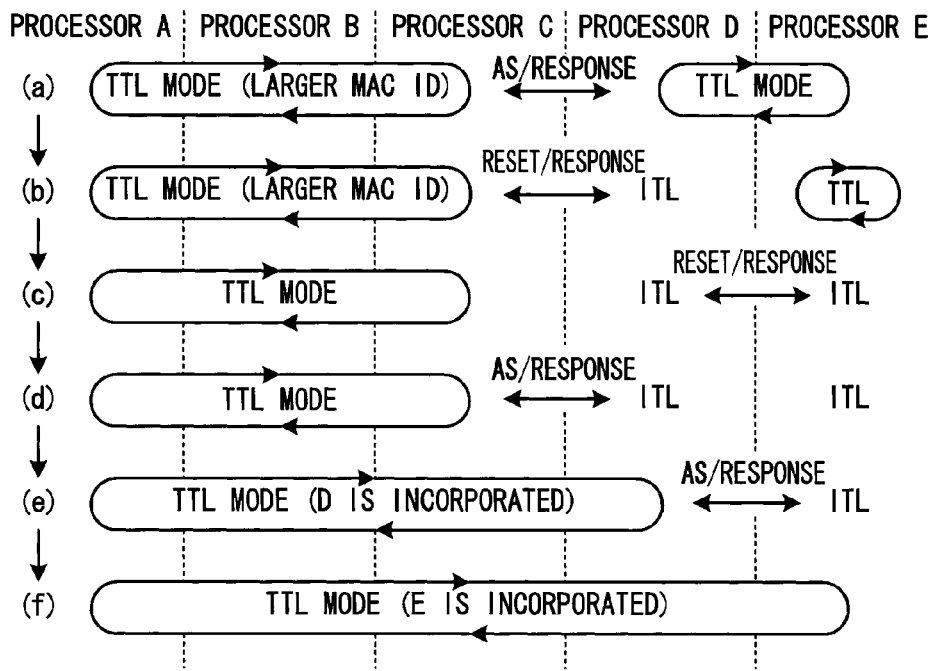
FIG. 18 is an illustration showing another example of the procedure of forming the audio network system.

Next, an operation example where systems operating in the TTL mode are connected to each other is shown in FIG. 18.

This drawing shows an example in which the processor A to the processor C have already formed a system in the TTL mode and the processor D and the processor E have already formed another system in the TTL mode, and the processor C and the processor D are newly connected to each other via a communication cable.

In this case, the processor C and the processor D periodically perform the physical connection confirming process at Step S11 in FIG. 9 and therefore confirm the existence of the target processor each other by the physical connection confirming process (see (a) in FIG. 18).

When the flow proceeds to the logic connection preparing process at Step S13, because the processors in the TTL mode are connected to each other, the processor C having a greater value of the MAC address transmits a reset command to the processor D at Step S60 in FIG. 12. As a result, the processor D leaves the previous system and shifts back to the ITL mode (see (b)).

The processor D transmits a reset command also to the processor E on the side of the processor D opposite to the processor C, as part of the reset process. As a result, the processor E also shifts back to the ITL mode (see (c)).

On the other hand, the processor C performs again the physical connection confirming process, the logic connection preparing process, and the logic connection establishing process in sequence, after sending the reset command to the processor D, to thereby incorporate the processor D which has shifted to the ITL mode, into the system which the processor C belongs to (see (d) and (e)).

After being incorporated into the system, the processor D performs the physical connection confirming process, the logic connection preparing process, and the logic connection establishing process in sequence as a node located at the end of the system to thereby incorporate the processor E adjacent thereto which is in the ITL mode, into the system which the processor D belongs to at that time (see (e) and (f)).

When the two systems operating in the TTL mode are connected to each other, the two systems are automatically combined and one system is formed by the above-described procedure.

Figure 19:
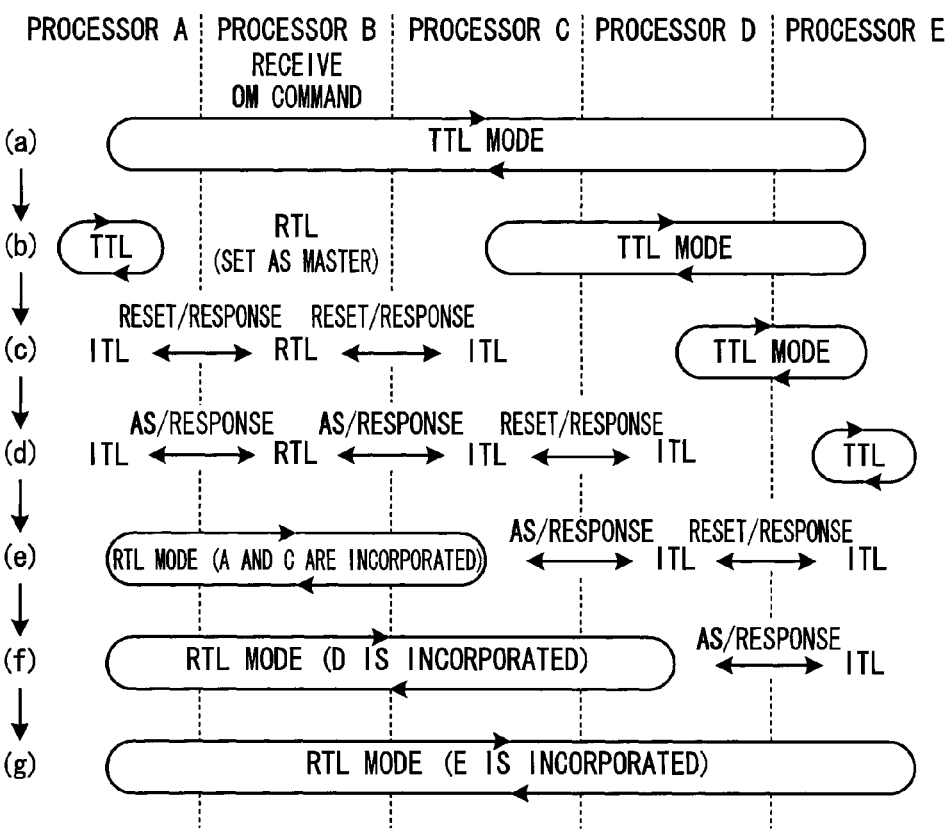
FIG. 19 is an illustration showing still another example thereof.

Next, an operation example where a processor constituting the system operating in the TTL mode receives an operation mode switch (OM) command is shown in FIG. 19.

This drawing shows an example in which the processors A to E form the system in the TTL mode and the processor B among the processors has received the OM command.

In this case, the processor B which has received the OM command resets itself to leave the system which the processor B belongs to, and sets itself as the master and shifts to the RTL mode by the process shown in FIG. 15 (see (a) and (b) in FIG. 19). The processor B further transmits a reset command to the processors on both sides of the processor B to cause the processors to leave from the systems which the processors belong to and shift back to the ITL mode (see (c)).

The reset command is sequentially transmitted to all of the connected processors, namely, from the processor C to the processor D at (d), and from the processor D to the processor E at (e), whereby all of the processors are once shifted back to the ITL mode.

On the other hand, the processor B starts the process shown in FIG. 9 when the processor A and the processor C complete reset and transmit reset responses to the processor B. The processor B performs the physical connection confirming process, the logic connection preparing process, and the logic connection establishing process in sequence to thereby incorporate the processors A and C adjacent thereto which are in the ITL mode, into the system in the RTL mode in which the processor B is the master node at (see (d) and (e)).

Thereafter, the processor C that is the node located at the end of the system at the time of (e) performs the physical connection confirming process, the logic connection preparing process, and the logic connection establishing process in sequence to thereby incorporate the processor D adjacent thereto which is in the ITL mode, into the system which the processor C belongs to at that time (see (f)). The processor D also incorporates the processor E into the system which the processor D belongs to in the same manner (see (g)).

When a processor constituting the system operating in the TTL mode receives the OM command, the processor can reconstruct the system in the TTL mode into the system in the RTL mode by the above-described procedure. Also when a processor constituting the system operating in the RTL mode receives the OM command, each processor similarly operates.

Next, an operation example of shifting from the single mode to the twin mode is shown in FIG. 20.

This drawing shows an example of a system constituted of the processors D, E, A, B, and C connected in this order and operating in the RTL mode, in which the processor C and the processor D at both ends of the system are connected to each other via a cable. In this example, it is assumed that the system is permitted to shift to the twin mode.

In this case, the processor C and the processor D periodically perform the physical connection confirming process at Step S11 in FIG. 9, and therefore confirm the existence of each other by the physical connection confirming process when they are connected via the cable (see (a) and (b) in FIG. 20). Further, information of each one of the processors C and D has been registered in the topology table of the other processor, as information of a node at the end on the opposed side of the system. In addition, the information of the processors is also registered as a node on the side where the processors are newly connected (see (b)). The processor C and the processor D can grasp at this time that the physical connection has been changed into the loop shape.

In the case of the cascade connection, each of the processor C and the processor D sends notification of the information of the newly connected processor to the processor which is connected to the side of the processor C or D opposite to the side of the newly added processor. However, if the notification is similarly sent in the case of the loop connection, the notification sent from the processor C and the notification sent from the processor D overlapped with each other, and it is not clear where sending of the notifications should be stopped because there is no end in the loop connection.

Hence, in the case of the loop connection, the processor only on the forward side shall send notification of the information of the newly connected processor to the processor which is connected to the side opposite to the newly connected processor. Further, each processor which receives the notification shall not send the notification any longer, when the processor judges that the notification indicates that the own processor has been newly added.

In the example of the drawing, the processor D sends notification that the processor C has been newly added, to the processor E on the opposite side, and the notification is transmitted from the processor E to the processor A, the processor B, and the processor C in order. The processor C, however, judges that the notification indicates that the own processor has been newly added, and recognizes from the judgment that the notification has circulated through all nodes in the system, and ends the transmission of the notification here.

By the above-described process, each processor can grasp that the processor at the end on the forward side (for form's sake) and the processor at the end on the backward side (for form's sake) is the same processor, namely, that the connection has been changed to the loop shape (see (c)).

In the processor C, YES is judged at Step S64 in FIG. 12 in the logic connection preparing process, and each of the processor C and the processor D releases its own loopback on the side adjacent to each other in the logic connection establishing process, whereby the frame transmission route is changed to two ring routes to establish the connection in the twin mode.

When the processors at both ends of the system are connected to each other via a cable in the system operating in the RTL mode, the system can shift to the operation in the twin mode by the above-described process.

2.4 Operation at Disconnection of Transmission Route

Next, the operation when the connection between two nodes in the audio network system operating in the RTL mode or the TTL mode is broken will be described.

In the audio network system operating in the RTL mode or the TTL mode, each node, when detecting that the connection with its adjacent node has been disconnected, switches the selection of the selectors on the side on which it detects the disconnection, to the loopback line/ITL frame transmission module side to set a loopback of the transmission route for the TL frame on the side where the disconnection has been detected.

Even if a node transmits a TL frame to the adjacent node, the TL frame is transmitted to the adjacent node in the state where a transmission route between the nodes and the connection with the adjacent node is disconnected, the transmitted TL frame is merely lost, and therefore the nodes behind the disconnection point are removed from the system so that the remaining nodes form a new transmission route to continue the circulation of the TL frame.

Figure 21:
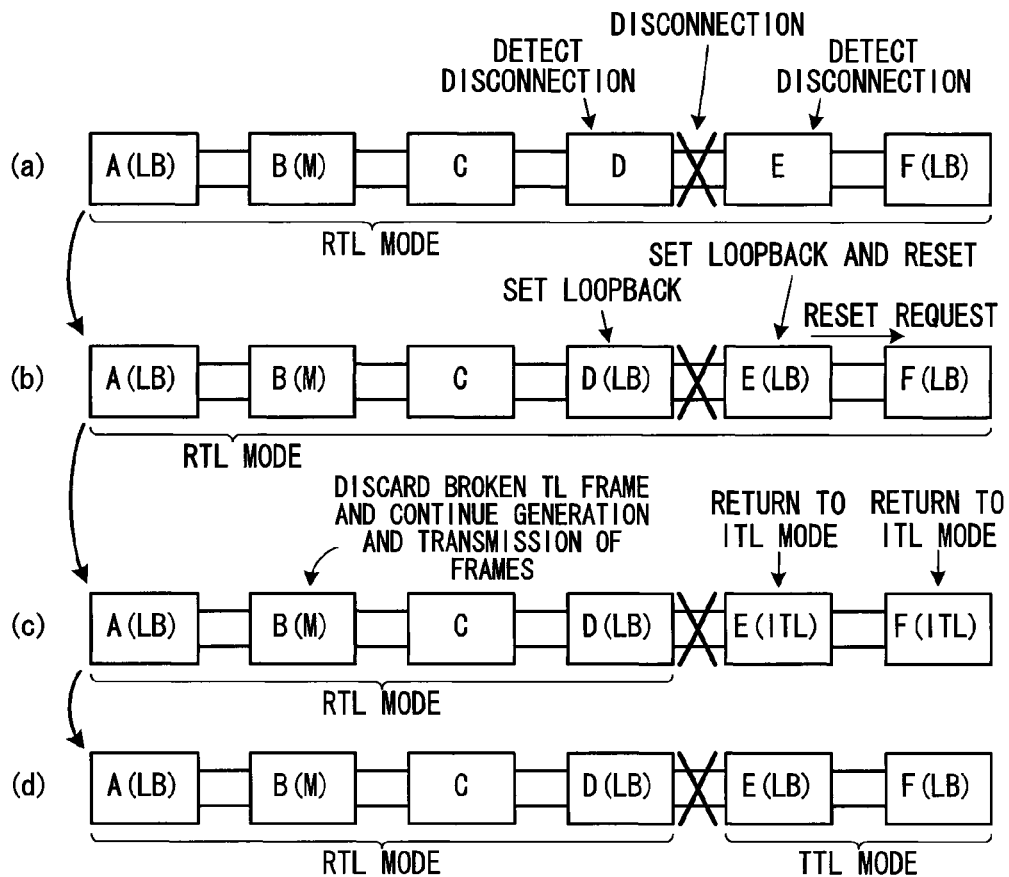
FIG. 21 is an illustration showing an example of the procedure of changing the system configuration at the time of disconnection.
Figure 22:
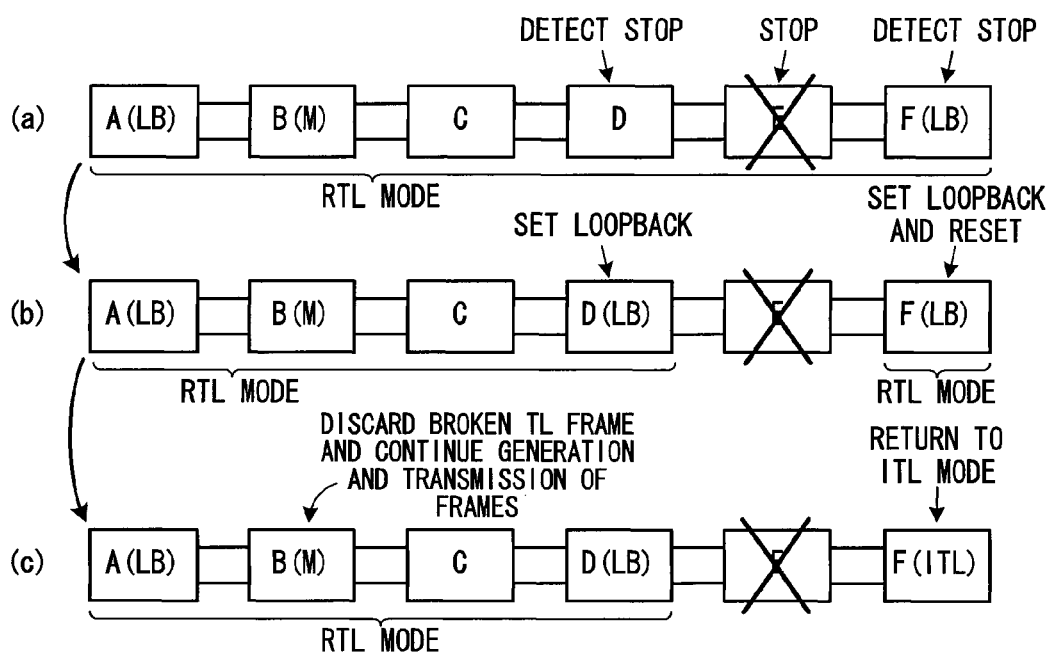
FIG. 22 is an illustration showing another example thereof.

Though the following FIG. 21 and FIG. 22 show examples in which disconnection occurs in the system in the RTL mode, the operation in the RTL mode applies to the operation in the TTL mode by replacing the RTL with TTL.

FIG. 21 shows an example of a procedure of changing the system configuration at the time of disconnection.

This drawing shows an example where the wire between a processor D and a processor E is disconnected in an audio network system in the RTL mode formed of six processors, that is, processors A to F. The disconnection include the case where the communication cable drops off from the processor, and the case where the transmission or reception to/from the audio network becomes impossible because of failure at any one of the processors, as well as the case where the communication cable itself is physically severed. Further, "M" in the drawing indicates a master node, and "LB" indicates a processor in which the loopback is set.

As shown at (a) in FIG. 21, when the wire connecting two nodes in the system is disconnected, each of the two nodes can no longer receive the signal of the TL frame from the adjacent processor nor extract the network clock, on the side of the disconnected wire. If the transmission route on both direction is broken because of the disconnection, such a defect occurs at processors on both side of the disconnection point, and if the transmission route on only one direction is broken, occurs at a processor only on reception side along the one direction.

In this case, the processor which detects that the processor cannot receive the signal of the TL frame from the adjacent node or the processor cannot extract the network clock any longer judges that the disconnection has occurred on the side where the processor has detected the aforementioned fact, and immediately switches the selectors on the side where the disconnection has been detected to the loopback line/ITL frame transmission module side to thereby set a loopback of the transmission route for the TL frame on the side where the disconnection has been detected.

For example, when the second reception I/F 33 shown in FIG. 8 detects the disconnection, the selector 37 is switched to the loopback line side and the selector 36 is switched to the ITL frame transmission module 54 side.

However, the defects on reception of the signal or extraction of network clock only shows that the transmission route from the transmission I/F in the adjacent processor to the second reception I/F 33 of the own processor has been disconnected, but does not show whether or not the communication route from the second transmission I/F 32 of the own processor to the reception I/F of the adjacent processor has been disconnected, or even whether or not the adjacent processor has detected the disconnection.

Hence, the processor transmits a disconnection notification command notifying the adjacent processor of occurrence of disconnection to the adjacent processor from the transmission I/F (the second transmission I/F 32 here) corresponding to the reception I/F where the disconnection has been detected. The ITL frame transmission module 54 generates this command in the format of the ITL frame 120 and supplies it to the transmission I/F. The fact that the disconnection has occurred can be surely transmitted to the adjacent processor using the disconnection notification command.

When the transmission route has been disconnected in both directions, the adjacent processor should have detected the disconnection. Therefore, there is no problem even if the disconnection notification command does not reach the adjacent processor. The processor periodically performs the transmission of the disconnection notification command until the disconnection is eliminated, or until the processor receives an active sensing (AS) signal from a newly connected processor on the side where the disconnection has occurred.

(b) in FIG. 21 shows a state in which each of processors on both sides of the disconnection point sets loopback on the side where the disconnection has been detected. In the case shown in the drawing, a transmission route through the processors A to D and another transmission route through the processors E and F are formed by setting the loopback.

When the disconnection has occurred, it is also conceivable that each processor sets loopback during passage of the TL frame through the processor. In this case, the TL frame in transmission is broken. However, each of the nodes in the system can detect the breakage of the TL frame also in this case, and the master node can discard the broken frame and generate a new frame, as described later, thus not causing a serious problem. Accordingly, a group including the master node among two groups of processors formed because of the disconnection can continue the operation in the RTL mode, though data written in 0 to two TL frames is lost depending on the disconnection point or timing.

On the other hand, the TL frame transmitted from the master node cannot reach the processor which has been separated from the master node because of the disconnection, and therefore the separated processor cannot operate in the RTL mode any longer. Since each processor can judge whether or not the processor has been separated from the master node by referring to the topology table, the processor which has judged to be separated from the master node resets itself and transmits a reset request to the processor on the side opposite to the disconnection side.

All of the nodes separated from the master node once shift back to the ITL mode as shown at (c) in FIG. 21 by the process shown in FIG. 13.

Thereafter, the processor E and the processor F can start the process shown in FIG. 9 as necessary to automatically form the system in the TTL mode as shown at (d) in FIG. 21 in the same procedure as has been described using FIG. 16 and the like. When the disconnection is restored, the processor E and the processor F which have been once separated from the master node can be incorporated again into the system operating in the RTL mode in the same procedure as has been described using FIG. 18 and the like.

Note that the processor which has detected the disconnection notifies of the occurrence of the disconnection the processors on the side opposite to the disconnection point in sequence by the management data in the ITL frame or the TL frame. Each processor which has received the notification of the disconnection deletes, from the topology table, the information of the processors which are connected behind the disconnection point.

Note that if the disconnection occurs when the head of the TL frame is located at the processor E or the processor F, the TL frame may continue to circulate between the processors E and F forever without any measure taken against that. Hence, to avoid such a situation, it is preferable for the processor to confirm the frame serial number at the reception of the TL frame, and to discard the TL frame without looping back it when receiving the TL frame with the same serial number twice.

FIG. 22 shows another example of a procedure of changing the system configuration at the time of disconnection.

This figure shows an example where an operation of a processor stops in the system. Besides the change in the wire connection, the transmission route would be reconstructed when a processor stops to operate because the power supply is suddenly shut down or the like. Also in this case, each of the adjacent two processors on both sides of the stopped processor can no longer detect the network clock from the stopped processors, and detects the disconnection of the transmission route based on the defect, as shown at (a) in FIG. 22. The processors D and F adjacent to the stopped processor cannot distinguish the stop of the operation of the processor from the disconnection of the wire, but have no problem because the countermeasure process against those situations is same.

More specifically, as shown at (b) and (c) in FIG. 22, the processor which has detected the disconnection of the transmission route sets the loopback to the side where the disconnection has been detected, and the master node discards the TL frame broken at the occurrence of disconnection and continues the generation and transmission of a new TL frame as in the case of FIG. 21. This makes it possible for the TL frame to be transported even after the occurrence of disconnection, through the transmission route on the side where the master node exists, so that the transport of the waveform data, the Ethernet frame and so on can be continued within the processors where the transmission route is maintained.

Note that, even if the functions in each processor do not wholly stop, each processor sometimes becomes unable to normally read/write data from/to the TL frame because of hang-up of the controller 40 or the like. If the processor in such a situation continues to transport the TL frame, accuracy of the data in the TL frame is not guaranteed. Therefore, when a processor in the system is brought into such a situation, the adjacent processor preferably executes the configuration change as shown in FIG. 22.

3. Reading/Writing Data from/to TL Frame

Next, reading/writing of data from/to the TL frame will be described.

The operation and process described here relates to the RTL mode. However, completely the same process as that in the RTL mode is employable also in the TTL mode except that reading/writing of waveform data is not performed from/to the TL frame.

The operation and process described here is process when data in the TL frame is inputted into the data input/output module which performs reading/writing of the waveform data and the Ethernet frame. If the data in the TL frame is inputted into the data input/output module which does not perform reading/writing of the waveform data and the Ethernet frame, the process relating to the inputting/outputting of these kinds of data is not performed. In this case, even the master node does not generate a new TL frame and therefore performs the process similar to that of the slave node.

In the following explanation, the reference numerals used for the modules in the first data input/output module 10 are used for the reference numerals of the buffers and the transmission/reception modules included in the network I/F card 215 for convenience of explanation. However, when reading/writing data is performed using the second data input/output module 20, the buffers and modules included in the second data input/output module 20 operate as a matter of course.

3.1 Generation of TL Frame

The generation of the TL frame 100 in the master node will be described first.

As has been described, only the master node generates a new (with different frame ID) TL frame in the audio network system in this embodiment. The master node generates the new TL frame by processing part of data of the TL frame transmitted by itself and returned thereto after circulating through the transmission route.

The processing of the returned frame to generate the new frame includes updating the header and the management data (including the frame ID) in the returned frame and writing the waveform data, the control data and the like to be transmitted by the master node into the returned frame, whereas the waveform data and the control data written by other nodes in the returned frame are left in the new TL frame as they are.

However, in the case when employing such a generation method, if the master node generates a new TL frame without confirming the error in the returned TL frame, a large noise might be included in the waveform data to be transported. Hence, the master node in this embodiment stores once, into the buffer, the whole TL frame returned thereto after circulating once through the transmission route, and confirms that it normally receives the whole TL frame before generating a new TL frame based on that TL frame.

When the master node could not receive the TL frame, the new TL frame should be generated based on another TL frame. Hence, the latest one of the TL frames which normally circulated through the loop transmission route is stored as the another frame separately from the one for transmission/reception, and if a TL frame is not normally received, a new TL frame is generated based on the stored TL frame, instead of the abnormally received frame.

For this end, in the master node, the buffer for processing the TL frame provided in the TL frame transmission module 18 in the data input/output module for generating the TL frame is composed of a plurality of buffers as shown in FIG. 23, and the function of a "transmission buffer (and storing buffer)" or a "reception buffer" is assigned to each buffer. In the TL frame transmission module 18, (k+1) pieces of buffers larger than the periodic update value k by 1 are necessary.

Figure 24:
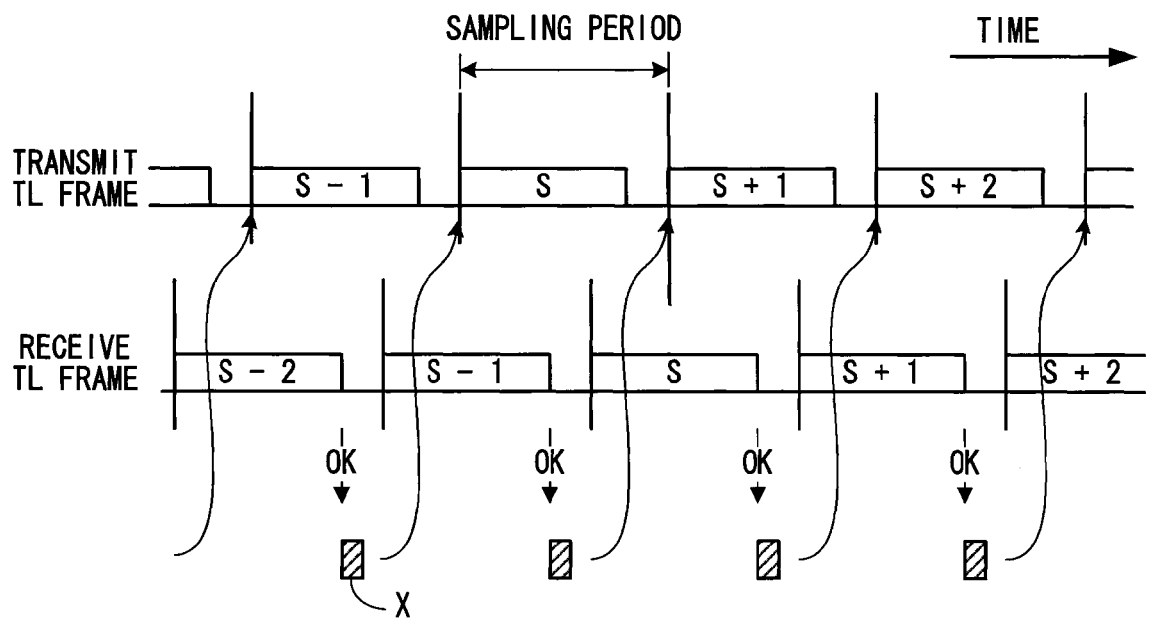
FIG. 24 is a chart showing a timing example of transmission/reception and generation of the TL frame in the master node.

FIG. 24 shows a timing example of transmitting/receiving and generating the TL frame in the master node. In this drawing, S is an integer number and represents the number indicating the period of the wordclock. This S is used also as a frame ID indicating the TL frame transmitted by the master node in the S-th period.

The maser node transmits one TL frame in each sampling period as has been described using FIG. 5 and FIG. 6. This drawing shows an example where the periodic update value k is "2" in which the head of the transmitted TL frame circulates through the system in about one sampling period. In many cases, as shown in FIG. 24, the transmission of the (S+1)-th TL frame should be started before the reception of the whole S-th TL frame is completed. The whole S-th TL frame is received by the timing earlier by a predetermined time a that is a time period relating to preparation of the new TL frame in the master node, than the start of transmission of the (S+2)-th TL frame. In FIG. 24, the predetermined time a is indicated by a character X.

In this case, the master node transmits the S-th TL frame stored in the transmission buffer while the master node receives and stores the (S−1)-th TL frame into the reception buffer partly in parallel with the transmission. In the TL frame transmission module 18, the reception buffer is preferably a buffer next to the current transmission buffer. The master node reads data from the TL frame during the master node is storing the frame into the reception buffer, or after the master node finishes the storing. Upon completion of reception of the (S−1)-th TL frame, the master node performs check for error of the received TL frame and designates that reception buffer as the next transmission buffer and the buffer next to the designated transmission buffer (the current reception buffer) as the next reception buffer if the received TL frame has no abnormality. The master node processes the (S−1)-th TL frame stored in the next transmission buffer to generate the (S+1)-th TL frame.

Further, since the S-th TL frame will return in a short time, the master node changes the prepared next buffer to the reception buffer to start storing the received S-th TL frame. Subsequently, when the master node completes transmitting the S-th TL frame in the transmission buffer, the master node frees up the transmission buffer.

At the start timing of the next wordclock, the master node changes the prepared next buffer to the transmission buffer and starts transmission of the (S+1)-th TL frame stored therein. Upon completion of reception of the S-th TL frame, the master node then performs error check of the received S-th TL frame and designates the reception buffer storing the S-th TL frame as the next transmission buffer and the buffer next to the designated transmission buffer (the current reception buffer) as the next reception buffer if the received TL frame has no abnormality. The master node processes the S-th TL frame stored in the next transmission buffer to generate the (S+2)-th TL frame.

By repeating the above procedure, a new TL frame is generated at all times based on the TL frame which is judged as normal as a whole.

The first and second TL frames are preferably generated based on a predetermined model because there is no TL frame as a base.

Instead of processing the TL frame in the frame buffer, the master node may read the TL frame from the buffer at the output time, and output the header and the contents of the read TL frame while replacing them with the data from the waveform data transmission buffer 16, the TL data transmission buffer 17, and the ITL data transmission buffer 53. In this variation, the number of buffers required is also (k+1), though the transmission buffer stores not the TL frame to be transmitted but the TL frame received by the node.

By doubling the operation speed of each buffer and designing the buffer such that it can receive while transmitting, the "transmission buffer" at a certain timing when the TL frame returns to the master node can be used as the "reception buffer", consequently the number of buffers can be reduced to k that is smaller by one than that of the above-described embodiment.

Figure 25:
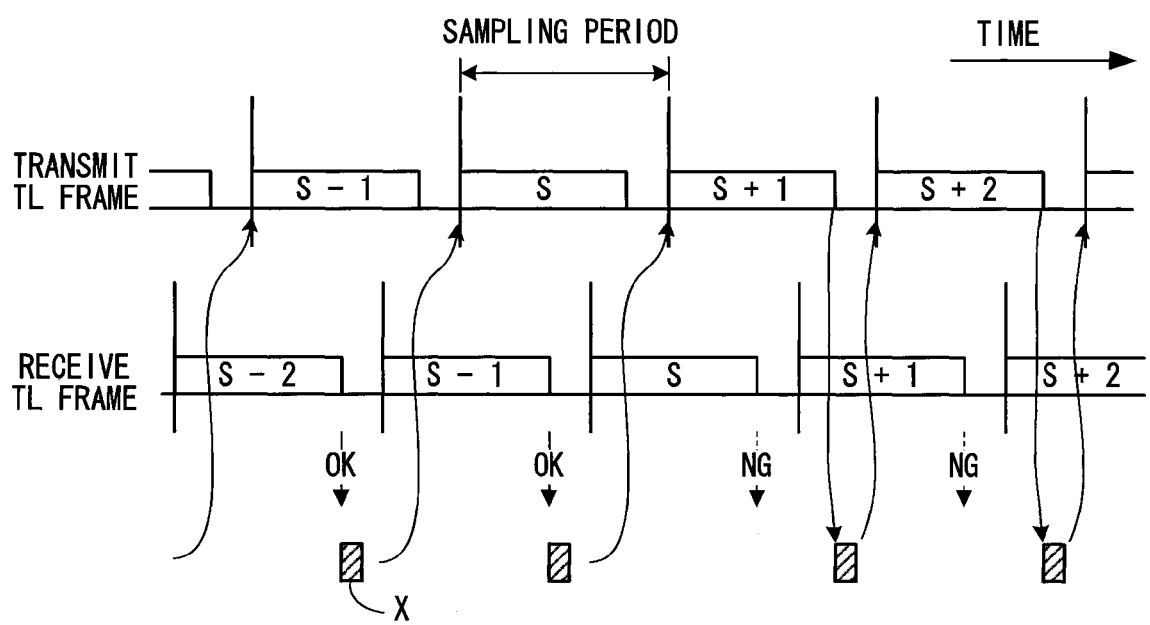
FIG. 25 is a chart showing another example thereof.

FIG. 25 shows a timing of transmitting/receiving and generating the TL frame in the master node when the S-th TL frame and frames subsequent thereto cannot normally circulate through the loop transmission route. The case where the TL frames cannot normally circulate means not only the case where abnormality is detected in the TL frame which the master node just received but also the case where abnormality has been detected in another node and the abnormality is recorded in the TL frame.

In this case, if the master node generates the (S+2)-th TL frame based on the S-th TL frame which has not normally circulated (in which data might be broken), each of the waveform data in the TL frame loses the consecutiveness of the samples in time domain and may cause noise. Hence, the master node which detected that the TL frame has not normally circulated discards the TL frame in the reception buffer, and designates the buffer as the next reception buffer and designates the transmission buffer at that time as the next transmission buffer. At that time, the transmission buffer is still transmitting, so the generation of a new TL frame is performed after completion of the transmission. Namely, after the master node completes transmitting the (S+1)-th TL frame, the master node processes the (S+1)-th TL frame (which includes data of the (S−1)-th TL frame that is a latest TL frame whose normal circulation through the transmission route has been confirmed) stored in the next transmission buffer to generate the (S+2)-th TL frame.

When the master node detects that the next (S+1)-th TL frame has not been received normally either, the master node designates the transmission buffer as the next transmission buffer again when generating the (S+3)-th TL frame, and after the master node completes transmitting the (S+2)-th TL frame, the master node generates the (S+3)-th TL frame based on the (S+2)-th TL frame (which includes data of the (S−1)-th TL frame) stored in the transmission buffer. In the same way, the master node repeatedly uses the same buffer as the transmission buffer to generate a new TL frame until it normally receives the TL frame.

Even in the above-described case, the data which the master node does not overwrite and transmits as it is to the next nod among the data written in the (S−1)-th TL frame remains unchanged even in the (S+2)-th TL frame, in the (S+3)-th TL frame, and in the TL frames subsequent thereto. Accordingly, in the above case, the same result as the case where the data of the (S−1)-th TL frame is separately stored, and a new TL frame is generated every time based on the stored TL frame.

Next, process for realizing the operations shown in FIG. 24 and FIG. 25 in the master node will be described.

Figure 26:
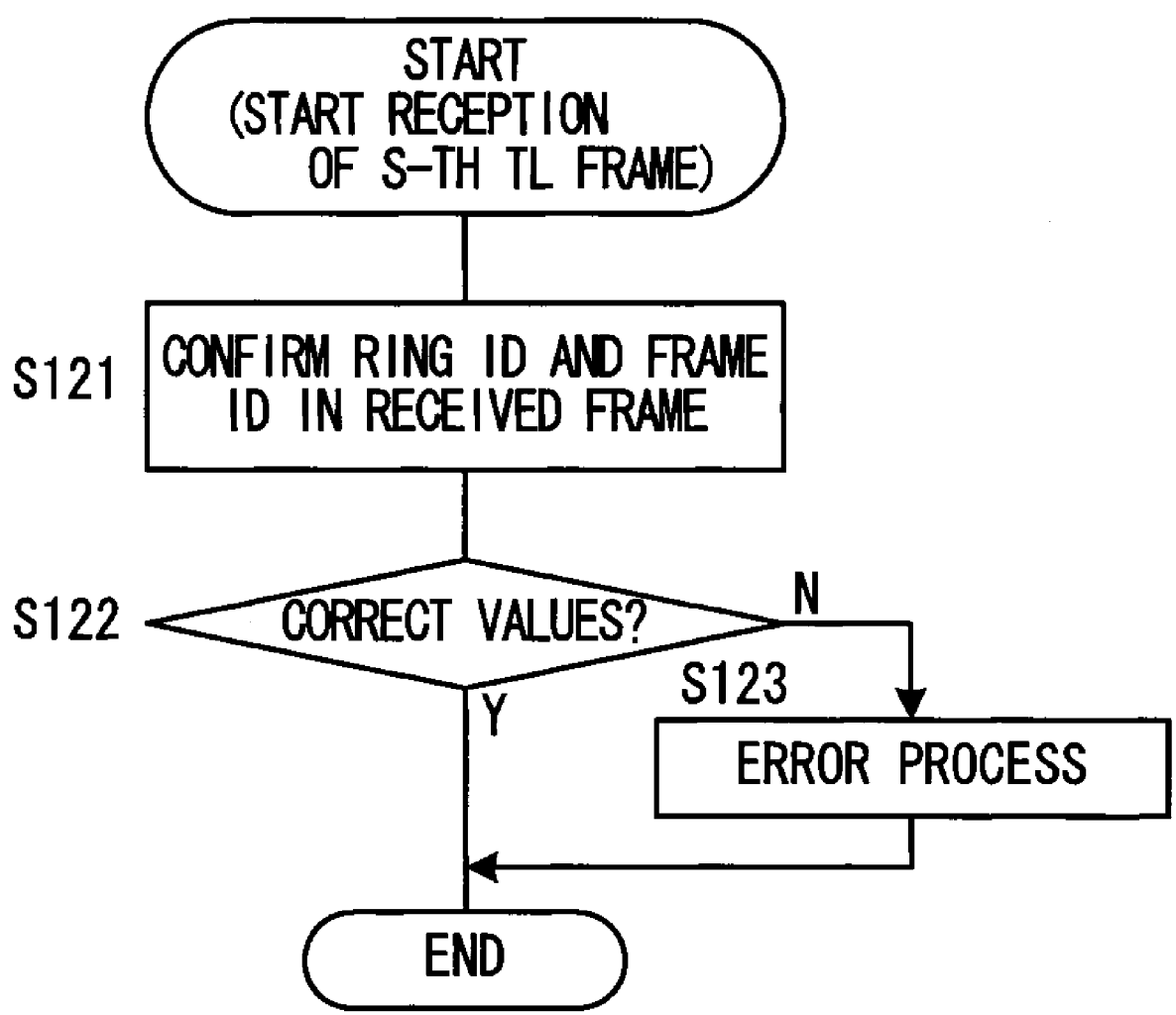
FIG. 26 is a flowchart of process executed when the master node detects start of reception of the S-th TL frame.

FIG. 26 shows a flowchart of process executed when the master node detects start of reception of the S-th TL frame.

The CPU of the controller 40 in the master node starts the process shown in FIG. 26 when it detects the start of reception of the S-th TL frame. The CPU first confirms the ring ID and the frame ID written in the received frame as the management data (S121) and judges whether or not the IDs have correct values (S122). The correct value of the frame ID is the number sequent to the number of the preceding TL frame. The correct value of the ring ID is the ID of the transmission route in which the reception I/F which has received the frame is included.

When the frame ID and the ring ID have the correct values, there is no problem, and therefore the CPU ends the process in FIG. 26 and continues receiving the TL frame and accumulating the TL frame into the buffer. However, when at least one of the values of the frame ID and the ring ID is incorrect, it is conceivable that there is a missing frame or the form of the transmission route has changed. Hence, the fact that there is an error in the frame is stored in error process (S123) so that the CPU judges that there is an error at Step S132 in the following FIG. 27.

Figure 27:
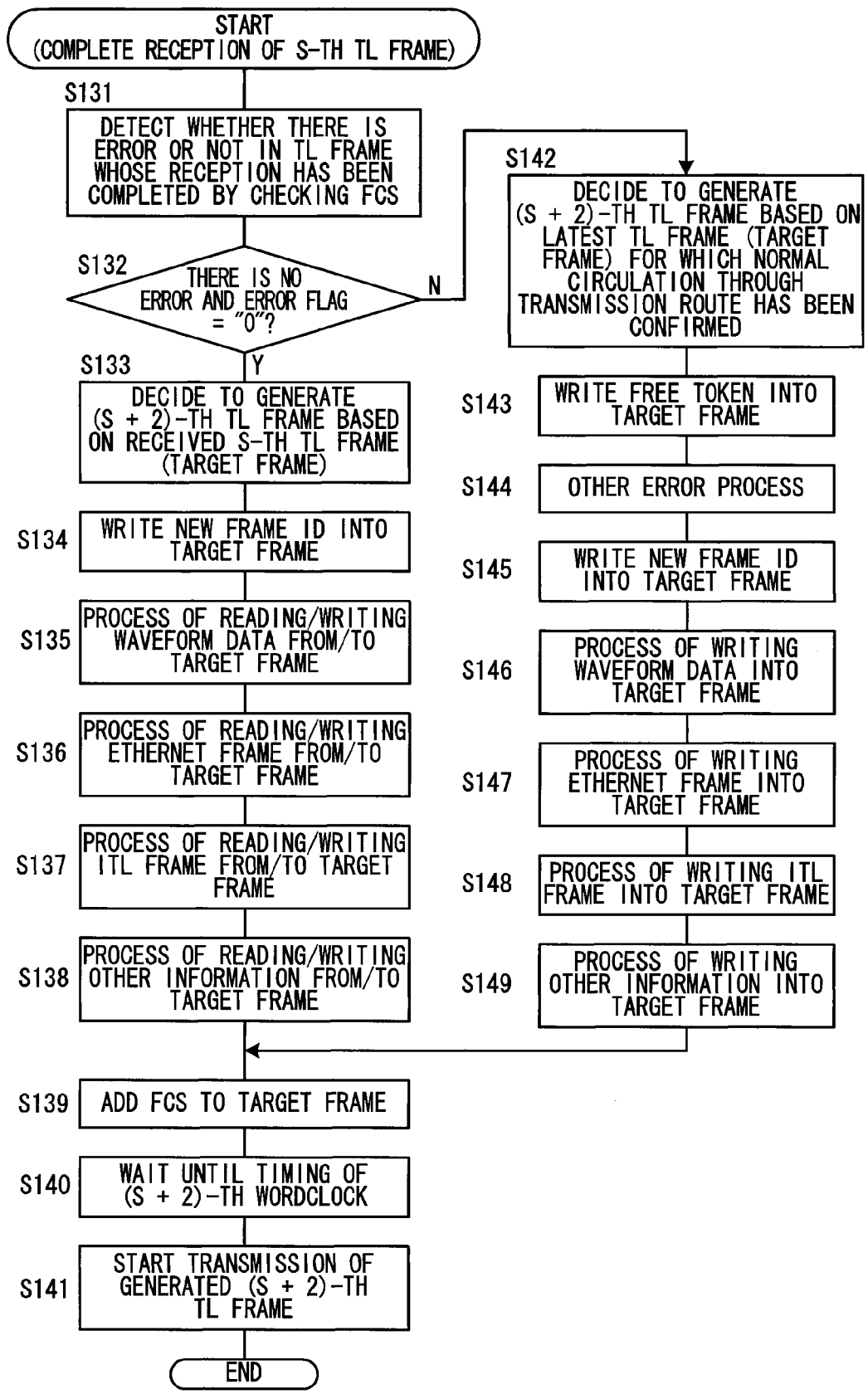
FIG. 27 is a flowchart of process executed when the master node detects completion of reception of the S-th TL frame.

Next, FIG. 27 shows a flowchart of process executed when the master node detects completion of reception of the S-th TL frame.

When the CPU of the controller 40 in the master node detects that the completion of reception of the S-th TL frame, the CPU starts the process shown in FIG. 27. The CPU firstly checks the FCS 105 to determine whether there is an error or not in the TL frame whose reception has been completed (S131). If there is no error and the value of an error flag EDF written in the received TL frame is "0" indicating no error (S132), the CPU judges that the received TL frame has normally circulated through the transmission route, and decides to generate the (S+2)-th TL frame based on the received S-th TL frame (S133). Hereinafter, the TL frame which is used as the base for generation of a new TL frame is called a "target frame."

Thereafter, the CPU writes a new frame ID into the target frame to generate a new TL frame (S134), and performs necessary control operation for reading and writing the waveform data, the Ethernet frame, the ITL frame and other information from/into the target frame (S135 to S138) so that the data to be outputted is written into the (S+2)-th TL frame.

The data to be read or written from/into the frame is as has described using FIG. 8. The process at Steps S135 to S138 is not limited to the concrete order described in the figure, and of course may be performed in different orders, for example, the order in which writing of the data and information is performed after reading of them is completed.

Note that there is no data to be written into the ITL frame, data indicating the fact that there is no data to be written is written into the ITL frame region 106. This data can be written as data of the block having the number of blocks "1," a block ID "1," and data size "0." This also applies to ITL frame write process at other steps.

After Step S138, the CPU adds the FCS to the target frame to complete it as a TL frame (S139), waits until the timing of the (S+2)-th wordclock (S140), and starts transmission of the generated (S+2)-th TL frame (S141).

On the other hand, when there is an error or the value of the error flag EDF is "1" indicating that there is an error at Step S132, the CPU judges that the received TL frame has not normally circulated through the transmission route and decides to generate the (S+2)-th TL frame based on the latest TL frame for which normal circulation through the transmission route has been confirmed (S142). Also in this case, the TL frame which is used as the base for generation of a new TL frame is called a "target frame."

Thereafter, the CPU writes a free token into the target frame (S143). The free token is data indicating that the Ethernet frame region 106 of the TL frame 100 is not in use at present and a node wishing to transmit an Ethernet frame is permitted to write data into the Ethernet frame region 106. The free token is written as the predetermined value of the transmission source ID (for example, "0") in this embodiment.

The reason why the free token is written into the target frame at Step S143 is to make the Ethernet frame region 106 unoccupied because the data which is written in the target frame and was transmitted in the past is useless if it is transmitted again. Thereafter, the master node itself may write data of the Ethernet frame to be transmitted, into the Ethernet frame region 106.

The CPU then performs the error process associated with the judgment of NO at Step S132 (S144). This process is executed because the data written in the received TL frame is unreliable, similar to process in a slave node which will be described later using FIG. 29. The CPU may perform process such as notification of the error to the upper layer, in step S144.

After Step S144, the CPU writes a new frame ID into the target frame to generate a new TL frame (S145), and performs necessary control operation for writing the waveform data, the Ethernet frame, the ITL frame and other information into the target frame (S146 to S149) so that the data to be outputted is written in the (S+2)-th TL frame. The process at Steps S146 to S149 is not limited to the concrete order described in the figure, as in the case of Steps S135 to S138. Further, it is unnecessary here to read the data from the target frame.

After Step S149, the CPU proceeds to Step S139, starts transmission of the newly generated TL frame as in the case of no error, and ends the process.

By performing the above process, the master node can generate a new TL frame based on the TL frame whose normal circulation through the transmission route has been confirmed, to thereby generate a correct TL frame at all times.

Even if the value of the error flag EDF is "1," the data which has been written by the immediately preceding node is reliable when the received TL frame itself has no error. Therefore, it is preferable to read only the data in the ITL frame region among the data of the received TL frame and use the read data for process.

Further, the operation as has been described using FIG. 24 to FIG. 27 is for the case when the periodic update value k is "2". When the periodic update value k is a value greater than 2, the master node generates the (S+k)-th TL frame based on the S-th TL frame, and other than that point, the operation of the master node is basically same as the operation where the periodic update value k is "2".

More specifically, in the operation corresponding to the timing chart in FIG. 24, when the master node has completed normal reception of the S-th TL frame, it generates the (S+k)-th TL frame based on the S-th TL frame and starts transmission of the (S+k)-th TL frame at the timing of the (S+k)-th wordclock. In the operation corresponding to the timing chart in FIG. 25, when the master node could not normally receive the S-th TL frame, the master node waits for the completion of transmission of the (S+k−1)-th TL frame, and then generates the (S+k)-th TL frame based on "the data of the TL frame which has been normally received last" included in the (S+k−1)-th TL frame stored in the transmission buffer, and starts transmission of the (S+k)-th TL frame at the timing of the (S+k)-th wordclock.

By incrementing the periodic update value k, the upper-limit time for circulation of the TL frame in the audio network system can be increased to correspondingly increase the distance between the nodes and increase the number of nodes to be incorporated into the system. However, there is tradeoff that the delay in transfer of the audio signals in the audio network increases corresponding to the increase in the periodic update value k.

3.3 Use of Data in Slave Node

As has been described using FIG. 6 and FIG. 8, each node operating in the RTL mode in the audio network system reads the data to be processed by the node from the TL frame, and writes the data to be transmitted to the other processors, into the TL frame.

Next, process relating to transmission/reception of the TL frame in the slave node will be described.

Figure 28:
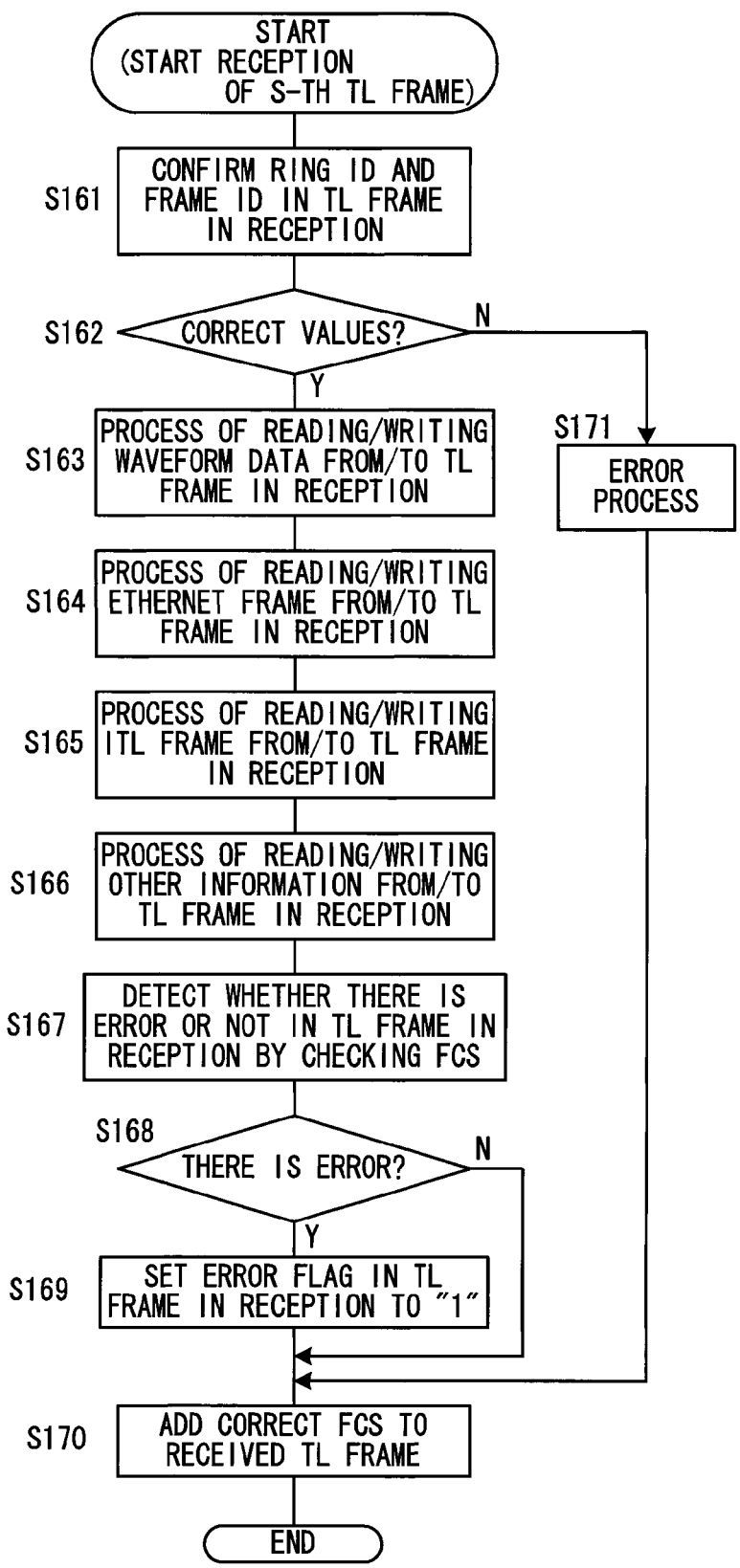
FIG. 28 is a flowchart of process executed when the slave node detects start of reception of the S-th TL frame.

FIG. 28 shows a flowchart of process executed when the slave node detects start of reception of the S-th TL frame.

The CPU of the controller 40 in the slave node starts the process shown in FIG. 28 when it detects the start of reception of the S-th TL frame. The CPU firstly confirms the ring ID and the frame ID written as the management data in the TL frame in reception (S161) and judge whether or not the IDs have correct values (S162). This judgment is the same as at Steps S121 and S122 in FIG. 26 in the master node, and when the values of the IDs are not correct, the CPU makes the received TL frame to just flashes through the slave node as the error process (S171). In this case, the subsequent nodes on the transmission route similarly make the TL frame to just flash through the nodes and return to the master node. Alternatively, it is conceivable that the error flag EDF is set to "1" as in the case of FCS error.

On the other hand, when there is no problem at Step S162, the CPU performs read and write process of the waveform data, the Ethernet frame, the ITL frame and other information from/into the received TL frame (S163 to S166).

Note that as has been described for FIG. 8, the slave node performs reading/writing of data from/into the received TL frame and also starts transmission of the received TL frame after the reading/writing to the next node without waiting for completion of reception of the whole TL frame. Accordingly, the reading/writing processes at Steps S163 to S166 are executed at appropriate timings according to the advance of the reception of the frame, and are not always performed according to the order described in the flowchart. The data to be read from the frame and written into the frame is as has been described using FIG. 8. Further, the transmission of the frame to the next node is started and advanced when a predetermined amount of the frame data is accumulated, independently of the process in FIG. 28.

Therefore, whether there is an error or not in the TL frame cannot be grasped at a time of reading/writing data from/to the TL frame in the slave node and, such a case is addressed by later-described process shown in FIG. 29, FIG. 31 and FIG. 32.

After Step S166, when the CPU receives the FCS of the TL frame, the CPU detects whether there is an error or not in the TL frame in reception by checking the FCS (S167). If there is an error (S168), the CPU sets the error flag EDF in the TL frame in reception to "1" indicating that there is an error (S169). If there is an error here, the CPU finds that accuracy of the data written in the received TL frame is not guaranteed. However, accuracy of the data written by the slave node itself into the TL frame and outputted is guaranteed because the data is overwritten on the not guaranteed original data.

On the other hand, if there is no error at Step S168, the CPU does not change the value of the error flag EDF, and if "1" is set as the value of the error flag EDF, the CPU keeps the value unchanged. This is because the error flag EDF is a flag indicating whether or not an error has occurred even once during circulation of the TL frame.

In either case, the CPU finally adds a correct FCS to the received TL frame (S170) and ends the process. By referring to the added the FCS, the transmission destination node will recognize that there is no error in the frame outputted from the node which added the FCS. However, when the value of the error flag EDF is "1", it can be found that an error has occurred at some location from the master node to the own node.

By executing the above-described process, the slave node can read/write necessary data from/to the TL frame by the time when the slave node transmits the received TL frame to the next node.

Figure 29:
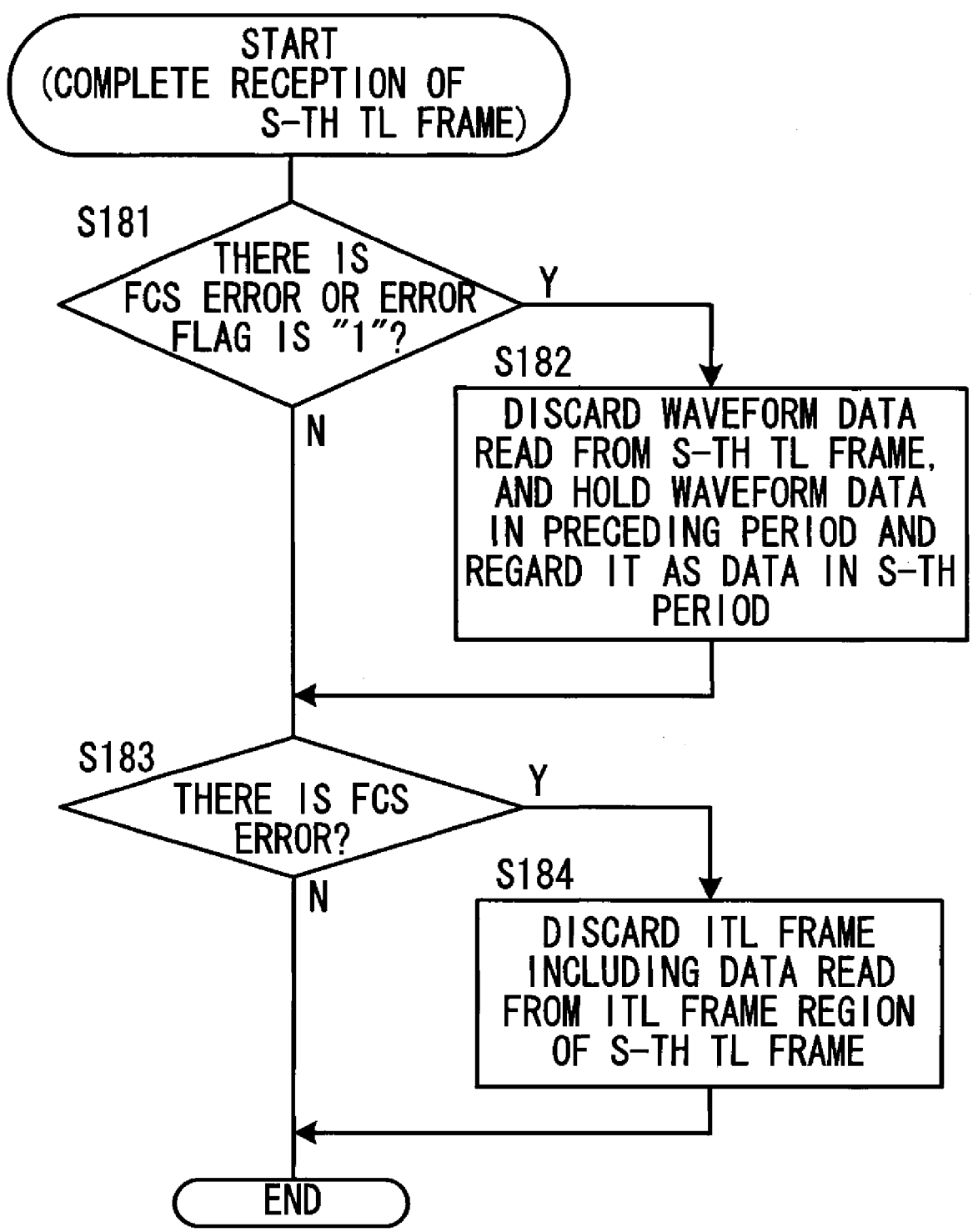
FIG. 29 is a flowchart of process executed when the slave node detect completion of reception of the S-th TL frame.

Next, FIG. 29 shows a flowchart of process executed when the slave node detects completion of reception of the S-th TL frame.

This process is process of deciding whether or not data read from the received TL frame is used, according to the result of error check of the received TL frame. The CPU of the controller 40 in the slave node starts the process shown in FIG. 29 when it detects the start of reception of the S-th TL frame.

If there is an FCS error or the value of the error flag EDF is "1" (S181), the CPU recognizes that accuracy of the waveform data read from the S-th TL frame is not guaranteed. Therefore, the CPU discards the data and holds the waveform data in the preceding period and regards the held waveform data as data in the S-th period instead of the read waveform data (S182). Though illustration is omitted, when YES is judged at Step S181, the CPU preferably discards also the other data read at Step S166.

When there is an FCS error (S183), the CPU recognizes accuracy of the data read from the ITL frame region 107 of the S-th TL frame is not guaranteed. Therefore, the CPU discards the ITL frame including the data (S184). This is because, in the case where the ITL frame is divided into a plurality of blocks and written into ITL frame regions 107, if accuracy of only one of the blocks of data is not guaranteed, accuracy of the whole ITL frame is not guaranteed.

This is the end of the process in FIG. 29.

By executing the above process, even if the slave node reads/writes data from/to the received TL frame before confirming whether there is an error or not in the TL frame, the slave node can exclude the error data even after the reading/writing, from the TL frame for subsequent process.

There is no process of excluding the data in the Ethernet region in FIG. 29, and the excluding process will be described in the next section.

If there is no FCS error, accuracy of the data in the ITL frame region 107 is guaranteed even if the value of the error flag EDF is "1." This is because when the data to be read by the own node is written in the ITL frame region 107, the node which wrote the data is the immediately preceding node, and the FCS guarantees that no transport error has occurred between the immediately preceding node and the own node.

It is also conceivable that the CPU does not add the FCS at Step S170 as a modification of the process shown in FIG. 28. In this case, the TL frame in which an error has occurred once will circulate through the transmission route keeping the error and return to the master node. Therefore, it is unnecessary to inform the subsequent nodes of the occurrence of the error by using the error flag EDF, but accuracy of all the data including the ITL frame region 107 in the frame in which an error has occurred once is not guaranteed.

3.4 Transmission and Reception of Ethernet Frame Data

As has been already described, the Ethernet frame is written in the TL frame so that it can be transmitted/received between arbitrary nodes in the audio network system 1. However, it becomes necessary to transmit the Ethernet frame at any time in each node out of synchronization, unlike the case of the waveform data. Therefore, a function of controlling transmission/reception of the Ethernet frame is provided which is different from that for the waveform data.

The different function will be described next. The process and operation which will be described below are common to the master node and the slave node.

In the audio signal processor 2, the MAC processing module 14 of the network I/F card 215 generates the Ethernet frame to be transmitted and actually receives the Ethernet frame. The other modules in the network I/F card 215 including the controller 40 mediate the transmission/reception of the Ethernet frame.

The transmission/reception of the Ethernet frame is realized by process of transmitting the frame to all of the processors in the network on the transmission side, and process of discarding the received Ethernet frame on the reception side if the received Ethernet frame is not addressed to the own processor, and therefore the transmission/reception control in this embodiment is performed in accordance with the above-described transmission/reception protocol of the Ethernet frame. However, the process of discarding the frame which is not addressed to the own processor is process performed by the MAC processing module 14, and the controller 40 of the network I/F card 215 passes to the MAC processing module 14 all of the frames which are appropriately transmitted to the network I/F card 215.

Namely, the controller 40 performs process corresponding to the physical layer (PHY) of the Ethernet, and the "upper layer" in this section means the MAC processing module 14 which performs processing on the MAC layer. The CPU 201 on the main body side is a further upper layer.

Accordingly, the MAC processing module 14 itself performs process such as process of generating the Ethernet frame for transmitting data (IP packet or the like) in response to the data transmission request from the CPU 201, and process of extracting necessary data from the Ethernet frame addressed to the own node and passing the data to the CPU 201.

The above-described process executed by the CPU of the controller 40 for transmitting/receiving the Ethernet frame will be described.

Figure 30:
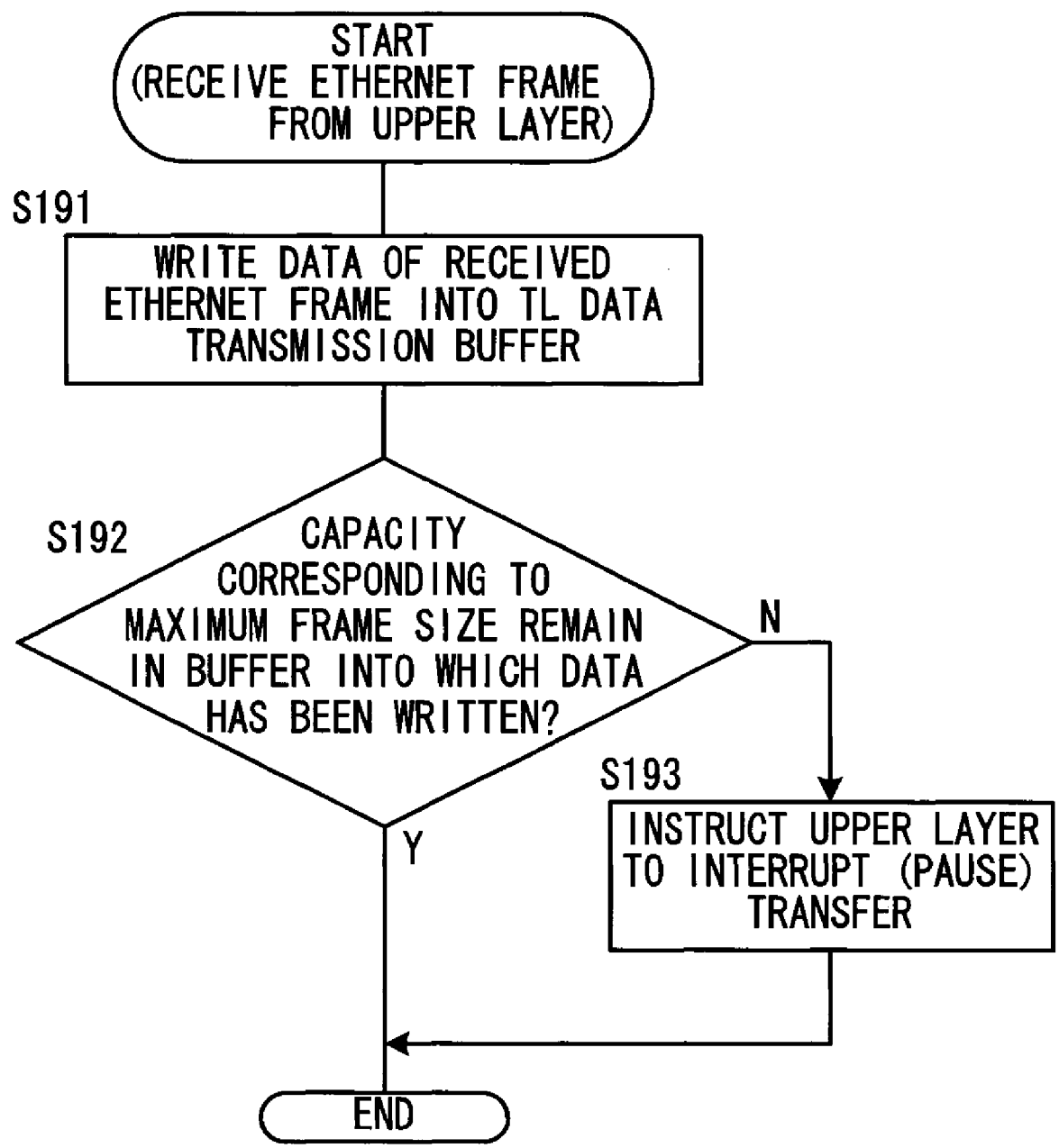
FIG. 30 is a flowchart of process executed when the CPU of the controller of the network I/F card receives from the upper layer the Ethernet frame to be transmitted.

FIG. 30 shows a flowchart of the process executed when the CPU of the controller 40 receives from the upper layer the Ethernet frame to be transmitted.

When the CPU of the controller 40 receives the Ethernet frame to be transmitted, from the CPU 201 on the main body side that is the upper layer, the CPU of the controller 40 starts the process shown in FIG. 30. The CPU first writes the data of the received Ethernet frame into the TL data transmission buffer 17 (S191).

If any more capacity corresponding to the maximum frame size does not remain in the buffer into which the data has been written (S192), the CPU instructs the upper layer to interrupt transfer of the Ethernet frame (S193) because the CPU cannot appropriately process the Ethernet frame if it receives more Ethernet frames, and then ends the process. If there is enough capacity, the CPU just ends the process.

By the above process, the CPU of the controller 40 can bring the Ethernet frame received from the upper layer into a transmission waiting state. Note that the CPU releases the interruption of transfer instructed to the upper layer at appropriate time when a sufficient capacity of the TL data transmission buffer 17 can be secured.

Figure 31:
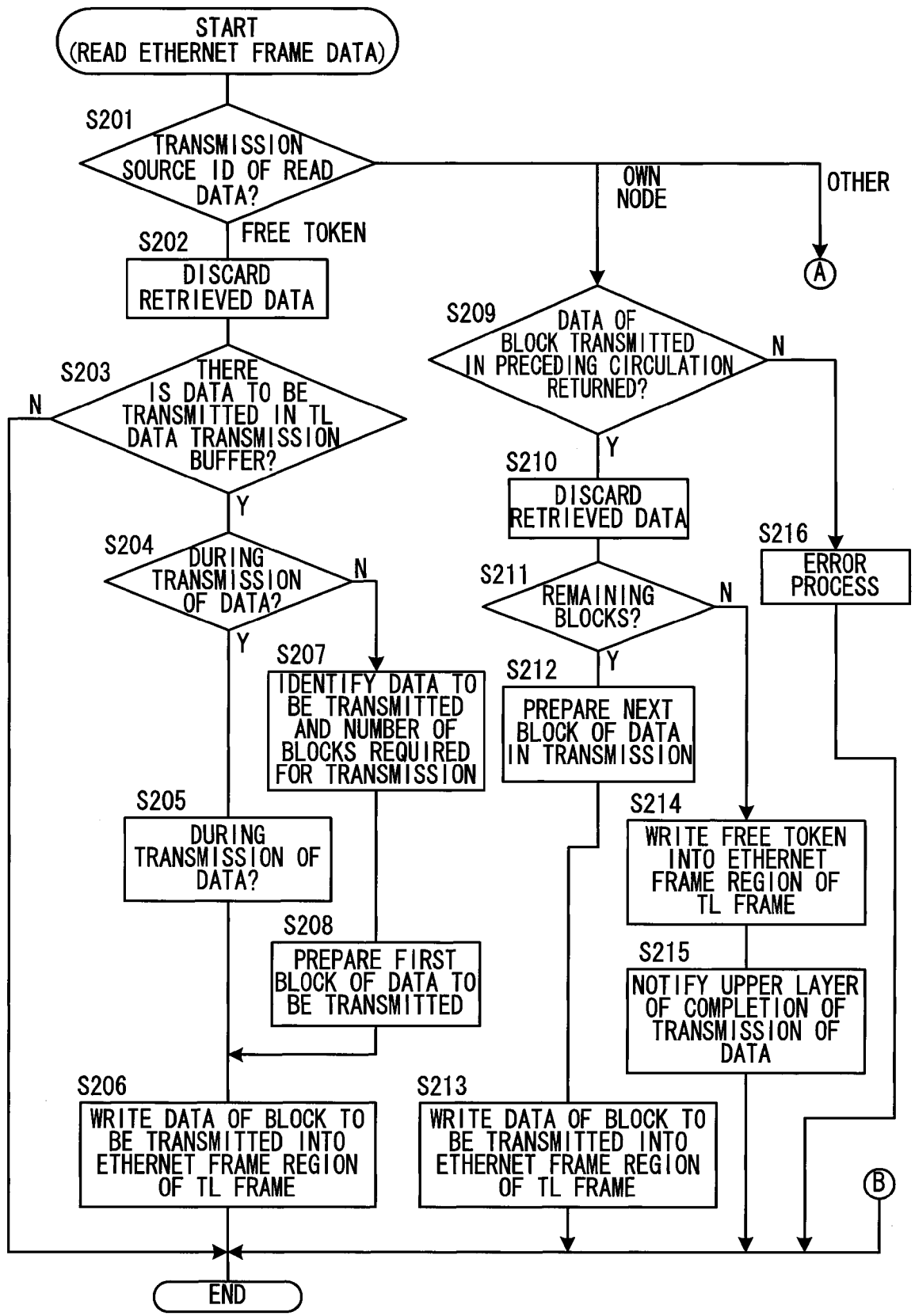
FIG. 31 is a flowchart of process executed when the CPU reads the data in the Ethernet frame region of the TL frame.

FIG. 31 shows a flowchart of process executed when the CPU of the controller 40 reads the data in the Ethernet frame region of the TL frame. Though description will be made here assuming that the CPU of the controller 40 executes the process, a part of the process may be shared between the TL frame reception module 11 and the hardware of the TL frame transmission module 18.

The CPU of the controller 40 starts the process shown in FIG. 31 when it retrieves the data in the Ethernet frame region 106 of the TL frame 100 in the process at Step S136 in FIG. 27 or at Step S164 in FIG. 28.

The CPU judges what is written as the transmission source ID in the retrieved data (S201). First of all, it is only necessary for the CPU to discriminate among the free token, the own node ID, and other data.

The free token among them is, as described above, data indicating that the Ethernet frame region 106 of the TL frame 100 is not in use at present and therefore a node which wishes to transmit an Ethernet frame is permitted to write data into the Ethernet frame region 106. The free token is written as a specific value (for example, "0") of the transmission source ID in this embodiment. The aforementioned other data is normally the ID of another node but might be meaningless data when the TL frame is broken.

When the judgment at Step S201 is the free token, the CPU discards the retrieved data because the retrieved data is not the data of the Ethernet frame (S202). Further, the CPU recognizes that a transmission right of the Ethernet frame is passed to the own node, the CPU therefore proceeds to the process at Step S203 and subsequent steps relating to the transmission of the Ethernet frame.

In this process, if there is data to be transmitted in the TL data transmission buffer 17 (S203), the CPU writes the data to be transmitted, into the Ethernet frame region 106 of the TL frame 100 which is flashing through the own node. When the CPU transmits the Ethernet frame, the CPU divides the frame into blocks and writes data corresponding to one block into one TL frame as has been described using FIG. 2 and FIG. 3A to FIG. 3C.

More specifically, when the CPU is transmitting the Ethernet frame (in a state where only part of blocks have been transmitted) (S204), the CPU prepares data for a next block of the Ethernet frame in transmission (S205), and writes the data for the block into the Ethernet frame region 106 (S206). The preparation of the block means the process of cutting out the data of the Ethernet frame corresponding to one block, and adding data such as the number of blocks, the block ID and so on to the cutout data as shown in FIG. 3B to generate data in the format to be written into the Ethernet frame region 106.

When the CPU is not transmitting the Ethernet frame (in a state where transmission of a new Ethernet frame is started from then) at Step S204, the CPU identifies the Ethernet frame to be transmitted and the number of blocks required for the transmission (S207), prepares a first block of the Ethernet frame to be transmitted (S208), and writes the data for the block into the Ethernet frame region 106 (S206).

In both of the above-described cases, the CPU ends the process after Step S206.

Alternatively, when the judgment at Step S201 is the ID of the own node, the retrieved data is considered to be the data which the own node wrote into the frame in the preceding circulation of the frame and has circulated through the transmission route. Hence, the CPU refers to the block ID and contents of the data, and when the CPU has confirmed that the retrieved data is the data which the own node wrote into the frame in the preceding circulation of the frame and has circulated through the transmission route (S209), the CPU discards the retrieved data because the retrieved data is not the data of the Ethernet frame which is transmitted from another node (S210). The node which has written the data in the Ethernet frame region 106 in the preceding circulation of the frame can keep the transmission right until the node completes the transmission of data corresponding to one Ethernet frame in this embodiment, and therefore the CPU proceeds to Step S211 and steps subsequent thereto also relating to the transmission of the Ethernet frame in this case.

In this process, if a block which has not been transmitted yet remains regarding the Ethernet frame in transmission (S211), the CPU prepares data for the next block of the frame in transmission (S212), writes the data for the block into the Ethernet frame region 106 of the TL frame 100 in flashing through the own node (S213), and then ends the process.

If the transmission of all of the blocks has been completed, the CPU passes the transmission right to another processor by writing the free token into the Ethernet frame region 106

(S214), notifies the upper layer of the completion of the transmission of the Ethernet frame (S215), and then ends the process.

When NO is judged at Step S209, it is considered that an error has occurred in the transmission of the Ethernet frame. Hence, the CPU executes error process (S216). Conceivable process as the error process includes, for example, stopping the transmission of the Ethernet frame in progress, and notifying, of the occurrence of the error, the upper layer and all of the nodes in the system. This notification can be performed by writing invalid data in a predetermined format into the Ethernet frame region 106 of the TL frame 100 and transmitting the TL frame including the invalid data.

Note that retransmission of the Ethernet frame when the error has occurred is not automatically performed on the network I/F card 215 side, but the upper layer requests the retransmission from the network I/F card 215 when necessary.

Figure 32:
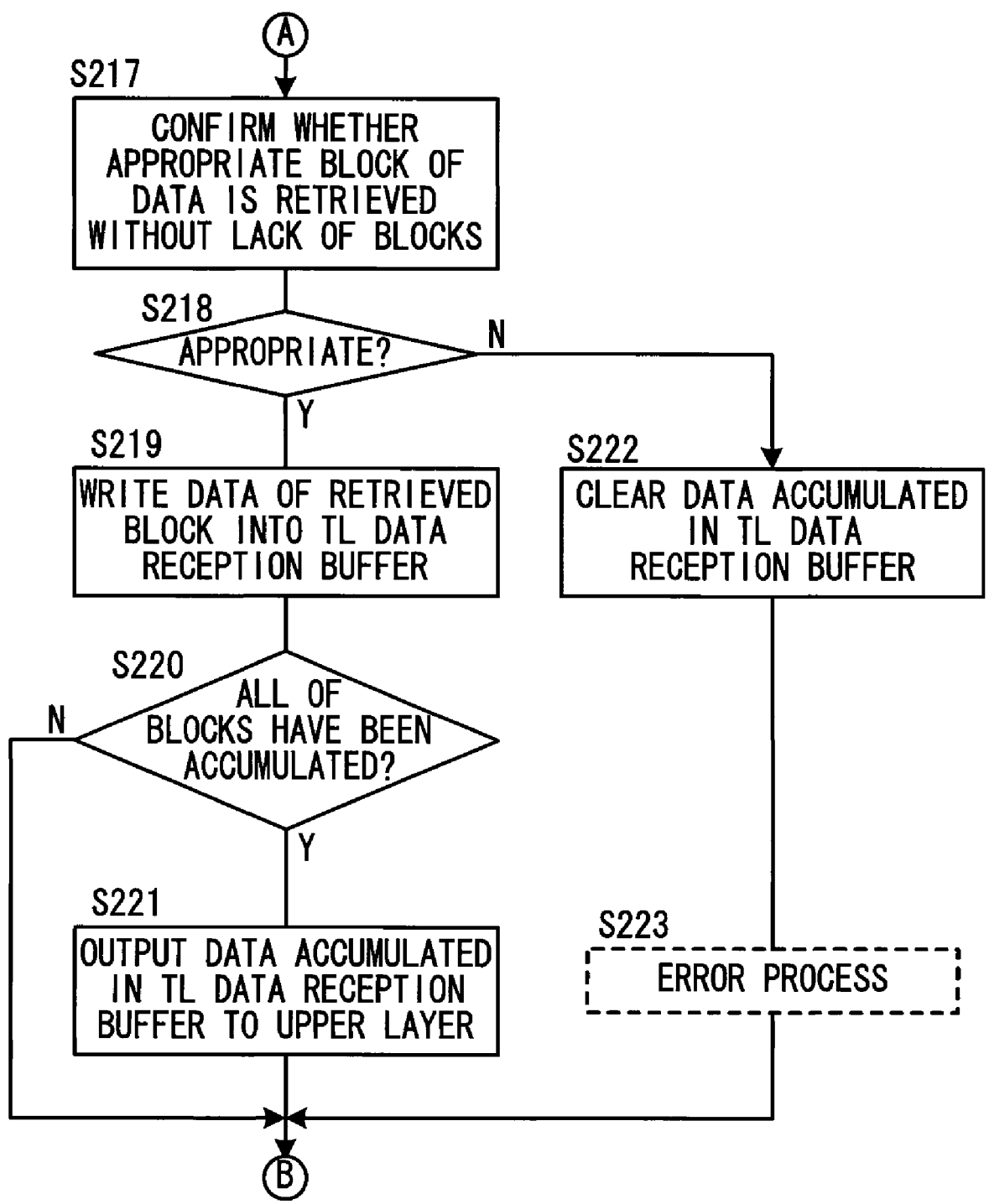
FIG. 32 is a flowchart of continuation of the process.

Alternatively, the judgment at Step S201 is the other data, the process proceeds to Step S217 in FIG. 32. In this case, the retrieved data is considered to be data of the Ethernet frame transmitted from another node, and therefore the CPU executes process relating to reception of the Ethernet frame.

The CPU firstly confirms whether an appropriate block of data is retrieved without lack of blocks (S217). This process is performed for confirming that the CPU has received blocks in the order of the IDs of the blocks for each transmission source. Even when the processor receives data alternately from a plurality of transmission sources, it is only necessary for the CPU to have received the blocks in the order of the IDs of the blocks for each of the transmission sources.

When the appropriate block of the data is retrieved (S218), the CPU writes the frame data of the retrieved block, into the TL data reception buffer 13 (S219). The CPU needs in this event to write only the portion of the frame data which will be united with other portions to form the Ethernet frame, of the data retrieved from the Ethernet frame region 106, and the CPU does not need to write the data such as the number of blocks, the block ID and so on into the TL data reception buffer 13 if CPU otherwise stores those kinds of data for confirmation of a lack of blocks. Also when the aforementioned empty region exists at the tail of the frame, the data in the empty region does not need to be accumulated. Note that when data from a plurality of transmission sources have been alternately retrieved, the data shall be stored divided for each of the transmission sources.

When the data of all of the blocks for one Ethernet frame is accumulated in the TL data reception buffer 13 by writing at Step S219 (S220), the CPU outputs to the upper layer the data of the Ethernet frame obtained by uniting the data of the accumulated blocks (S221), and then ends the process (see FIG. 31). If the data of all of the blocks for one Ethernet frame is not accumulated in the TL data reception buffer 13, the CPU just ends the process.

When there is a lack of blocks at Step S218, the CPU recognizes the lack as occurrence of a failure in the transmission of the data, and clears the data accumulated until then in the TL data reception buffer (S222). In this event, if the CPU can identify the transmission source of the data, the CPU may clear only the data from the transmission source. Also when the retrieved data is invalid data written at Step S216 in FIG. 31, when the node ID of the retrieved data is not the node ID of any of the nodes in the system, or when the data is completely meaningless, the CPU judges NO at Step S218, and then clears the data.

After Step S222, the slave node just ends the process, and the master node performs error process (S223) and confirms the status of communication. This process is process of writing test data into the Ethernet frame region 106 and transmitting it and confirming that the frame normally returns to the master node. When the frame has normally returned to the master node, the CPU recognizes that the error is temporal, and therefore writes the free token into the Ethernet frame region 106 to make the Ethernet frame region 106 available again.

In the Audio network system 1, each processor executes the above-described process, whereby the transmission right of the Ethernet frame is appropriately arbitrated among the processors, and the transmission/reception of the Ethernet frame can be performed among nodes using the Ethernet frame region 106 of the TL frame 100.

Because of the break of the connection described using FIG. 21 and FIG. 22, and the like, the node which has written the data into the Ethernet frame region 106 might be removed from the system. In this case, since there is no node which judges that the transmission source ID is the own node's ID in the system at Step S201 in FIG. 31, any node does not overwrite the data in the Ethernet frame region 106.

As a countermeasure against such a situation, for example, the master node may check the transmission source ID against the contents of the topology table, and when the transmission source ID is not the MAC address of a node in the system, the master node may discard the data in the Ethernet frame region 106 and write the free token into the Ethernet frame region 106. By the above-described countermeasure, when the node which has written data into the Ethernet frame region 106 is removed from the system, the Ethernet frame region 106 can be immediately released.

Though the Ethernet frame region 106 can be released also by the error process at Step S223, it takes a longer time to release the Ethernet frame region 106 than in the case in which the topology table is confirmed because transmission/reception of the test data is confirmed after the same data has been read twice.

In the example of FIG. 31, when each node once starts transmitting data, the node can keep the transmission right until the node completes the transmission of data corresponding to one frame. However, it is also conceivable to employ another arbitration algorithm. For example, in the other algorithm, a node writes the free token every transmission of one block to hand over the transmission right to the next node, conversely the node can keep the transmission right until all necessary data has been transmitted even for a plurality of Ethernet frames, or the like. As a matter of course, other various kinds of algorithms are conceivable.

Alternatively, the Ethernet frame region may be divided into a plurality of regions, and a free token may be prepared for each of the regions so that the transmission right can be arbitrated independently for each of the regions. In this case, the notification of the completion of transmission at Step S215 in FIG. 31 is performed for the case where the completion of transmission of data can be confirmed for all of the regions.

When data of all the blocks is not accumulated in the TL reception buffer 13 within a predetermined time, the CPU may regard the situation as a communication error and clear the data accumulated until then.

4. Modifications

The explanation of the embodiments comes to an end, and it is of course that the configuration of processor, the configuration of data, concrete process steps, and so on are not limited to those in the above-described embodiments.

Further, it is not essential to circulate one TL frame in one sampling period, but it is also conceivable to circulate a plurality of TL frames in one sampling period, or to circulate one TL frame in a plurality of sampling periods (constant time length) into which, for each channel, plural samples of waveform data corresponding to the plurality of sampling periods are written.

In the case where a plurality of TL frames circulate in one sampling period, it is preferable that the control of writing/reading into/from the Ethernet frame region using the free token is performed independently for each TL frame in the sampling period. In this case, for example, different nodes can perform writing into the Ethernet frame regions in a first TL frame and a second TL frame in a certain sampling period.

Although the explanation has been made such that the master node and the slave node are different in function in the above-described embodiments, each processor cannot recognize which processor becomes the master node until the audio network system is actually constituted. Hence, each processor is preferably configured to be able to function selectively as the maser node or as the slave node so that each processor can enables an appropriate function depending on whether or not the processor decides that the processor itself functions as the master when it shifts to the TTL mode, or the processor has received the designation to be the master in the RTL mode by the OM command. However, it is also adoptable that even a processor which is not provided with the function of the master node can be incorporated into the system, the processor does not automatically become the master (including the temporary master), and the processor cannot be designated as the master. In this case, even if the master cannot be decided for this reason, it is only necessary to inhibit the processor from shifting from the ITL mode to the TTL mode.

It is of course possible to change the ratio of the waveform data to the control data in the TL frame. The size of either region could be reduced to 0.

In addition to the above, the periodic update value k is a variable value in the above-described embodiments, and may also be a fixed value. In this case, the upper-limit time corresponding to the periodic update value k is also a fixed value, and the number of nodes which can be added to the system is limited by that upper-limit time.

The various kinds of frames including the TL frame are not limited to the IEEE 802.3 format but may be in any other format.

Although the sampling frequency is 96 kHz in the above-described embodiments, the system can be designed with any frequency such as 88.2 kHz, 192 kHz, or the like. The system may be designed such that the sampling frequency can be switched.

These modifications and the modifications described in the explanation of the embodiments are applicable in any combination in a range without contradiction. Inversely, it is not always necessary for the network system and the audio signal processor to have all of the features which have been described in the explanation of the embodiments.

As is clear from the above description, with the network system or the audio signal processor of the invention, efficient automatic system construction is realized in accordance with user's arbitrary designation of master node among the processors included in the system, when constructing a system in which an audio transport frame generated by the master node and including a plurality of regions for audio signals circulates in a fixed period along a loop transmission route formed among the processors. Further, data communication is realized among the processors which have been already appropriately connected even if the maser node is not designated.

Alternatively, data transmission utilizing the ring transmission route is realized even among processors divided from the master node for any reason. Still alternatively, efficient data transmission among the processors is realized regarding also data for which transmission requests asynchronously arise.

Accordingly, application of the invention can improve convenience of the network system.

What is claimed is:

1. An audio signal processor comprising two sets of receivers and transmitters each performing communication in a single direction, and capable of being incorporated into a network system as one of processors constituting said network system in which said processors are connected in series by connecting one set of said receiver and transmitter in one processor to one set of said transmitter and receiver in a next processor by communication cables, respectively, wherein one of the processors operates as a master node, an audio transport frame generated by the master node circulates along a ring transmission route formed among said processors in said network system at a constant period, said audio transport frame including a plurality of storage regions for audio signals, and each of said processors writes and/or reads audio signals to/from the audio transport frame, to thereby transport the audio signals between a series of connected processors, said audio signal processor comprising:

an incorporating device that, when detecting a processor directly connected to the audio signal processor via the communication cable and not incorporated into the ring transmission route to which the audio signal processor belongs and which exists prior to incorporation of the detected processor into the ring transmission route, communicates with the detected processor to incorporate the detected processor into the ring transmission route;

a mode switch device that, when receiving a master change command designating the audio signal processor as the master node in the existing ring transmission route, switches the audio signal processor into a master mode in which the audio signal processor operates as the master node, while other processors not designated as the master node operate in a slave mode;

a reset instructing device that, when detecting said master change command, resets the audio signal processor to separate the audio signal processor from the ring transmission route, and sends a reset command for instructing reset to all adjacent processors with which the audio signal processor is directly connected via the communication cables; and a reset conveying device that, when receiving a reset command from an adjacent processor on a side, resets the audio signal processor to separate the audio signal processor from the ring transmission route, and sends a reset command to another adjacent processor on another side.

2. An audio signal processor according to claim 1, further comprising:

an initial communication device that, when the audio signal processor is not incorporated in the ring transmission route or the audio signal processor is located at an end of the connected processors which form the ring transmission route, transmits a communication frame from the transmitter to an adjacent processor directly connected to the transmitter via the communication cable and not incorporated into the ring transmission route to which the audio signal processor belongs, and receives a communication frame from the adjacent device via said communication cable, wherein said incorporating device detects a processor not incorporated into the ring transmission route through transmitting and receiving of a certain kind of the communication frame to/from the adjacent processor by said initial communication device.

3. An audio signal processor according to claim 2, further comprising:
an adjacent communication device that writes the communication frame into a certain region reserved in the audio transport frame to transmit the communication frame to an adjacent processor incorporated into the ring transmission route to which the audio signal processor belongs, and reads out the communication frame from the certain region in the audio transport frame received from the adjacent processor; and
a command transporting device that sends and receives commands to/from the other processors incorporated into the ring transmission route to which the audio signal processor belongs, through transmitting and receiving of the communication frame by said adjacent communication device of the audio signal processor and said other processors.

4. An audio signal processor according to claim 3, further comprising:
a device that, when receiving a master change command designating a processor other than the audio signal processor as the master node, writes the received master change command into the communication frame and sends the communication frame to the adjacent processor incorporated into the ring transmission route to which the audio signal processor belongs.

5. An audio signal processor according to claim 2, further comprising:
a topology table memory that stores a topology table indicating connection order of processors which are connected with the audio signal processor directly or indirectly through intermediate one or more processors; and
a destination setting device that sets a destination of the communication frame from among the processors indicated in the topology table,
wherein said initial communication device transmits the communication frame from the transmitter on a side where the destination processor of the communication frame is connected, and
further comprising a device that, upon receiving the communication frame from an adjacent processor on a side, i) if a destination of the communication frame is the audio signal processor, executes a process according to the contents of the communication frame, and ii) if the destination of the communication frame is other than the audio signal processor, forwards the communication frame to another adjacent processor on another side.

6. An audio signal processor according to claim 1, further comprising an audio transport frame generation device that generates a new audio transport frame for each of a plurality of sampling periods and transmits the generated audio transport frames to a directly connected adjacent processor based on a wordclock generated and supplied by the audio transport frame generation device,
wherein the audio transport frame generation devices generates the new audio transport frames and the wordclock only when the audio signal processor is the master node.

7. A network system composed of consecutive two or more of a plurality of nodes connected in series, wherein each of said plurality of nodes comprising two sets of receivers and transmitters each performing communication in a single direction, one node and a next node are connected in the series by connecting one set of said receiver and transmitter in the one node to one set of said transmitter and receiver in the next node by communication cables, respectively, wherein one of the nodes operates as a master node, an audio transport frame generated by the master node circulates along a ring transmission route formed among said nodes in said network system at a constant period, said audio transport frame includes a plurality of storage regions for audio signals, and each of said nodes along the ring transmission route writes and/or reads audio signals to/from the audio transport frame, to thereby transport the audio signals between the nodes composing the network system,
each of said nodes composing the network system comprising:
an incorporating device that, when detecting a node directly connected to the own node via the communication cable and not incorporated into the ring transmission route to which the own node belongs and which exists prior to incorporation of the detected node into the ring transmission route, communicates with the detected node to incorporate the detected node into the ring transmission route; and
a reset conveying device that, when receiving a reset command from an adjacent node on a side, resets the own node to separate the own node from the ring transmission route, and sends a reset command to another adjacent node on another side, and
at least one of nodes composing the network system further comprising:
a mode switch device that, when receiving a master change command designating the node as the master node in the existing ring transmission route, switches the node into a master mode in which the node operates as the master node, while other nodes not designated as the master node operate in a slave mode; and
a reset instructing device that, when detecting said master change command, resets the node to separate the node from the ring transmission route, and sends a reset command for instructing reset to all adjacent nodes with which the node is directly connected via the communication cable.

8. A network system according to claim 7, wherein each of said nodes composing the network system further comprises an audio transport frame generation device that generates a new audio transport frame for each of a plurality of sampling periods and transmits the generated audio transport frames to a directly connected adjacent node based on a wordclock generated and supplied by the audio transport frame generation device,
wherein the audio transport frame generation devices generates the new audio transport frames and the wordclock only when the corresponding node is the master node.

* * * * *